(12) United States Patent
Wang et al.

(10) Patent No.: US 10,812,778 B1
(45) Date of Patent: Oct. 20, 2020

(54) SYSTEM AND METHOD FOR CALIBRATING ONE OR MORE 3D SENSORS MOUNTED ON A MOVING MANIPULATOR

(71) Applicant: Cognex Corporation, Natick, MA (US)

(72) Inventors: Ruibing Wang, Framingham, MA (US); Aaron S. Wallack, Natick, MA (US); David J. Michael, Wayland, MA (US); Hongwei Zhu, Natick, MA (US)

(73) Assignee: Cognex Corporation, Natick, MA (US)

(*) Notice: Subject to any disclaimer, the term of this patent is extended or adjusted under 35 U.S.C. 154(b) by 0 days.

(21) Appl. No.: 15/232,787

(22) Filed: Aug. 9, 2016

Related U.S. Application Data

(63) Continuation-in-part of application No. 14/936,616, filed on Nov. 9, 2015.

(51) Int. Cl.
*H04N 13/246* (2018.01)
*G06T 7/80* (2017.01)
(Continued)

(52) U.S. Cl.
CPC .......... *H04N 13/246* (2018.05); *G06T 7/20* (2013.01); *G06T 7/60* (2013.01); *G06T 7/73* (2017.01); *G06T 7/85* (2017.01); *G06T 2200/04* (2013.01)

(58) Field of Classification Search
None
See application file for complete search history.

(56) References Cited

U.S. PATENT DOCUMENTS 4,682,894 A * 7/1987 Schmidt .............. G01B 11/306
356/243.4
4,925,308 A 5/1990 Stern et al.
(Continued)

FOREIGN PATENT DOCUMENTS

CA 2583935 A1 8/2001
CN 1358268 A 7/2002
(Continued)

OTHER PUBLICATIONS

Z. Ni et al., "Asynchronous event-based visual shape tracking for stable haptic feedback in microrobotics", IEEE Transaction on Robotics, 2012, vol. 28, No. 5, pp. 1081-1089 (Year: 2012).*
(Continued)

*Primary Examiner* — Mohammad J Rahman
(74) *Attorney, Agent, or Firm* — Loginov & Associates, PLLC; William A. Loginov

(57) ABSTRACT

This invention provides a system and method for concurrently (i.e. non-serially) calibrating a plurality of 3D sensors to provide therefrom a single FOV in a vision system that allows for straightforward setup using a series of relatively straightforward steps that are supported by an intuitive graphical user interface (GUI). The system and method requires minimal data input about the scene or calibration object used to calibrate the sensors. 3D features of a stable object, typically employing one or more subobjects, are first measured by one of the image sensors, and then the feature measurements are used in a calibration in which each of the 3D sensors images a discrete one of the subobjects, resolves features thereon and computes a common coordinate space between the plurality of 3D sensors. Sensor(s) can be mounted on the arm of an encoderless robot or other conveyance and motion speed can be measured in setup.

20 Claims, 50 Drawing Sheets

(51) Int. Cl.
*G06T 7/73* (2017.01)
*G06T 7/20* (2017.01)
*G06T 7/60* (2017.01)

(56) References Cited

U.S. PATENT DOCUMENTS

| | | | |
|---|---|---|---|
| 4,969,108 A | 11/1990 | Webb et al. | |
| 5,134,665 A * | 7/1992 | Jyoko | G01B 11/0608 |
| | | | 382/150 |
| 5,325,036 A | 6/1994 | Diethert et al. | |
| 5,349,378 A * | 9/1994 | Maali | G01B 11/25 |
| | | | 348/135 |
| 5,557,410 A | 9/1996 | Huber | |
| 5,675,407 A | 10/1997 | Geng | |
| 5,742,398 A | 4/1998 | Laucournet | |
| 5,768,443 A | 6/1998 | Michael | |
| 5,832,106 A | 11/1998 | Kim | |
| 6,005,548 A * | 12/1999 | Latypov | A63F 13/00 |
| | | | 345/156 |
| 6,009,359 A | 12/1999 | El-Hakim et al. | |
| 6,026,720 A | 2/2000 | Swank | |
| 6,064,759 A | 5/2000 | Buckley et al. | |
| 6,246,193 B1 | 7/2001 | Dister | |
| 6,272,437 B1 | 8/2001 | Woods et al. | |
| 6,678,058 B2 | 1/2004 | Baldwin et al. | |
| 6,963,423 B2 | 11/2005 | Ogasahara et al. | |
| 7,004,392 B2 | 2/2006 | Mehlberg | |
| 7,177,740 B1 | 2/2007 | Guangjun et al. | |
| 7,397,929 B2 * | 7/2008 | Nichani | G01V 8/10 |
| | | | 382/103 |
| 7,583,275 B2 | 9/2009 | Neumann et al. | |
| 7,626,569 B2 * | 12/2009 | Lanier | G06F 1/1601 |
| | | | 345/156 |
| 7,681,453 B2 | 3/2010 | Turner | |
| 7,797,120 B2 | 9/2010 | Walsh | |
| 7,822,571 B2 | 10/2010 | Kakinami | |
| 7,912,673 B2 | 3/2011 | Hebert et al. | |
| 8,049,779 B2 | 11/2011 | Poulin | |
| 8,111,904 B2 | 2/2012 | Wallack et al. | |
| 8,559,065 B2 | 10/2013 | Deamer | |
| 8,872,897 B2 | 10/2014 | Grossmann | |
| 9,325,974 B2 * | 4/2016 | Hebert | G01S 5/163 |
| 9,410,827 B2 | 8/2016 | Ghazizadeh | |
| 9,417,428 B2 | 8/2016 | Shuster | |
| 9,596,459 B2 | 3/2017 | Keaffaber | |
| 9,816,287 B2 * | 11/2017 | Zhou | B29C 66/1122 |
| 9,846,960 B2 | 12/2017 | Kirk | |
| 9,941,775 B2 * | 4/2018 | Fiseni | H02K 29/03 |
| 2002/0113970 A1 | 8/2002 | Baldwin et al. | |
| 2002/0196336 A1 * | 12/2002 | Batson | H01L 21/67265 |
| | | | 348/86 |
| 2004/0002415 A1 * | 1/2004 | Jang | B04B 5/0414 |
| | | | 494/10 |
| 2005/0068523 A1 | 3/2005 | Wang et al. | |
| 2006/0137813 A1 | 6/2006 | Robrecht et al. | |
| 2007/0016386 A1 | 1/2007 | Husted | |
| 2007/0055468 A1 * | 3/2007 | Pylvanainen | G01C 17/38 |
| | | | 702/92 |
| 2008/0007720 A1 | 1/2008 | Mittal | |
| 2008/0083193 A1 * | 4/2008 | McGlinchy | B29C 37/04 |
| | | | 52/745.19 |
| 2008/0298673 A1 | 12/2008 | Zhang et al. | |
| 2009/0024241 A1 * | 1/2009 | Rice | G05B 19/41875 |
| | | | 700/112 |
| 2009/0039810 A1 * | 2/2009 | Gotz | H02P 6/185 |
| | | | 318/400.32 |
| 2009/0220124 A1 | 9/2009 | Siegel | |
| 2009/0259412 A1 | 10/2009 | Brogardh | |
| 2010/0020178 A1 | 1/2010 | Kleihorst | |
| 2010/0024723 A1 * | 2/2010 | Hasegawa | H01J 37/32743 |
| | | | 118/500 |
| 2010/0033333 A1 | 2/2010 | Victor et al. | |
| 2010/0086672 A1 * | 4/2010 | Von Drasek | B31F 1/14 |
| | | | 427/9 |
| 2010/0166294 A1 * | 7/2010 | Marrion | G06K 9/00214 |
| | | | 382/154 |
| 2010/0245541 A1 | 9/2010 | Zhao et al. | |
| 2011/0125442 A1 | 5/2011 | Schallmoser | |
| 2011/0132208 A1 * | 6/2011 | Asakawa | B21D 22/00 |
| | | | 100/35 |
| 2011/0301901 A1 | 12/2011 | Panagas | |
| 2012/0067397 A1 * | 3/2012 | Shah | B32B 38/1808 |
| | | | 136/246 |
| 2012/0265479 A1 | 10/2012 | Bridges | |
| 2012/0311810 A1 | 12/2012 | Gilbert, Jr. et al. | |
| 2013/0188017 A1 * | 7/2013 | Ma | G06T 7/80 |
| | | | 348/46 |
| 2013/0266178 A1 * | 10/2013 | Jain | G06T 7/70 |
| | | | 382/103 |
| 2013/0278725 A1 | 10/2013 | Mannan | |
| 2013/0329012 A1 * | 12/2013 | Bartos | H04N 13/0246 |
| | | | 348/46 |
| 2014/0056507 A1 | 2/2014 | Doyle | |
| 2014/0085429 A1 * | 3/2014 | Hebert | G01S 5/163 |
| | | | 348/46 |
| 2014/0170302 A1 * | 6/2014 | Von Drasek | D21G 9/0036 |
| | | | 427/9 |
| 2014/0201674 A1 * | 7/2014 | Holz | G06F 3/017 |
| | | | 715/782 |
| 2014/0210456 A1 | 7/2014 | Crossman | |
| 2014/0240520 A1 * | 8/2014 | Liu | G06T 7/80 |
| | | | 348/187 |
| 2014/0267689 A1 | 9/2014 | Lavoie | |
| 2014/0327746 A1 * | 11/2014 | Dubois | G06T 15/08 |
| | | | 348/50 |
| 2015/0015607 A1 | 1/2015 | Sodhi | |
| 2015/0130927 A1 | 5/2015 | Luxen | |
| 2016/0005219 A1 | 1/2016 | Powell | |
| 2016/0059412 A1 * | 3/2016 | Oleynik | B25J 9/163 |
| | | | 700/257 |
| 2016/0086344 A1 * | 3/2016 | Regnier | G06K 9/6218 |
| | | | 382/103 |
| 2016/0182903 A1 | 6/2016 | Grundhöfer | |
| 2016/0262685 A1 | 9/2016 | Wagner | |
| 2017/0032526 A1 | 2/2017 | Gao | |
| 2017/0053407 A1 * | 2/2017 | Benosman | G06T 7/73 |
| 2017/0069052 A1 * | 3/2017 | Li | H04N 13/271 |
| 2017/0127912 A9 | 5/2017 | Morrissette | |
| 2017/0160314 A1 | 6/2017 | Furukawa | |
| 2017/0228864 A1 | 8/2017 | Liu | |

FOREIGN PATENT DOCUMENTS

| | | |
|---|---|---|
| CN | 102066872 A | 5/2011 |
| CN | 102538727 A | 7/2012 |
| CN | 104006825 A | 8/2014 |
| CN | 106052607 A | 10/2016 |
| DE | 19536297 A1 | 4/1997 |
| DE | 10016963 A1 | 10/2001 |
| DE | 102009054842 | 6/2011 |
| EP | 1143221 A2 | 10/2001 |
| EP | 1431705 A1 | 6/2004 |
| EP | 2466250 A1 | 6/2012 |
| WO | 9912082 A1 | 3/1999 |
| WO | 2016046072 | 3/2016 |
| WO | 2017067541 A1 | 4/2017 |

OTHER PUBLICATIONS

Akihiro et al., "Encoderless Robot Motion Control using Vision Sensor and Back Electromotive Force", International Conference on Intelligent Robots and Systems, Sep. 2014.*

English et al., "On the Implementation of Velocity Control for Kinematically Redundant Manipulators", "IEEE Transactions on Systems, Man and Cybernetics—Part A: Systems and Humans", May 2000, pp. 233-237, vol. 30, No. 3, Publisher: IEEE Transactions on Systems, Man and Cybernetics, Published in: USA.

Shoemake, "Animating Rotation With Quaternion Curves", "SIGGRAPH, San Francisco", Jul. 22, 1985, pp. 245-254, vol. 19, No. 3, Publisher: ACM, Published in: US.

(56) References Cited

OTHER PUBLICATIONS

English et al., "On the Implementation of Velocity Control for Kinematically Redundant Manipulators", "IEEE Transactions on Systems, Mann, and Cybernetics—Part A: Systems and Humans", May 1, 2000, pp. 233-237, vol. 30, No. 3, Publisher: IEEE, Published in: US.

\* cited by examiner

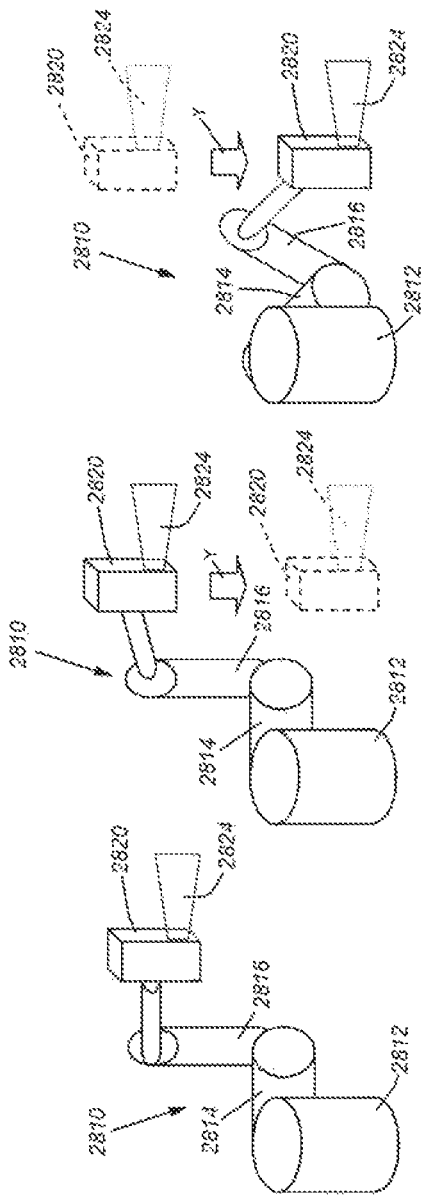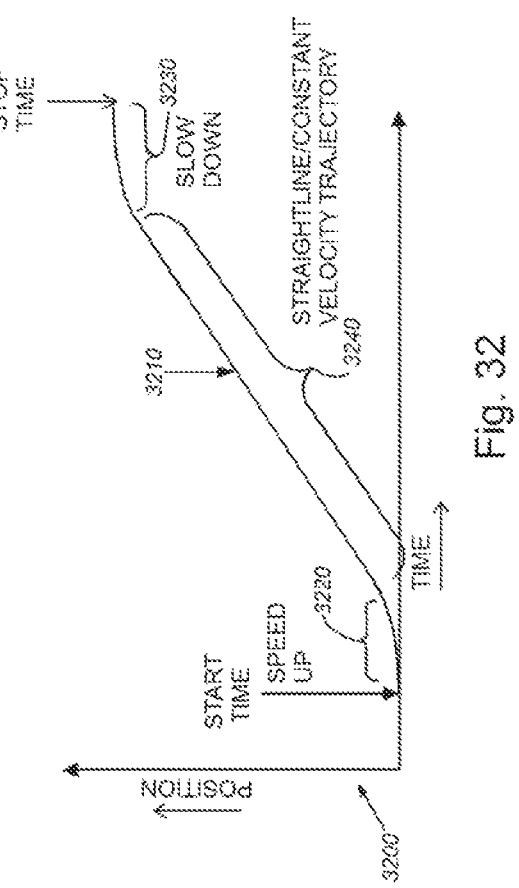

SYSTEM AND METHOD FOR CALIBRATING ONE OR MORE 3D SENSORS MOUNTED ON A MOVING MANIPULATOR

RELATED APPLICATION

This application is a continuation-in-part of copending U.S. patent application Ser. No. 14/936,616, entitled SYSTEM AND METHOD FOR CALIBRATING A PLURALITY OF 3D SENSORS WITH RESPECT TO A MOTION CONVEYANCE, filed Nov. 9, 2015, the teachings of which are expressly incorporated herein by reference.

FIELD OF THE INVENTION

This invention relates to vision systems using one or more three-dimensional (3D) vision system cameras, and more particularly to calibration of a plurality vision system cameras employed to image objects in relative motion

BACKGROUND OF THE INVENTION

In manufacturing and assembly processes, it is often desirable to analyze an object surface to determine the nature of features and/or irregularities. The displacement (or "profile") of the object surface can be determined using a machine vision system (also termed herein "vision system") in the form of a laser displacement sensor (also termed a laser beam "profiler"). A laser displacement sensor captures and determines the (three dimensional) profile of a scanned object surface using a planar curtain or "fan" of a laser beam at a particular plane transverse to the beam propagation path. In a conventional arrangement, a vision system camera assembly is oriented to view the plane of the beam from outside the plane. This arrangement captures the profile of the projected line (e.g. extending along the physical x-axis) on the object surface, which, due to the baseline (i.e. the relative spacing along the y-axis) between the beam (sometimes characterized as a "fan") plane and the camera causes the imaged line to appear as varying in the image y axis direction as a function of the physical z-axis height of the imaged point (along the image x axis). This deviation represents the profile of the surface. Laser displacement sensors are useful in a wide range of inspection and manufacturing operations where the user desires to measure and characterize surface details of a scanned object via triangulation. One form of laser displacement sensor uses a vision system camera having a lens assembly and image sensor (or "imager") that can be based upon a CCD or CMOS design. The imager defines a predetermined field of grayscale or color-sensing pixels on an image plane that receives focused light from an imaged scene through a lens.

In a typical arrangement, the displacement sensor(s) and/or object are in relative motion (usually in the physical y-coordinate direction) so that the object surface is scanned by the sensor(s), and a sequence of images are acquired of the laser line at desired spatial intervals—typically in association with an encoder or other motion measurement device (or, alternatively, at time based intervals). Each of these single profile lines is typically derived from a single acquired image. These lines collectively describe the surface of the imaged object and surrounding imaged scene and define a "range image" or "depth image".

Other camera assemblies can also be employed to capture a 3D image (range image) of an object in a scene. The term range image is used to characterize an image (a two-dimensional array of values) with pel values characterizing Z height at each location, or characterizing that no height is available at that location. The term range image is alternatively used to refer to generic 3D data, such as 3D point cloud data, or 3D mesh data. The term range and gray image is used to characterize an image with pel values characterizing both Z height and associated gray level at each location, or characterizing that no height is available at that location, or alternatively a range and gray image can be characterized by two corresponding images—one image characterizing Z height at each location, or characterizing that no Z height is available at that location, and one image characterizing associated gray level at each location, or characterizing that no gray level is available at that location. The term range image is alternatively used to refer to range and gray image, or 3D point cloud data and associated gray level data, or 3D mesh data and associated gray level data. For example, structured light systems, stereo vision systems, DLP metrology, and other arrangements can be employed. These systems all generate an image that provides a height value (e.g. z-coordinate) to pixels.

A 3D range image generated by various types of camera assemblies (or combinations thereof) can be used to locate and determine the presence and/or characteristics of particular features on the object surface. In certain vision system implementations, such as the inspection of circuit boards, a plurality of displacement sensors (e.g. laser profilers) are mounted together to extend the overall field of view (FOV) (wherein the term "field of view" refers to measurement range) of the vision system so as to fully image a desired area of the object (e.g. its full width) with sufficient resolution. In the example of a laser profiler, the object moves in relative motion with respect to the camera(s) so as to provide a scanning function that allows construction of a range (or, more generally a "3D") image from a sequence of slices acquired at various motion positions. This is often implemented using a conveyor, motion stage, robot end effector or other motion conveyance. This motion can be the basis of a common (motion) coordinate space with the y-axis defined along the direction of "scan" motion.

It is often highly challenging to calibrate all sensors to a common coordinate space so as to provide a continuous FOV for use in imaging a runtime object of a given width (along the x-axis). Such calibration can entail the use of precisely dimensioned and aligned calibration objects (e.g. a series of rigidly attached frusta) that are respectively imaged by each of the displacement sensors. The setup also requires a skilled operator to perform a series of specific steps to complete the process correctly. This often limits the use of such an arrangement of sensors to users who have access to a skilled operator. More generally, such an arrangement is time-consuming to set up and maintain based upon the challenges presented by calibrating the displacement sensors to a common coordinate space.

A further desired task for vision systems is the inspection of stationary objects (e.g. car bodies) to verify whether certain components are properly assembled and/or within tolerance. Some of these components are located at positions that render imaging by a camera assembly mounted on a traditional, fixed motion device challenging—for example, a door hinge and latch assemblies located within the interior of a vertically oriented door frame. Calibration and runtime operation of cameras placed on a motion device to view such objects can be challenging as the motion device may not be adapted to readily provide motion data (i.e. via an encoder) to the vision system.

SUMMARY OF THE INVENTION

This invention overcomes disadvantages of the prior art by providing a system and method for calibrating one or more 3D sensors to provide therefrom a single FOV in a vision system that allows for straightforward setup using a series of relatively straightforward steps that are supported by an intuitive graphical user interface (GUI). The system and method requires minimal input of numerical and/or parametric data about the imaged scene or calibration object used to calibrate the sensors, thereby effecting a substantially "automatic" calibration procedure. The 3D features of a stable object (e.g. a calibration object) employing one or more 3D subobjects is first measured by one of the image sensor(s) (or by providing an accurate specification of the object features from another source—CAD, CMM, etc.), and then the measurements are used in a calibration in which each 3D sensor images a discrete one of the subobjects, resolves features thereon and computes a common coordinate space between the one or more 3D sensors. Illustratively the 3D sensors exhibit accurate factory-based calibration with respect to two orthogonal coordinates (e.g. x and z axes) in a respective three dimensional coordinate space, and can comprise laser displacement sensors. In an embodiment in which one or more image sensor(s) is mounted on a motion conveyance with multiple degrees of freedom of movement—e.g. a robot arm—where the conveyance may be lacking (free of) an ability to transmit motion information to the vision system, the sensor(s) is/are calibrated based upon a determination of constant speed operation along a single degree of freedom (e.g. a straight line) wherein the motion conveyance can accurately move between an acceleration time interval and a deceleration time interval. At runtime, an object is imaged during the time interval characterized by this single-degree, constant speed motion.

In an illustrative embodiment, a system and method for concurrently calibrating one or more 3D sensors in a vision system performing a vision system process is provided. The system includes one or more 3D sensors operatively connected to a vision processor assembly, arranged to image a scene containing a stable object while mounted on an encoderless conveyance that provides relative motion between to the one or more 3D sensors and the stable object along a motion direction. The encoderless motion conveyance typically includes a setting that allows for an interval of straight line, constant velocity motion trajectory. A calibration module calibrates the one or more 3D sensors to a common coordinate space by providing measurements of 3D features on the stable object and calibrating the stable object based upon the measurements and the 3D features found from 3D image data of the stable object acquired by the one or more 3D sensors during the relative motion. The calibration module employs speed data computed based upon a scan of the stable object during the interval of straight line, constant velocity motion trajectory. Illustratively, the measurements are generated by at least one of (a) a specification of the stable object and (b) 3D features found in an image of the stable object acquired by one of the plurality of 3D sensors. The one or more 3D sensors can be laser displacement sensors, and can be mounted in an adjacent manner. They can be are calibrated concurrently so as to tie together an image acquired by the displacement sensors. Illustratively, a setup process determines at least one of (a) motion parameters of the conveyance for use in generating the measurements and (b) an exposure for use in generating the measurements. The motion parameters can be determined by the setup process by inputting of a travel distance of the conveyance and moving the conveyance while polling for motion to determine a time to move across the travel distance. In embodiments, the conveyance can comprise a multi-axis robotic manipulator. Illustratively, the calibration module computes calibration of the one or more 3D sensors to the common coordinate space based on a single concurrent expression. The stable object can comprise a calibration object having one or more 3D subobjects, in which each subobject is located on the calibration object so as to be imaged within the field of view of a discrete one of the 3D sensors during calibration. The calibration module generates calibration parameters that map local coordinate spaces of the one or more 3D sensors to the common coordinate space. The calibration parameters can be defined according to a gradient descent technique that estimates initial parameter values for the gradient descent technique with an initial parameter estimator. The initial parameter estimator can be arranged to consider a feature predication error to select the best possible initial parameter estimation. Illustratively, a 3D renderer applies the calibration parameters to grayscale pixel values generated by each of the (one or more) 3D sensors to render a grayscale image of an object imaged thereby. The calibration module can be arranged to scan the stable object in each of a plurality of phases that include orienting the stable object with respect to the conveyance in each of a plurality of orientations. The phases can include a measurement phase in which measurements of the stable object are obtained with respect to the one or more 3D sensors and a calibration phase in which the measurements of the stable object from the measurement phase are applied to generate the calibration parameters. The stable object can be a calibration object having one or more subobjects that define a 3D surface having intersecting planes. The motion conveyance can comprises a conveyor, a motion stage or a multi-axis robotic manipulator, and the calibration object can be located at a position remote from a runtime object, so that calibration is performed with the displacement sensor in a calibration orientation than a runtime orientation thereof.

In a further embodiment a graphical user interface for a vision system having a one or more 3D sensors arranged to image a scene is provided. A plurality of display screens are presented to a user in a sequence, in which the display screens include screens that instruct the user to position a stable object in a plurality of orientations with respect to a scene imaged by the 3D sensor(s) in relative motion therebetween. The GUI directs a scan of the object in each of the orientations to measure features of the stable object and to calibrate the 3D sensor(s) to a common coordinate system based on measurements.

BRIEF DESCRIPTION OF THE DRAWINGS

The invention description below refers to the accompanying drawings, of which:

FIGS. 29-31 are diagrams of the encoderless motion conveyance and associated sensor of FIG. 28, shown at a start position, moving between a start position and a stop position, and at a stop position, respectively;

FIG. 32 is a graph showing the trajectory of the encoderless motion conveyance and associated sensor of FIG. 28 between speed up, straight line, constant velocity travel and slow down;

DETAILED DESCRIPTION

I. System Overview

Figure 1:
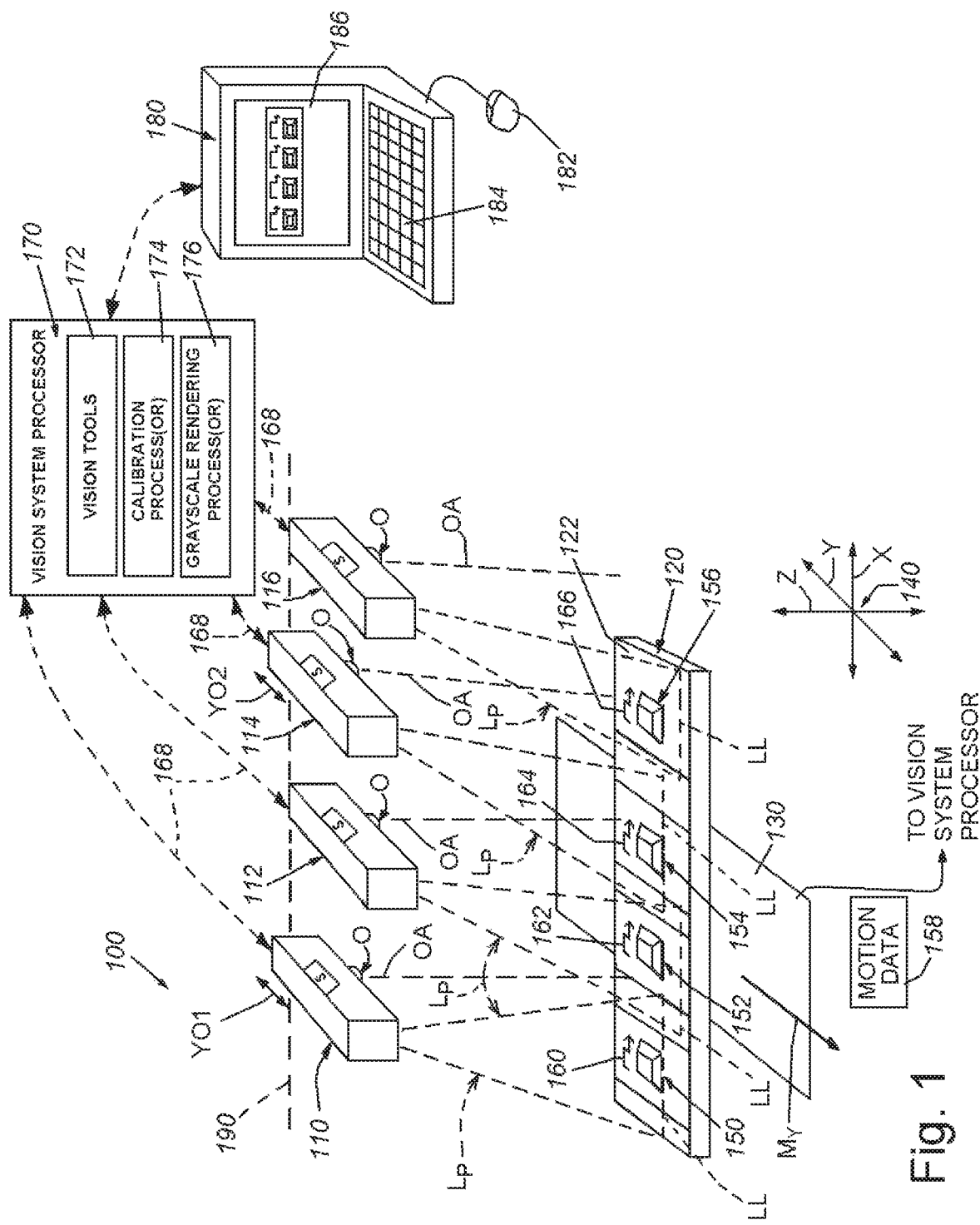
FIG. 1 is diagram of an exemplary vision system arrangement employing a plurality of 3D sensors in conjunction with a motion conveyance that provides relative motion between a stable object (e.g. a calibration object as shown and/or runtime object under inspection) and the 3D sensors.

FIG. 1 details a vision system arrangement 100 that includes a plurality of (3D) displacement sensors 110, 112, 114 and 116. In this exemplary arrangement, four sensors are depicted. However at least two and greater than four sensors can be employed as the exemplary "plurality" as defined herein. The sensors 110, 112, 114, 116 can be arranged in a variety of orientations that are typically side-by-side with respect to each other as shown to define a widened (in the x-axis direction as defined below) field of view (FOV). The 3D sensors 110, 112, 114 and 116 in this exemplary arrangement are implemented as so-called laser profilers or laser displacement sensors that rely upon relative motion (arrow My) generated by a motion conveyance that acts along the y-axis direction between the sensor and the object 120 under inspection to provide a range image (also termed herein a "3D image") of the object 120. As shown, in this embodiment, motion My is generated by the conveyor or motion stage (or another robotic manipulator component) 130. However, motion can be generated by the sensor mounting arrangement, or by both the conveyor/stage and a moving sensor mount. As described above, any image acquisition device that acquires a range image (including a height dimension for a given image pixel—thereby providing (e.g.) x, y and z—axis values for the pixels that image the object) can be employed as the 3D sensor herein.

By way of non-limiting example the depicted, exemplary laser displacement sensors 110, 112, 114 and 116 of the arrangement 100 consist of an image sensor (or imager) S and a separate laser illuminator generates a plane LP of laser light that is characterized as a "structured" illumination source in that it generates a specific optical effect on the surface of the object under inspection. The projected laser light plane LP projects a line LL on a portion of the underlying object 130 that is imaged. The laser plane LP is oriented to reside in a plane at a non-parallel (acute) angle relative to the optical axis OA of the imager optics O. In this manner, the image characterizes height deviations (variations in the local z-axis) on the surface as an offset in the line LL—generally along the local y-axis direction where the x-axis represents the direction of extension of the line LL along the surface. Each 3D sensor 110, 112, 114 and 116 inherently defines its own local coordinate space. This local coordinate space, associated with each 3D sensor, is potentially misaligned relative to the coordinate space of another one of the sensors.

Notably, the calibration of each individual 3D sensor is significantly accurate in terms of the relationship between displacement of the projected laser line LL along the local x-axis versus the local y-axis and the relative height of the imaged surface along the local z-axis. In many implementations, such accuracy can be measured in the micron or sub-micron level. Hence, the system and method herein can rely upon this inherent accuracy in making certain assumptions that speed and simplify calibration of the 3D sensors with respect to a common coordinate space. In the depicted exemplary arrangement of FIG. 1, the common coordinate space 140 is defined in terms of x, y and z-axes to which the images of all sensors are calibrated—where (by way of example) the direction of motion My is oriented along the y-axis of the coordinate space 140 and the x and z axes are orthogonal thereto. This allows the system to view a wide object that exceeds the FOV of a single 3D sensor.

The object 120 shown in FIG. 1 is a stable object (also generally termed herein as a "calibration object") consisting of a plurality of individual, spaced apart frustum assemblies (also termed calibration "subobjects") 150, 152, 154 and 156 that each define a discrete "feature set", separated by (e.g.) a planar region of the calibration object base plate or underlying base frame, which is typically free of 3D features (other than the side edges of the overall object). By "stable object", it is meant an object that remains rigid (and generally non-flexible) between uses so that its dimensions are predictable in each scan by the image sensors. The spacing between the individual assemblies is variable. In this embodiment, each frustum 150, 152, 154 and 156 resides within the local FOV of one of the respective 3D sensors 110, 112, 114 and 116. In an embodiment, each subobject is attached to an underlying plate or frame 122 in such a manner that the overall object exhibits minimal variation due to mechanical deflection (resulting from temperature variation, stresses, etc.), as described further below. This mechanical isolation of system components to reduce variable deflection enhances the repeatability and accuracy of the calibration process. It is contemplated that a variety of shapes can be employed as 3D calibration objects/shapes in various embodiments. A frustum affords a convenient shape for a calibration subobject consisting of a plurality of identifiable surfaces and edges that generate features (e.g. corners) used in the calibration process. It is expressly contemplated that other forms of calibration subobject shapes e.g. cones, irregular polyhedrons, etc. can be employed in alternate embodiments. Appropriate, unique fiducials 160, 162, 164 and 166, respectively allow the system to identify and orient each frustum 150, 152, 154 and 156 relative to the common coordinate space. Notably, each frustum is constructed to define a predictable and accurate shape, but need not be identical or precisely constructed in view of the teachings of the illustrative system and method. Likewise, while it is desirable to orient all frustum assemblies in a relatively aligned arrangement on the underlying plate 122, this is not required.

Motion My of the conveyor/stage 130 can be tracked by a motion encoder within the conveyor/stage (or by another motion sensing device, including a visual motion sensor that tracks movement of features (e.g. tick marks on the conveyor/stage) through the FOV of one or more sensors. The encoder signal (motion data) 158 as well as image data (dashed links 168) acquired by the sensors 110, 112, 114, 116, are provided to a vision process(or) 170. The processor 170 can be integrated in one or more of the sensor assemblies, or as depicted, can be located on a separate computing device 180 having appropriate user interface (e.g. mouse 182, keyboard 184) and display functions (screen and/or touchscreen 186). The computing device 180 can comprise a server, PC, laptop, tablet, smartphone or purpose-built processing device, among other types of processors with associated memory, networking arrangements, data storage, etc., that should be clear to those of skill.

The vision system process(or) 170 can include a variety of functional software processes and modules. The processes/modules can include various vision tools 172, such as feature detectors (e.g. edge detectors, corner detectors, blob tools, etc.). The vision system process(or) 170 further includes a calibration process(or) 174 that carries out the various functions of the system and method, and optionally, can include a grayscale rendering process(or) 176 that allows 3D images of objects acquired by the system to be rendered into a visible grayscale (and/or color-based) version of the object.

The mechanism for mounting the 3D sensors with respect to the imaged scene is highly variable. In an embodiment a rigid overlying beam is used. It is desirable to limit vibration, as such vibration introduces inaccuracy to the calibrated system.

Figure 2:
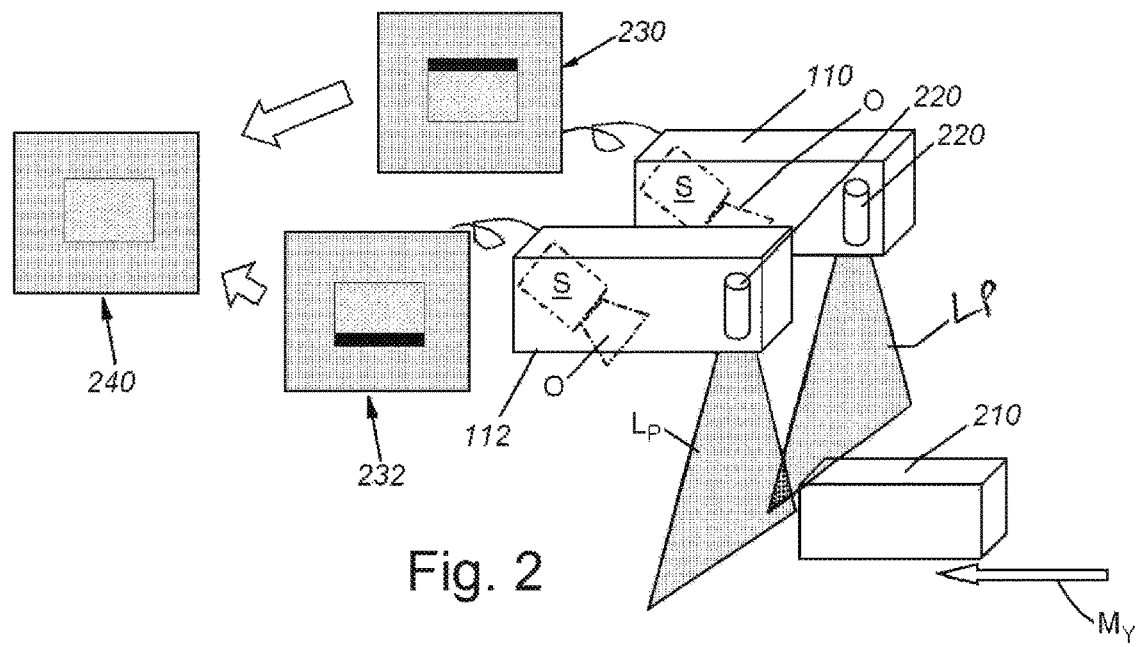
FIG. 2 is a diagram showing an arrangement of two 3D sensors arranged side-to-side so as to eliminate side occlusion with respect to a scanned object.

There are a variety of advantages to arranging a plurality of side-by-side sensors, all calibrated to a common coordinate space. Reference is made to FIG. 2, which shows an arrangement of two of the 3D sensors 110 and 112 acquiring an image of an exemplary object 210. In addition to the widening of the overall FOV, the use of a plurality of calibrated 3D sensors is to overcome occlusion induced by the sensing modality. By way of background, the exemplary, depicted displacement sensors project structured illumination onto a scene and a camera (sensor S and optics O) observes that structured illumination on the scene. 3D measurements are computed via triangulation after determining which structured illumination point corresponds to each observed feature in the camera's acquired image. This triangulation requires that the camera be relatively distant from the illumination projection, so as to establish a baseline for the triangulation. The downside of positioning the camera away from the structured illumination source is that portions of the scene can be occluded by either the camera or the structured illumination. Multiple displacement sensors can be used to overcome such occlusions, but displacement sensor calibration is required in order to accurately compose data from multiple displacement sensors. Note that the term calibration as used herein can also be referred to as "field calibration" in that it is performed in a user's runtime system environment, rather than at the factory producing the 3D sensor(s). Hence, the side-to-side (along the x-axis) sensor arrangement of FIG. 2 is useful for overcoming side occlusion. In this example, both the camera (S, O) and the laser plane (LP) projection illumination 220 can be considered to be emanating from a single point. An off-centered object can, thus, occlude a portion of the scene. Multiple 3D sensors can be configured so that any point in the scene is observed from both directions, as shown by the two partially occluded local images 230, 232 that are combined into a single complete, non-occluded image 240. Consequently, using multiple displacement sensors to view the scene from different perspectives/points of view can effectively overcome such side-to-side occlusion problems.

Figure 3:
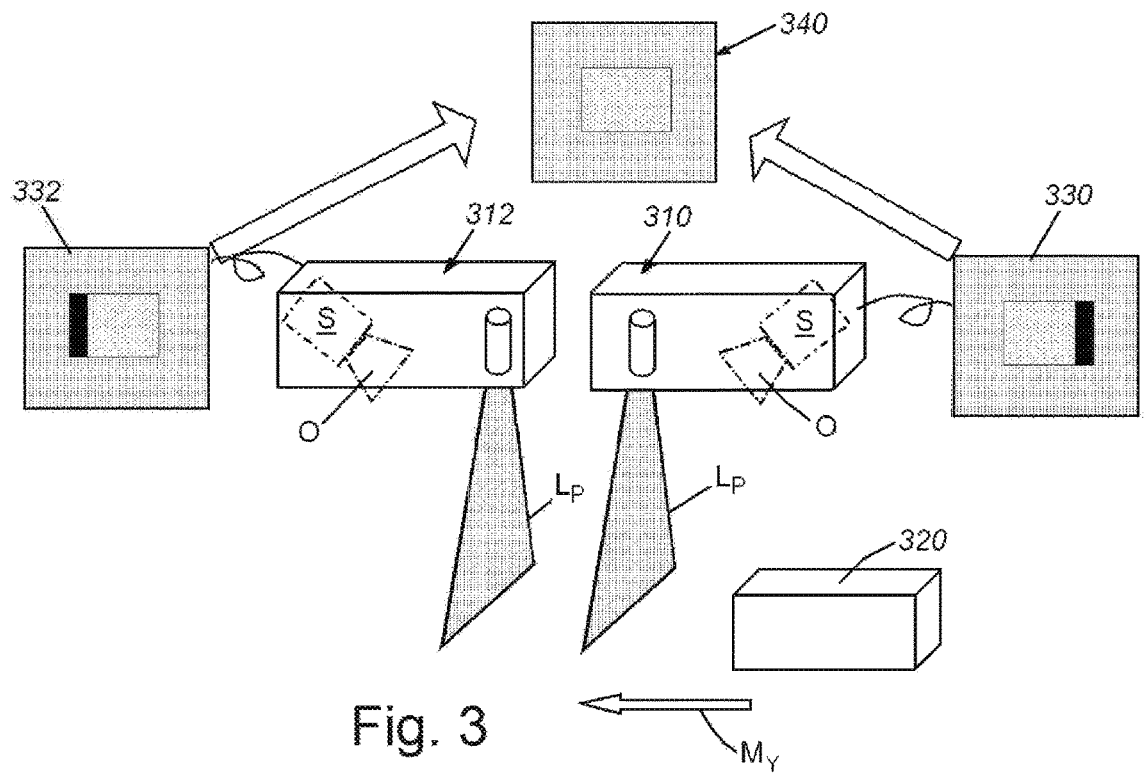
FIG. 3 is a diagram showing an optional arrangement in which an additional 3D sensor is arranged back-to-back with another 3D sensor (that is typically part of a side-to-side array of sensors) so as to eliminate object front-to-back occlusion.

Likewise, as depicted in FIG. 3, by locating a pair of sensors 310, 312 in a back-to-back arrangement along the y-axis (with at least one set of sensors also extended across the x-axis to enhance FOV). This arrangement allows each sensor to image a portion of an otherwise occluded object 320. Each partial image 330, 332 is combined to derive a full image 340 of the object using the calibration techniques described in accordance with the system and method herein.

Figure 4:
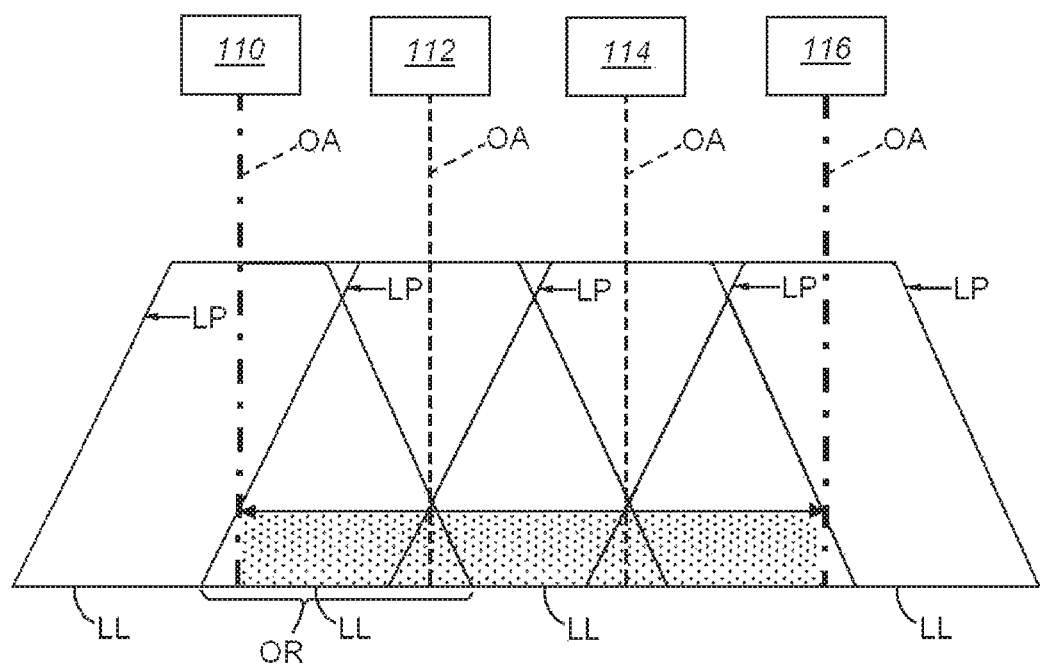
FIG. 4 is a front view of a plurality of sensors arranged with double-overlapping coverage to eliminate side occlusion of objects according to an exemplary side-by-side 3D sensor arrangement.

Notably, adjacent 3D sensors are mounted at an offset (at least) along the y-axis direction as indicated by the offset Yo1, Yo2 (from dashed line 190) of sensors 110, 114 with respect to sensors 112, 116. This offset ensures that there is no cross-talk or interference between the laser lines of each sensor. Each sensor's image is acquired separately and, as described below, is subsequently stitched together during the calibration process. Likewise, it is contemplated that each projected laser line LL, overlap at least one other line along the x-axis. This ensures that the entire surface of the object is fully imaged. As also described below, overlaps are aligned by the system and method during the stitching step. To further ensure that every portion of the object is viewed from both sides, thereby reducing opportunities for occlusion, FIG. 4 shows an optional arrangement in which the laser planes LP provide double-double coverage of the imaged scene. That is, the overlap region OR of each plane LP (e.g. sensor 110) is wide enough to cross the optical axis OA of an adjacent sensor (e.g. sensor 112). As shown, the plane of the first sensor (sensor 110) crosses into that of the next adjacent sensor (e.g. sensor 114) in this exemplary arrangement. Note that crosstalk between adjacent 3D sensors can be avoided by other mechanisms—some of which can allow sensors to be mounted substantially free of offset (Yo1, Yo2). For example, different-wavelength lasers can be projected in adjacent units coupled with narrowband filters on the associated sensor cameras/optics. Adjacent lasers with different polarizations and polarizing filters can be used in further embodiments. Additionally (or alternatively) the illumination controller(s) associated with each of the sensors can cause the respective, projected laser lines to be strobed in a synchronized manner such that each area where laser lines overlap can be imaged by the sensors while only the respective laser line associated with a given sensor is illuminated.

Figure 5:
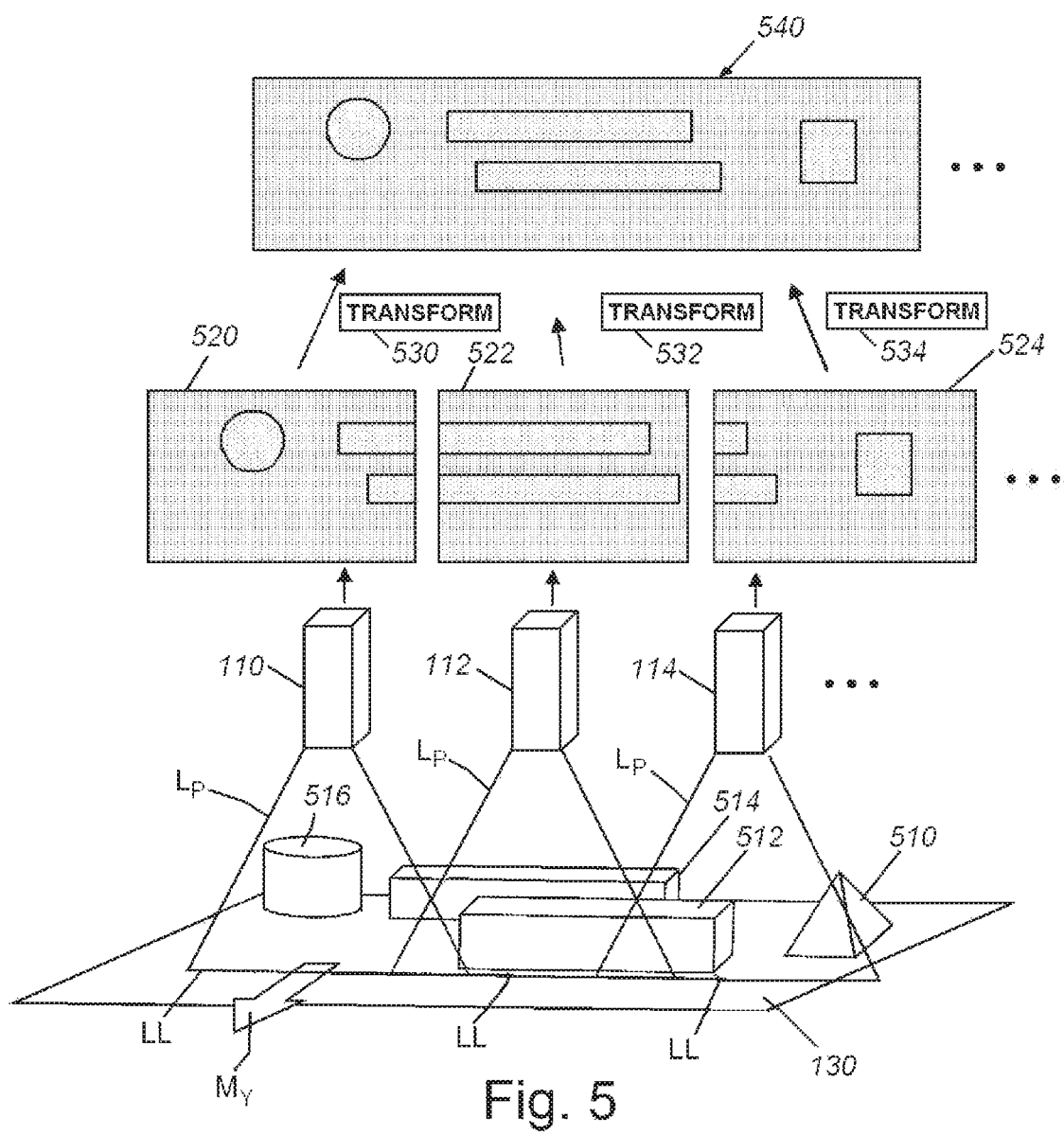
FIG. 5 is a diagram showing the stitching together of multiple 3D sensor images using the illustrative calibration system and method herein.

With reference now to FIG. 5, the system and method particularly facilitates stitching of runtime image data from multiple 3D sensors 110, 112, 114 based upon the calibration process so as to define a single FOV and a common coordinate space. As shown, one or more object(s) 510, 512, 514 and 516 are moved (arrow My) with respect to the sensors 110, 112 and 114, which project planes LP with overlapping laser lines LL. In an embodiment, the lines can be offset from each other as shown in FIG. 1 (or otherwise arranged/selectively filtered) to prevent crosstalk and other undesirable conditions, as described herein. Each sensor 110, 112, 114 generates a respective image 520, 522, 524 of some, or a portion of, the object(s) 510, 512, 514 and 516 within its FOV in its local coordinate space. The calibration procedure generates a transform 530, 532, 534 that respectively transforms the coordinate space of each image 520, 522, 524 into a common coordinate space. The procedure also accounts for overlap between the images by blending overlap regions between images using (e.g.) techniques known to those of skill. The result is a stitched runtime image 540 in which the objects appear as part of a single, continuous FOV.

II. Definitions

Before discussing the details of the calibration system and method, the following definitions are provided to assist in understanding the concepts and terms presented herein:

| Term | Definition |
| --- | --- |
| Original Sensor $3D_{Sensor-i}$ | The coordinate space of range images acquired by sensor i of a plurality of sensors 0-n using only the factory calibration. Original Sensor $3D_{Sensor-i}$ is a not necessarily a physically accurate orthonormal space. Original Sensor $3D_{Sensor-i}$ has perpendicular x and z axes. The x axis, z axis, and origin of Original Sensor $3D_{Sensor-i}$ are based on the factory calibration. The y-axis corresponds to the motion direction (the y axis of Original Sensor $3D_{Sensor-I}$ is not necessarily perpendicular to the x and z axes. |
| Original Sensor $XZ3D_{Sensor-i}$ | A coordinate space which shares the x and z axes with Original Sensor $3D_{Sensor-i}$ but where the y axis is perpendicular to the x and z axes (as opposed to being based on the motion direction in the manner of Original Sensor $3D_{Sensor-i}$). |
| $Sensor3D_{Sensor-i}$ | The coordinate space of range images acquired by sensor i after incorporating this calibration. $Sensor_{3DSensor-I}$ is a physically accurate orthonormal space. The origin of Sensor $3D_{Sensor-I}$ is at the origin of Original Sensor $3D_{Sensor-i}$. The z-axis of Sensor $3D_{Sensor-I}$ is parallel to the z-axis of Original Sensor $3D_{Sensor-i}$ and has unit length in Phys3D. The x-axis of Sensor $3D_{Sensor-I}$ is perpendicular to the z-axis of Sensor $3D_{Sensor-I}$ and has unit length in Phys3D and is in the x-z plane of Original Sensor $3D_{Sensor-i}$. The y-axis of Sensor $3D_{Sensor}$ is defined as the z-axis cross the x-axis. The coordinate axes of $Sensor3D_{Sensor-i}$ are parallel to the coordinate axes of Original Sensor $XZ3D_{Sensor-i}$ |
| Phys3D | A common consistent/shared coordinate space used to relate the sensors. Phys3D is a physically accurate orthonormal space. Phys3D is defined by the user-specified transform Object3DFromPhys3D$_{Pose=0}$ and the Object3D$_{Pose=0}$ coordinate space. |
| Sensor3DFromOriginalSensor $3D_{Sensor=i}$ | An affine transformation between Original Sensor3D$_{Sensor-i}$ and Sensor3D$_{Sensor=i}$ for sensor i |
| Sensor3DFromPhys3D$_{Sensor=1}$ | An orthonormal unit-length 3D transform between Sensor3D$_{Sensor=i}$ and Phys3D for sensor i |
| Calibration object | A 3D object comprised of one or more 3D frusta/subobjects |
| Object3D | An orthonormal physically accurate coordinate space affixed to the calibration object. |
| Object3D$_{Pose=p}$ | Coordinate space Object3D repositioned at Pose=p |
| Calibration object physical feature positions $F_{frusta,feature}$ | The (x,y,z) positions of individual features in the calibration object (specified with respect to the Object3D coordinate space). They can optionally be specified as inputs, or they can be automatically estimated by the displacement sensor calibration. |
| Measured feature positions $M_{pose,sensor,frusta,feature}$ | The measured (or estimated) (x,y,z) positions of features in the calibration target (measurements are in Original Sensor3D$_{Sensor-i}$). |
| Object3DFromPhys3D$_{Pose=p}$ | The $p^{th}$ pose of the calibration object (with respect to Phys3D coordinates)-these transforms are estimated by the displacement sensor calibration. |
| OriginalSensor3DFromPhys3D$_{Sensor=i}$ | The relationship between the OriginalSensor3D$_{Sensor=i}$ coordinate space the of the $i^{th}$ sensor and Phys3D-this transform includes both the sensor's pose and non-rigid aspects of OriginalSensor3D$_{Sensor=i}$ |
| OriginalSensorXZ3DFromPhys3D$_{Sensor=i}$ | The relationship between the OriginalSensorXZ3D$_{Sensor=i}$ coordinate space the of the ith sensor and Phys3D-these transforms are refined during the displacement sensor calibration refinement computation. |
| MotionVectorInPhys3D | The motion direction vector (measured with respect to Phys3D)- this vector is estimated by the displacement sensor calibration. |

III. Calibration Procedure

Figure 6:
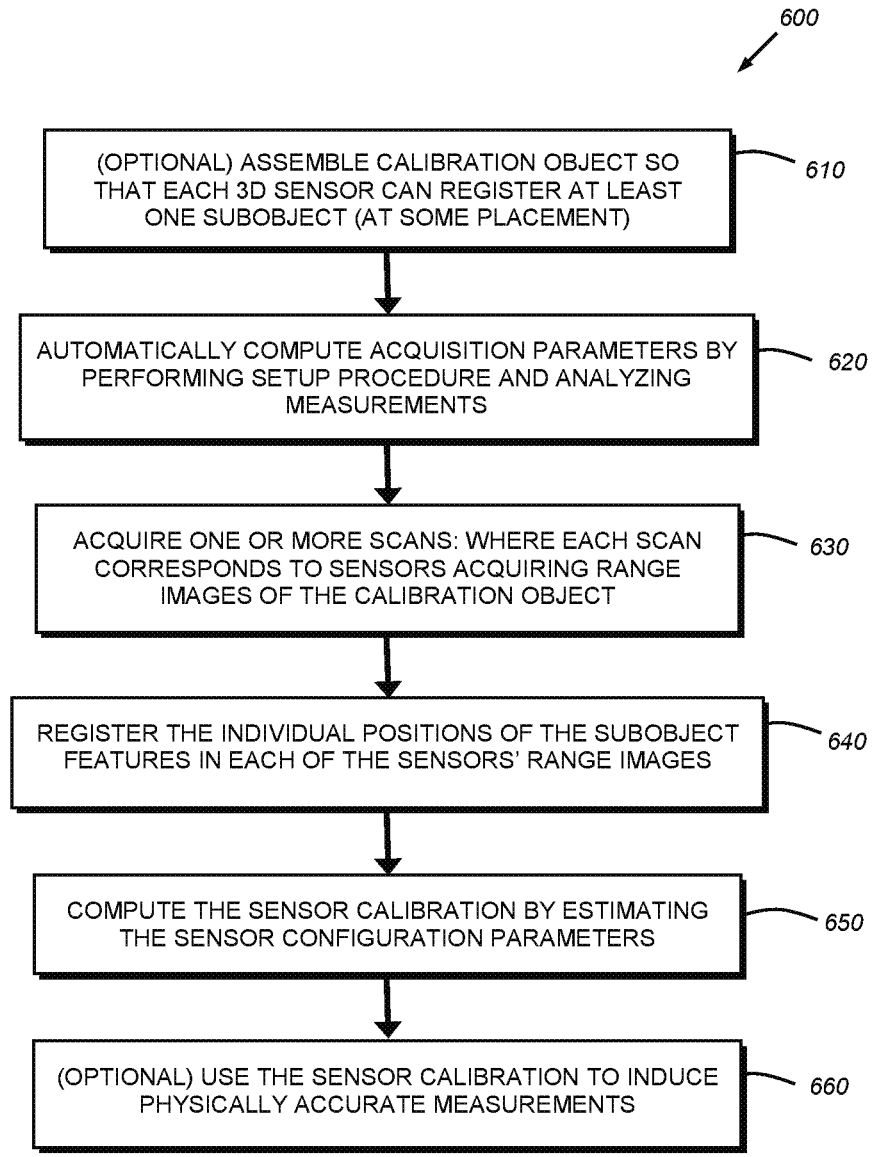
FIG. 6 is a flow diagram of a generalized calibration procedure according to an illustrative embodiment in which a plurality of sensors are concurrently calibrated to provide a continuous, stitched-together field of view (FOV)

Reference is now made to FIG. 6, which describes generalized calibration procedure 600 according to an illustrative embodiment. The procedure optionally includes step 610, in which a calibration object (e.g. object 120 in FIG. 1) is assembled using a plurality of spaced-apart, subobjects (e.g. 150, 152, 154, 156) on a base plate (e.g. base plate 122). The subobjects can be attached to slots or other mounting and retaining structures on the base plate in a manner that isolates them from deflection due to temperature variation, fastener tightening, etc. A variety of arrangements can be employed to attach the subobjects to the base plate. In an alternate embodiment, the subobjects can be attached to multiple base plates, or they can be attached to multiple rails.

Figure 7:
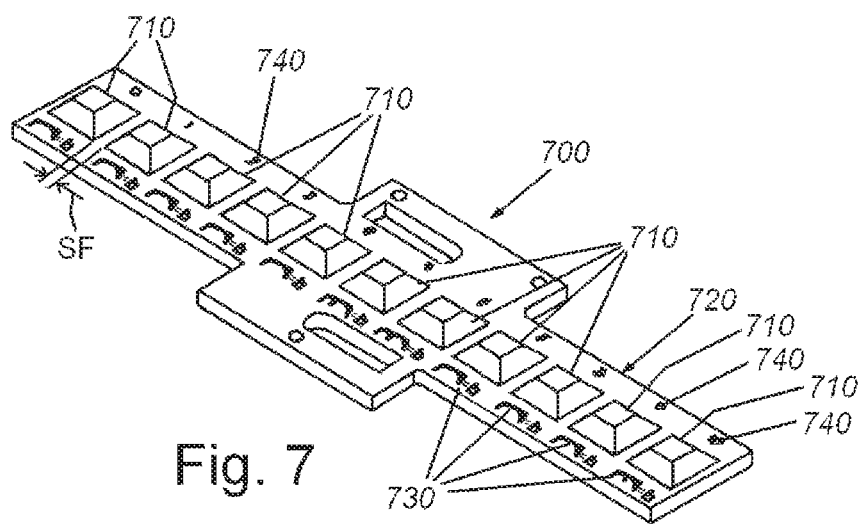
FIG. 7 is a perspective view of a unitary/monolithic calibration object defining a plurality of discrete frusta for use with the system according to an alternate embodiment.

As described above, the spacing between subobjects should typically enable each sensor to image and register at least one subobject. Alternatively, as shown in the example of FIG. 7, the calibration object 700 can consist of a plurality of frusta (or other 3D shapes) 710 formed unitarily on a base plate 720 at an appropriate spacing SF therebetween. The size of the frusta and their relative spacing (SF) can allow more than one of the frusta 710 to be imaged and registered by each sensor, but typically at least one is imaged and registered. Fiducials 730 and/or numbers 740 can be used to uniquely identify each frustum 710. In an embodiment, the calibration object can include through-holes for mounting the calibration object to a mounting plate. In a further embodiment, those holes can reside in flexures so that the fixturing force minimizes (mechanically isolates) further distortion the calibration object (it is contemplated that the calibration object can be distorted but the goal is for the calibration object to be distorted to a stable shape). In a further embodiment, the calibration object can include built-in spacers on the bottom face of the calibration object so that the calibration object only contacts the mounting plate in local areas so as to minimize further distortion of the calibration object. In an alternate embodiment, a kinematic mount can be used so as to induce consistent distortion.

Next, in step 620, the procedure 600 automatically computes acquisition parameters by performing the illustrative setup procedure and analyzing measurements. By automatic, it is meant that the setup is commanded by a user in a manner that minimizes the need for particular numerical or parametric input, rendering the setup and calibration process relatively "user-friendly" and free-of the need of significant knowledge or training. Such actions as computing parameters and transforms between coordinate spaces, identifying and measuring features on calibration objects, and the like, are desirably self-contained (and invisible to the user) within the algorithms/processes of the system. As described below, the system and method allows for straightforward operation by a user through navigation of a series of prompts on associated GUI screens.

Figure 8:
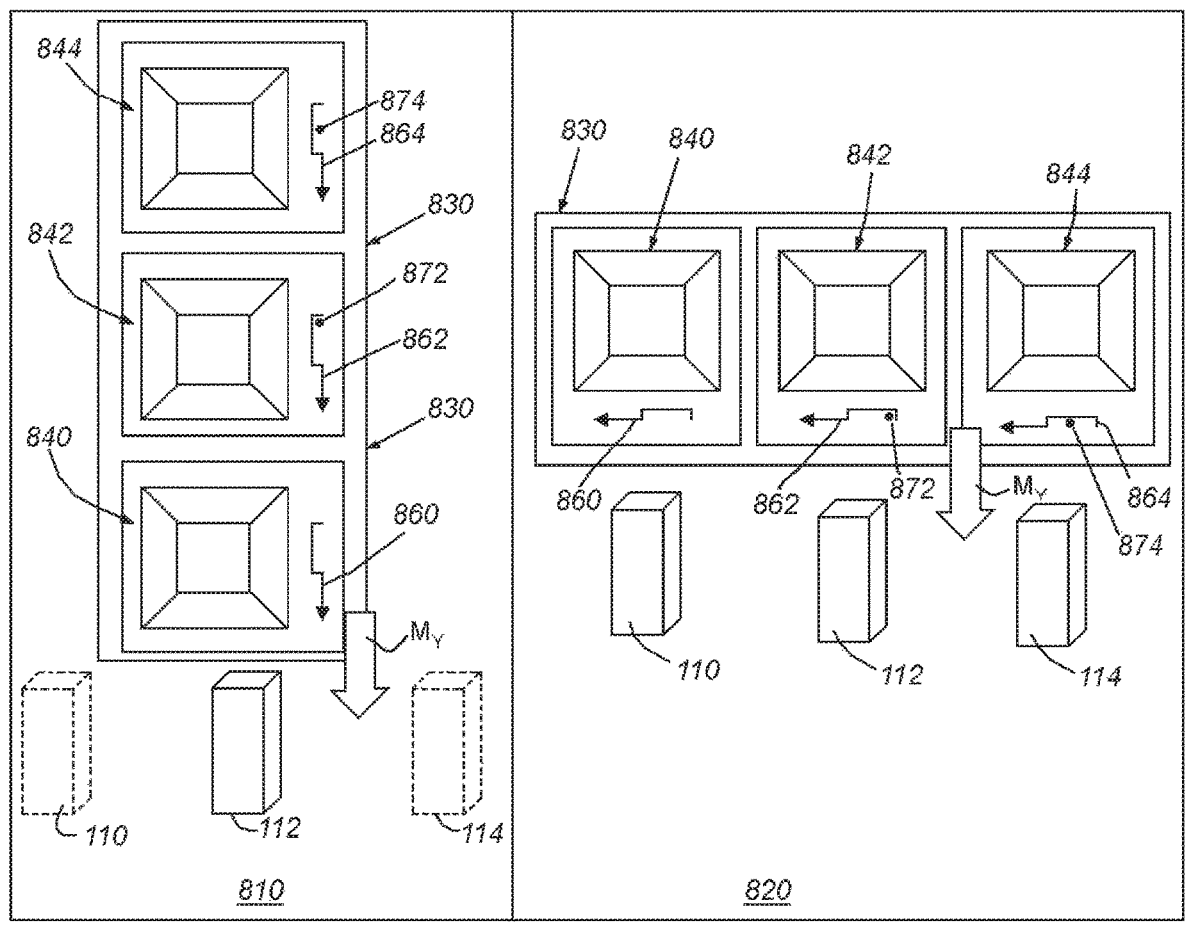
FIG. 8 is a diagram of an exemplary calibration object with a plurality of frustum-shaped subobjects showing scans by a plurality of 3D sensors along a "vertical" alignment and a "horizontal" alignment (relative to the conveyance motion direction) that respectively characterize a measurement and calibration phase of the overall calibration process according to an illustrative embodiment.

In step 630 of procedure 600, the user arranges the calibration object in a manner that allows it to be "scanned" (i.e. imaged by the one or more of the sensor(s)) (note also that the terms "scanned" and "imaged" refer to being measured) during motion of the conveyance a collection of 3D (range) images acquired from one or more displacement sensors (where all of the acquisitions involve the same conveyance) in a plurality of orientations with respect to the FOV(s) of the sensor(s). Note that the scans can alternatively output generic 3D data, and are not limited to particular range images. In an alternate embodiment, the 3D sensor calibration process can acquire and employ 3D point cloud data, instead of 3D (range) image data. With reference to FIG. 8, two separate scans 810 and 820 are shown, each performed by the calibration procedure (step 630). In the first scan 810, one displacement sensor (e.g. sensor 112) views all of the calibration subobjects 840, 842 and 844 (i.e. the entire calibration object 830). As described below, this sensor identifies and registers/aligns features in each subobject in the first scan 810. Then, in the second scan 820, each displacement sensor 110, 112, 114 images a respective calibration subobject 840, 842, 844, and uses the registered features from the first scan to perform a calibration, including the stitching together of each sensor's coordinate space into a common coordinate space. Note that each subobject 840, 842, 844 includes a respective, unique (e.g. printed, engraved, peened, etched and/or raised) fiducial 860, 862, 864. As shown, the fiducial is geometrically patterned to orient the features in each frustum in the subobject. The fiducial can also define a unique shape or include (or omit as in fiducial 860) a uniquely positioned and/or shaped indicia (e.g. dots 872, 874 in respective fiducials 862 and 864). As shown, the dots are omitted and/or positioned at various locations along the length of the fiducial to define respective subobjects. Alternatively, (e.g.) unique numbers can be used to identify each subobject, which are recognized by appropriate vision tools during the scan(s). More generally, the calibration object and subobjects can include markings, which disambiguate the otherwise symmetric and substantially identical calibration subobjects. These markings also indicate the handedness of the calibration subobjects, as well as providing a mechanism by which the system can uniquely identify each subobject. In an embodiment, a space/location can be provided on each subobject and a plurality of unique fiducial labels can be applied to each subobject on the calibration plate at the time of plate assembly (i.e. step 610 above).

Figure 9:
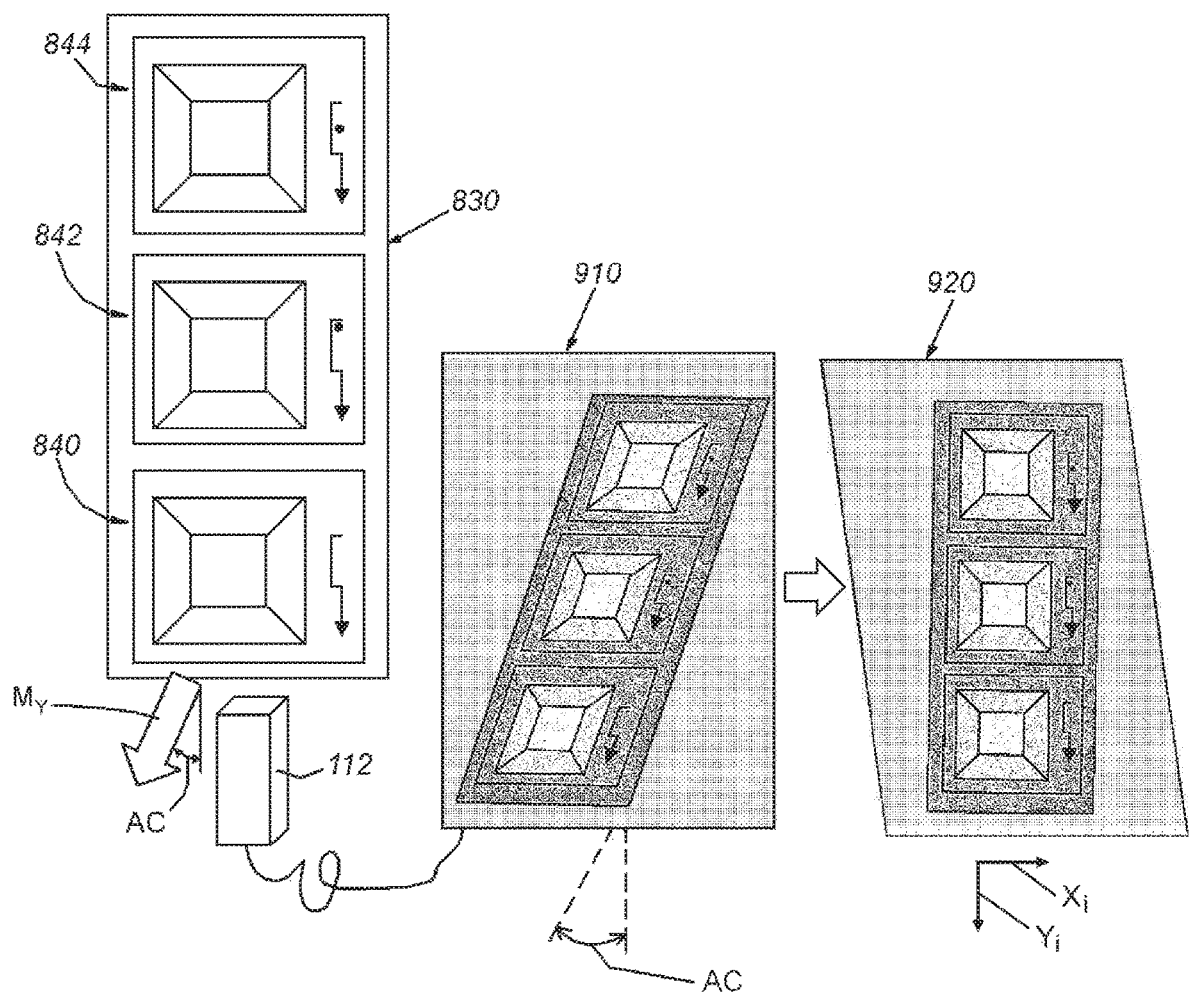
FIG. 9 is a diagram showing the scan of a skewed version of a "vertical" alignment to generate a skewed image that is subsequently rectified by the illustrative calibration process.

As part of the first scan, and as described further in FIG. 9, the calibration object 830 can be directed through the field of view of the 3D sensor (e.g.) 112 at a skew AC, as indicated by the conveyance motion arrow (vector) My in the Phys3D space. Thus, the conveyance and/or object need not be accurately aligned with the displacement sensor. In this case, the calibration process can be used to generate rectified, physically accurate measurements regardless of the conveyance direction (or magnitude). Hence the acquired image 910, with skew AC is rectified so that the object appears aligned with the sensor (i) coordinate space (i.e. Yi, Xi, Zi). In some displacement sensor systems, the user specifies the magnitude of the conveyance motion (for example, 0.010 millimeters per encoder tick) and this user-specified number may be incorrect. Notably, measurements extracted from acquired 3D images can be corrected by making use of the displacement sensor factory calibration information—by transforming the measurements according to the calibration transforms between the acquired range images and physically accurate coordinates.

It is expressly contemplated that the measurement step(s) (i.e. the first "scan" herein) can be omitted in various embodiments where the measurements of 3D features are available from a data file—for example based upon factory-provided data for the calibration object and/or a coordinate measuring machine (CMM) based specification of the object. In such cases, the measurement data is provided to the calibration step described below for use in the concurrent calibration of the 3D sensors.

In step 640 of the procedure 600 (FIG. 6), the system concurrently registers individual positions of subobject features in each sensors' 3D image. In this example, the calibration subobjects include planar features, and each group of three adjacent planes are intersected to measure 3D feature positions. In this example, each plane is measured from 3D data corresponding to a specified region of the calibration object, and by way of further example, those specified regions can be arranged so as to include data from the planar region, and exclude data not part of the planar region, and also exclude data relatively distant from the frustum. Each exemplary four-sided pyramidal (frustal) subobject, thus, yields eight 3D points. Measurement of 3D points from planes is known to those of skill in the art and various processes, modules and tools are available to perform such functions on an acquired 3D (range) image. For example, such tools are available from Cognex Corporation of Natick, Mass. In an embodiment, the measured regions used to measure the planes (which are used to measure the 3D feature positions) are symmetric on the calibration subobject. This is so that the measured 3D feature positions are unbiased with respect to the presentation of the calibration subobject.

Figure 10:
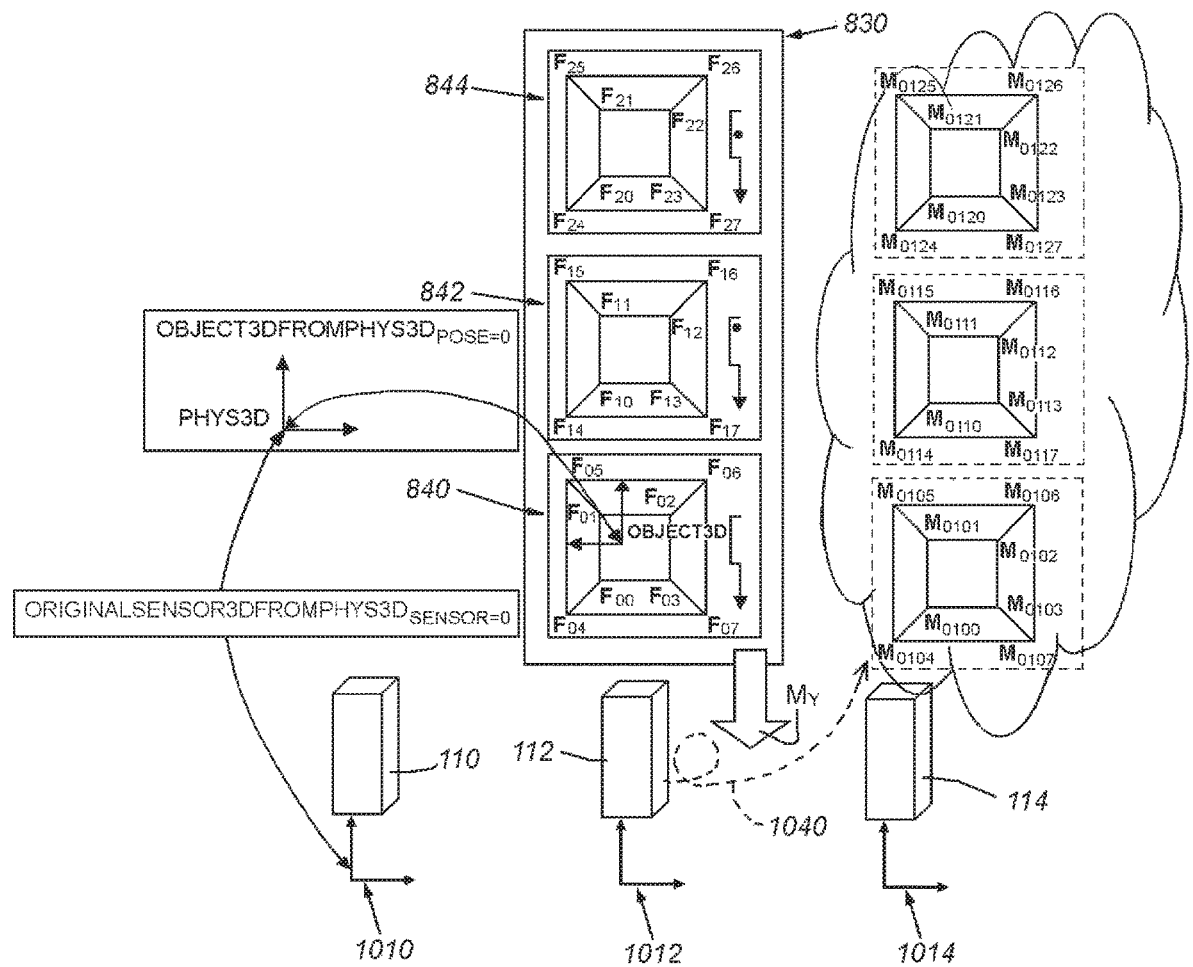
FIG. 10 is a diagram showing a physical calibration object with associated features (e.g. corners) defined by intersecting planes in a physical 3D coordinate space, transformed to a local sensors image coordinate space according to the illustrative calibration process.

Referring to FIG. 10, The sensors 110, 112, 114 are each shown with associated, respective coordinate space Original Sensor $3D_{Sensor=0}$, Original Sensor $3D_{Sensor=1}$, Original Sensor $3D_{Sensor=2}$ (i.e. axes 1010, 1012, 1014). The object 830 includes exemplary feature calibration object physical feature positions in Object3D space (e.g. corners on each subobject (840, 842, 844)), $F_{00}$-$F_{07}$ for subobject 840, $F_{10}$-$F_{17}$ for subobject 842 and $F_{20}$-$F_{27}$ for subobject 844. These are transformed (dashed arrow 1040) for each sensor as shown into the respective measured feature positions (e.g.) $M_{0100}$-$M_{0107}$, $M_{0110}$-$M_{0117}$ and $M_{0120}$-$M_{0127}$. In an embodiment, the feature detection tool/process checks that the same patches of the subobject are used in measuring the feature positions. The feature detection process estimates the portions of the 3D (range) image that correspond to each face of the measured frusta. Based on each face's expected region in the range image, the feature detection process counts the number of range image pels which were actually used to estimate the plane of that face. The feature detection process then computes the proportion of range image pels used to measure each face, which is equal to the number of range image pels used to estimate a plane divided by the number of range image pels in the region corresponding to that face. That proportion of the expected measurement regions which are used to estimate each plane of the frustum is compared to a proportion tolerance so that only almost completely measured features are used for the calibration computation. This occurs so that the 3D sensor calibration is invariant to the planarity/nonplanarity of each subobject. Such invariance is achieved because the same planar regions, and thereby 3D feature points, are used to measure each frustum plane during all scans of the displacement sensor calibration. In a further embodiment, the region measured for each subobject ignores the corners of the bottom feature when computing the proportion-used ratio for the goal of ignoring the corners is that these corners are the most likely to extend outside the associated 3D sensor's measurement region (and therefore cause the illustrative tolerance check to fail). It is desirable to achieve measurement consistency, which can be more effectively attained by omitting certain 3D image pels in the process.

With reference to the definitions above, the measured feature positions $M_{scan,sensor,subobject,feature}$ are measured in OriginalSensor3D coordinates. These are the measured feature positions of the calibration subobjects detected by the feature detector for each of 3D sensors for each of the scans.

With reference now to step 650 of the procedure 600 (FIG. 6), the system computes the displacement sensor calibration (i.e. the "field calibration") for all sensors concurrently by estimating sensor configuration parameters. Based on the given measured feature positions $M_{scan,sensor,subobject,feature}$, the 3D sensor calibration involves estimating the following parameters:

Calibration object physical feature positions $F_{frusta,feature}$
Object3DFromPhys3D$_{Pose=p}$
OriginalSensorXZ3DFromPhys3D$_{Sensor=i}$
MotionVectorInPhys3D Note that, for each sensor i, OriginalSensor3DFromPhys3D$_{Sensor=i}$ computed by combining the x and z axes of OriginalSensorXZ3DFromPhys3D$_{Sensor=i}$ with the y axis of MotionVectorInPhys3D. It follows:

$$Phys3DFromOriginalSensorXZ3D_{Sensor=i} = \begin{bmatrix} a & b & c & tx \\ d & e & f & ty \\ g & h & i & tz \end{bmatrix}$$

Phys3DFromOriginalSensorXZ3D$_{Sensor=i}$*(x,y,z)= (a*x+b*y+c*z+tx,d*x+e*y+f*z+ty,g*x+h*y+i*z+tz)

MotionDirectionInPhys3D=(mx,my,mz)

$$Phys3DFromOriginalSensor3D_{Sensor=i} = \begin{bmatrix} a & mx & c & tx \\ d & my & f & ty \\ g & mz & i & tz \end{bmatrix}$$

Phys3DFromOriginalSensor3D$_{Sensor=i}$*(x,y,z)=(a*x+mx*y+c*z+tx,d*x+my*y+f*z+ty,g*x+mz*y+i*z+tz)

OriginalSensorXZ3DFromPhys3D$_{Sensor=I}$= Phys3DFromOriginalSensorXZ3D$_{Sensor=i}^{-1}$ OriginalSensor3DFromPhys3D$_{Sensor=I}$= Phys3DFromOriginalSensor3D$_{Sensor=i}^{-1}$ Note, in some embodiments, for selected sensors, where the vector cross product of the selected sensor's X and Z coordinate axes has a negative dot product with the measured y-coordinate motion direction, the negative of the MotionDirectionInPhys3D is treated as the y axis for that some sensor's OriginalSensorXZ3D. The calibration object physical feature positions $F_{frusta,feature}$ are characterized by 3D points (x,y,z) for each feature. All but the first three feature positions are characterized by three numbers. Note that the first three feature positions herein illustratively define a canonical coordinate space, and, as such, their values are constrained. The feature points define a canonical coordinate space so that the Phys3D coordinate space constrains the feature pose; otherwise, if the feature positions were unconstrained, then the Phys3D coordinate space would be redundant with respect to the object coordinate space because the Phys3D coordinate space could be traded off against the feature positions. Illustratively, the first three calibration feature vertex positions are constrained (so that there are no redundant degrees of freedom). For example, the first vertex position is (0,0,0). The second vertex position is (x1,0,0) and the third vertex position is (x2,y2,0). In this manner, the calibration feature object illustratively defines a reference plane for further calibration computation steps.

Except for the first pose, p==0, the object poses Object3DFromPhys3D$_{Pose=p}$ each have six degrees of freedom (since they characterize 3D rigid transforms). Each object pose Object3DFromPhys3D$_{Pose=p}$ is characterized by three-value quaternion, and an identifier specifying which quaternion value is 1 (or −1), and a 3D vector characterizing the 3D translation. The first pose is constrained to be the identity transform so that the Phys3D coordinate space is not redundant (where, illustratively, gradient descent solvers have difficulty when there are redundant degrees of freedom). Three value quaternions characterize three of the four quaternion values where the characterization also includes an identifier which says which quaternion is fixed (to either +1 or −1) (recall that quaternions are classically characterized by four homogeneous values where p2+q2+r2+s2==1). The use of three quaternion values and an identifier to characterize the 3D rotation is known to those of skills. By way of useful background information refer to U.S. Pat. No. 8,111,904, entitled METHODS AND APPARATUS FOR PRACTICAL 3D VISION SYSTEM, by Aaron S. Wallack, et al., the teachings of which are incorporated herein by reference.

The sensor poses OriginalSensorXZ3DFromPhys3D$_{Sensor=I}$ are each characterized by eight (8) values, including an x scale and a y scale, as well as a rigid transform. In an embodiment, each 3D sensor pose OriginalSensorXZ3DFromPhys3DSensor is characterized by a 3D vector for the x axis and a 2D vector for the z axis (where one of the coefficients is derived from the x axis and the two components of the z axis to arrive at a dot-product of 0 and an identifier saying which value the z axis is missing), and the y axis is computed as the unit length cross product of the z axis and the x axis, and the translation is a 3D vector characterized by three numbers. In another embodiment, each 3D sensor pose OriginalSensorXZ3DFromPhys3DSensor is characterized by a three-value quaternion, an identifier specifying which quaternion value is 1 (or −1), a 3D vector characterizing the 3D translation, and two additional numbers (one number for x scale and one number for z scale). In addition, the 3D vector MotionVectorInPhys3D has three independent degrees of freedom, and is characterized by three numbers.

Figure 11:
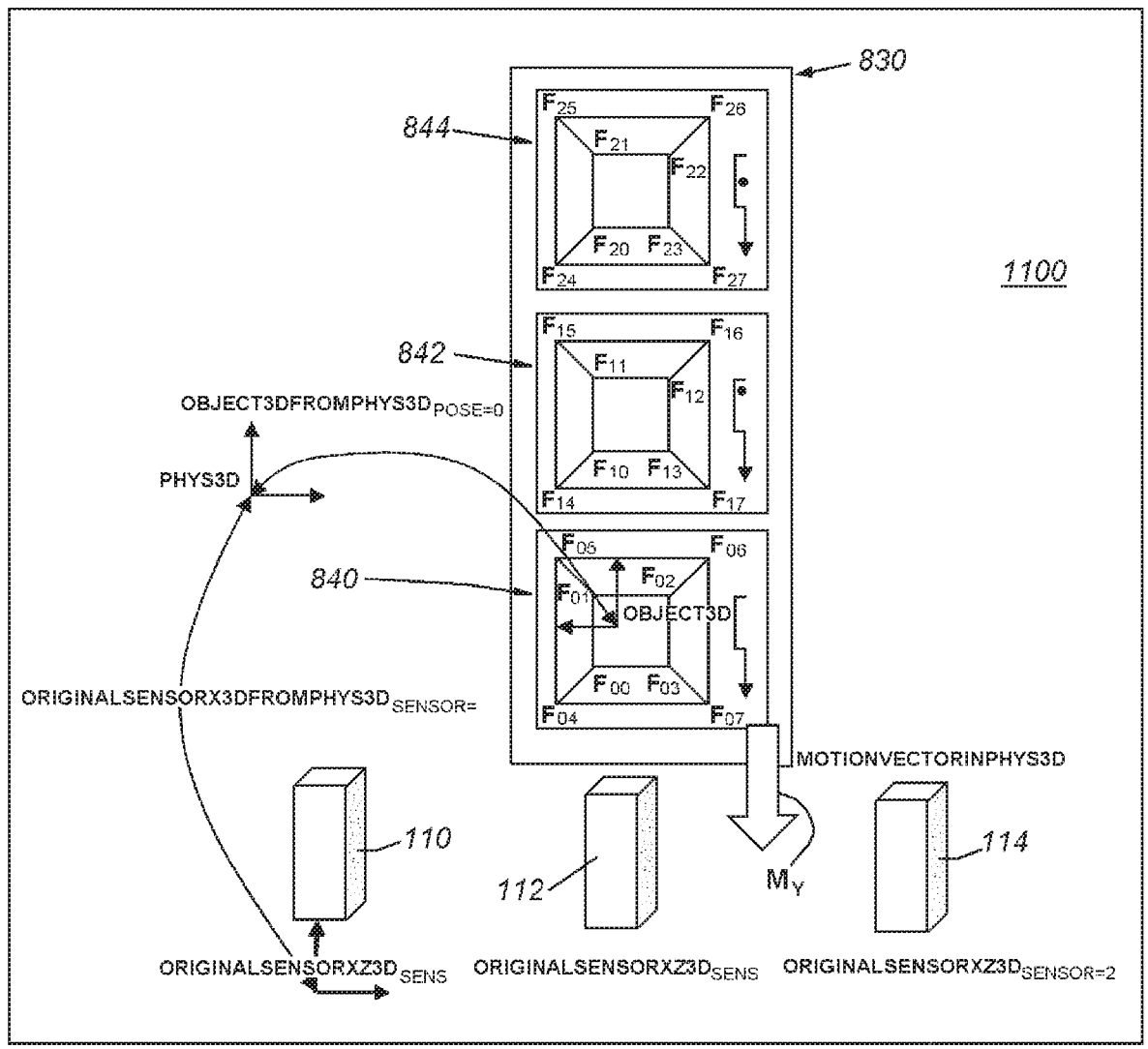
FIG. 11 is a diagram of the calibration object of FIG. 10 showing the associated features and transforms therein.

FIG. 11 is a further diagram 1100 showing the parameters associated with a physical calibration object 830 composed of at least three sub-objects 840, 842, 844.

In an embodiment, the 3D sensor calibration parameters can be estimated via least squares analysis. In an alternate embodiment, the 3D sensor calibration parameters can be estimated via sum of absolute differences. In another embodiment, the 3D sensor calibration parameters are estimated via minimizing the maximum error. Other numerical approximation techniques for estimating calibration parameters should be clear to those of skill. For an embodiment that estimates the calibration using least squares analysis for each measured feature position, the system computes its estimated feature position based on the parameters and then computes the difference between the estimated feature position and the corresponding measured feature position. The system then computes the square of the length of that difference (e.g. by dot-producting that difference vector with itself). All squared differences are then summed to compute a sum-of-squared differences (including contributions from all measured feature positions). This approach assumes that the parameters which induce the minimum sum-of-squares difference is the optimal 3D sensor calibration. Least squares analysis assumes that there is one particular set of parameters which induces the minimum squared error. For an embodiment employing the sum of absolute differences, the total error is computed as the sum of the absolute differences, and the parameters which induce the minimum sum of absolute differences provides an optimal 3D sensor calibration. For an embodiment employing the minimized maximum error, the parameters which induce the minimum maximum discrepancy provide optimal 3D sensor calibration.

Least squares analysis characterizes the sum squared error by an error function of the parameters given the measured feature points i.e., $E(\ldots|M)=E$(Calibration object physical feature positions $F_{frusta,feature}$ [0 . . . X1], Object3DFromPhys3D$_{Pose=p}$,[0 . . . X2], OriginalSensorXZ3DFromPhys3D$_{Sensor=I}$ [0 . . . X3], MotionVectorInPhys3D|M$_{scan,sensor,subobject,feature}$) (the nomenclature [0 . . . num X] signifies that the error function includes multiple instances of each set of variables—one for each of the unknowns and the nomenclature "|M" signifies that the error function is a function of the measured features, M, but those measurements are not variables). Iterative methods are used to find the parameters which minimize $E(\ldots|M)$. The parameters which induce the minimum error characterizes the 3D sensor calibration.

Figure 12:
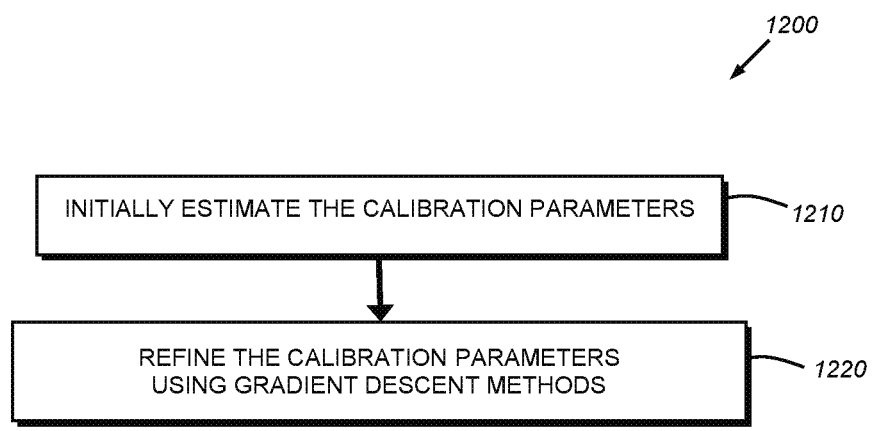
FIG. 12 is a flow diagram showing an illustrative procedure for refining calibration parameters using exemplary gradient descent techniques/methods.

FIG. 12 described a basic procedure 1200 for refining calibration parameters using gradient descent techniques. In step 1210, the system initially estimates the calibration parameters. The parameters are then refined in step 1220 using appropriate gradient descent techniques as described herein. For robustness, an illustrative embodiment includes refining the parameters using numerically computed derivatives (such as Levenberg-Marquardt gradient descent). A further embodiment can include performing the refinement using different step sizes (for the numerically computed derivative) to increase the probability of arriving at the global solution. Another embodiment can include running the refinement more than once, in an iterative manner, and for each run, employing a different set of step sizes, and then comparing the errors $E(\ldots|M)$ induced by the estimated parameters, and selecting the parameters which induced the lowest error $E(\ldots|M)$.

In various embodiments, the user specifies (in an embodiment, using the GUI, in other embodiments, via a stored file, and in further embodiments, via information encoded in the scene which is extracted from 3D data in a scan) the calibration object feature positions and these values are used, but not estimated. In these embodiments, the error function depends on the measured feature positions and the specified feature positions, but those measurements are not variables . . . , $E(\ldots|M,F)=E$(Object3DFromPhys3D$_{Pose=p}$,[0 . . . X1], OriginalSensorXZ3DFromPhys3D$_{Sensor=I}$ [0 . . . X2], MotionVectorInPhys3D|M$_{scan,sensor,subobject,feature}$, $F_{frusta,feature}$)

The estimated feature position can be computed in accordance with the following illustrative steps. Given a 3D feature position $F_{frusta,feature}$ (specified in Object3D coordinates) corresponding to scan pose p and sensor i, the first step is to compute that feature position in Phys3D coordinates by mapping it using the inverse of the Object3DFromPhys3D$_{Pose=p}$ transform to compute FPhys3D$_{frusta,feature}$:

FPhys3D$_{frusta,feature}$ (Object3DFromPhys3D$_{Pose=p}$)−1*F$_{frusta,feature}$. In the next step, the system computes the intersection plane in Phys3D, which involves mapping the sensorXZ's origin to Phys3D coordinates and mapping its y-axis (normal to its plane) to Phys3D coordinates.

SensorXZPhys3D$_{origin}$=(OriginalSensorXZ3DFromPhys3D$_{Sensor=I}$)−1*(0, 0, 0)

SensorXZPhys3D$_{yAxis}$=(OriginalSensorXZ3DFromPhys3D$_{Sensor=I}$)−1*(0, 1, 0)−SensorXZPhys3D$_{origin}$ The y-coordinate of the intersection corresponds to how many instances of motionVectorPhys3D must be added to the feature position in order to intersect the sensor plane. A 3D point traveling along direction motionVectorPhys3D changes its dot product with SensorXZPhys3D$_{yAxis}$ at a rate of (motionVectorPhys3D dot (SensorXZPhys3D$_{yAxis}$)). Originally the point FPhys3D$_{frusta,feature}$ differed in dot product from the plane SensorXZPhys3D$_{yAxis}$ by a value of (FPhys3D$_{frusta,feature}$−SensorXZPhys3D$_{origin}$) dot (SensorXZPhys3D$_{yAxis}$)), therefore the 3D moves by the following number of instances of motionVectorPhys3D to intersect the plane:

numInstances=((FPhys3D$_{frusta,feature}$−SensorXZPhys3D$_{origin}$) dot (SensorXZPhys3D$_{yAxis}$)))/motionVectorPhys3D dot (SensorXZPhys3D$_{yAxis}$))

After those instances, the feature position intersects the plane at the intersectionPoint, intersectionPoint=FPhys3D$_{frusta,feature}$+numInstances*motionVectorPhys3D in Phys3D coordinates.

The intersection point in OriginalSensor3D coordinates can be computed by mapping through the transform OriginalSensor3DFromPhys3D$_{Sensor=I}$.

Figure 13:
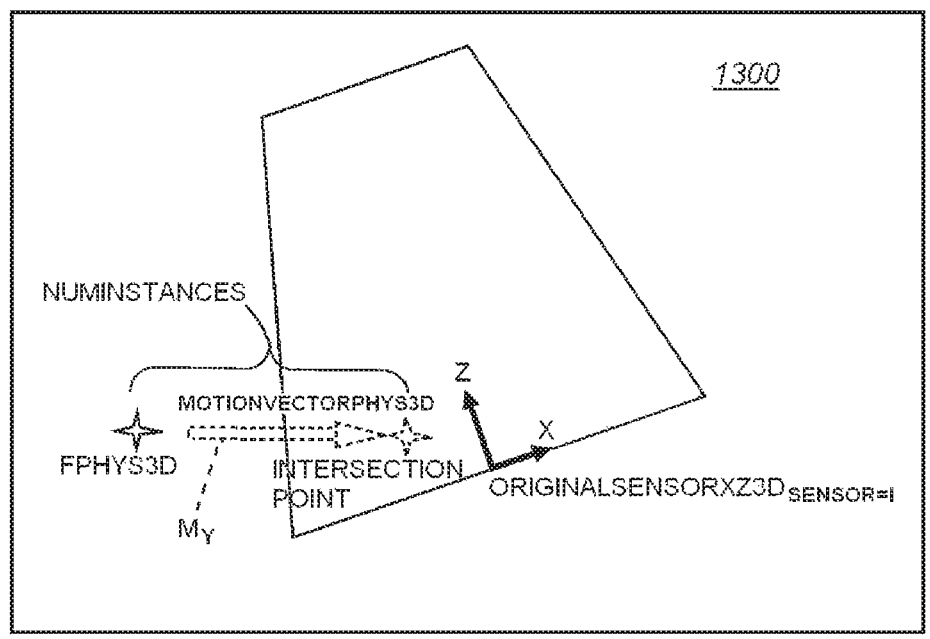
FIG. 13 is a diagram showing the expected measured feature position according to the illustrative calibration process.

Note that this mapping is linear for a given set of parameters, and it follows that the mapping OriginalSensor3DFromPhys3D$_{Sensor=I}$ is a linear transform and computable from OriginalSensorXZ3DFromPhys3D$_{Sensor=I}$ and MotionVectorPhys3D. The multiplicative factor 1/motionVectorPhys3D dot (SensorXZPhys3D$_{yAxis}$) is constant for a given parameter set. FIG. 13 is a diagram 1300 of the measured feature position based on numInstances described above.

The overall error function, E( . . . |M) characterizes the sum-square of the discrepancies between the measured feature positions and the estimated feature positions. Each measured feature position ($M_{scan,sensor,subobject,feature}$) is measured in its respective sensor's OriginalSensor3D coordinates. Each calibration object feature position is originally specified in Object3D coordinates. In order to compare each corresponding pair of positions, they must first be transformed into consistent coordinates. For the embodiment where the errors are measured in each sensor's OriginalSensor3D coordinates, the feature positions (which are originally specified in Object3D coordinates) are transformed into OriginalSensor3D coordinates by mapping through the Phys3DFromObject3D$_{Pose=p}$ transform, which is the inverse of the Object3DFromPhys3D$_{Pose=p}$ transform and then mapping through the transform OriginalSensor3DFromPhys3D$_{Sensor=i}$.

$$E( \ldots |M) = E_{OriginalSensor3D}( \ldots |M) =$$
$$\mathrm{Sum}|(M_{scan,sensor,subobject,feature} -$$
$$(\mathrm{OriginalSensor3DFromPhys3D}_{Sensor=I})^*$$
$$(\mathrm{Object3DFromPhys3D}_{Pose=p})^{-1} * F_{frusta,feature})|^2$$

In an embodiment that measures the error in each sensor's OriginalSensor3D coordinates, the advantage of measuring the error in each sensor's OriginalSensor3D coordinates is that coordinates are not scaled because they are tied to measured feature positions. The disadvantage of measuring the error in each sensor's OriginalSensor3D coordinates is that the coordinates are not necessarily physically accurate or orthonormal, whereby the measurements in OriginalSensor3D coordinates may be biased by the presentation poses of the calibration object; for each sensor's OriginalSensor3D coordinates, the y coordinates correspond to the magnitude of the conveyance (the motionVectorInPhys3D) whereas the x coordinate and z coordinate were defined by the factory calibration, and the scale of the conveyance magnitude is one of the things that displacement sensor field calibration is estimating.

In another embodiment of the displacement sensor field calibration procedure, the displacement sensor field calibration computation is repeated after estimating the motionVectorInPhys3D and compensated for. Thus, the non-orthogonality of the OriginalSensor3D coordinates is reduced so that the bias due to computing the error in a non-orthonormal coordinate space is reduced. Alternatively, in an embodiment in which the errors are measured in each sensor's Sensor3D coordinates, the measured feature positions are transformed into each sensor's Sensor3D coordinates by mapping them through the coordinate change transform Phys3DFromOriginalSensor3D$_{Sensor=I}$, which is the inverse of OriginalSensor3DFromPhys3D$_{Sensor=i}$. The procedure then maps through the transform Sensor3DFromPhys3D$_{Sensor=i}$. The feature positions (which are originally specified in Object3D coordinates) are transformed into Sensor3D coordinates by mapping through the Phys3DFromObject3D$_{Pose=p}$ transform, which is the inverse of the Object3DFromPhys3D$_{Pose=p}$ transform. The procedure then maps through the transform Sensor3DFromPhys3D$_{Sensor=i}$.

$$E( \ldots |M) = E_{Sensor3D}( \ldots |M) = \mathrm{Sum}|$$
$$((\mathrm{Sensor3DFromPhys3D}_{Sensor=I})^*$$
$$(\mathrm{OriginalSensor3DFromPhys}$$
$$3D_{Sensor=I})^{-1} * M_{scan,sensor,subobject,feature}) -$$
$$(\mathrm{Sensor3DFromPhys3D}_{Sensor=I})^*$$
$$(\mathrm{Object3DFromPhys3D}_{Pose=p})^{-1} * F_{frusta,feature})|^2$$

In an embodiment in which the measured error is measured in Phys3D coordinates, the measured feature positions are transformed into Phys3D coordinates by mapping them through the coordinate change transform Phys3DFromOriginalSensor3D$_{Sensor=I}$, which is the inverse of OriginalSensor3DFromPhys3D$_{Sensor=i}$. The feature positions (which are originally specified in Object3D coordinates) are transformed into Phys3D coordinates by mapping through the Phys3DFromObject3D$_{Pose=p}$ transform, which is the inverse of the Object3DFromPhys3D$_{Pose=p}$ transform.

$$( \ldots |M) = E_{Phys3D}( \ldots |M) = \mathrm{Sum}|$$
$$(((\mathrm{OriginalSensor3DFromPhys}$$
$$3D_{Sensor=I})^{-1} * M_{scan,sensor,subobject,feature}) -$$
$$((\mathrm{Object3DFromPhys3D}_{Pose=p})^{-1} * F_{frusta,feature})|^2$$

Note that the embodiment measuring the error in each sensor's Sensor3D coordinates and the embodiment measuring the error in Phys3D coordinates can be the same because distances are preserved under 3D rigid transforms and Sensor3D and Phys3D are related by a 3D rigid transform.

The following is a further description of the process of estimating initial parameters in view of the above-described error function E( . . . |M). The system and method illustratively employs gradient descent refinement techniques to compute the parameters which minimize E( . . . |M). Gradient descent techniques require an initial set of parameters (to initiate the process). Since the above-described error function can exhibit local minima, it is preferable that the initial parameters be nearby the optimal parameter estimates (because, then, the gradient descent method is more likely to converge on the true minima rather than converge to a local minima).

Illustratively, 3D sensor calibration involves estimating the initial values of the following parameters:

Calibration object physical feature positions;
Object3DFromPhys3D$_{Pose=p}$;
OriginalSensorXZ3DFromPhys3D$_{Sensor=i}$; and
MotionVectorInPhys3D.

Figure 14:
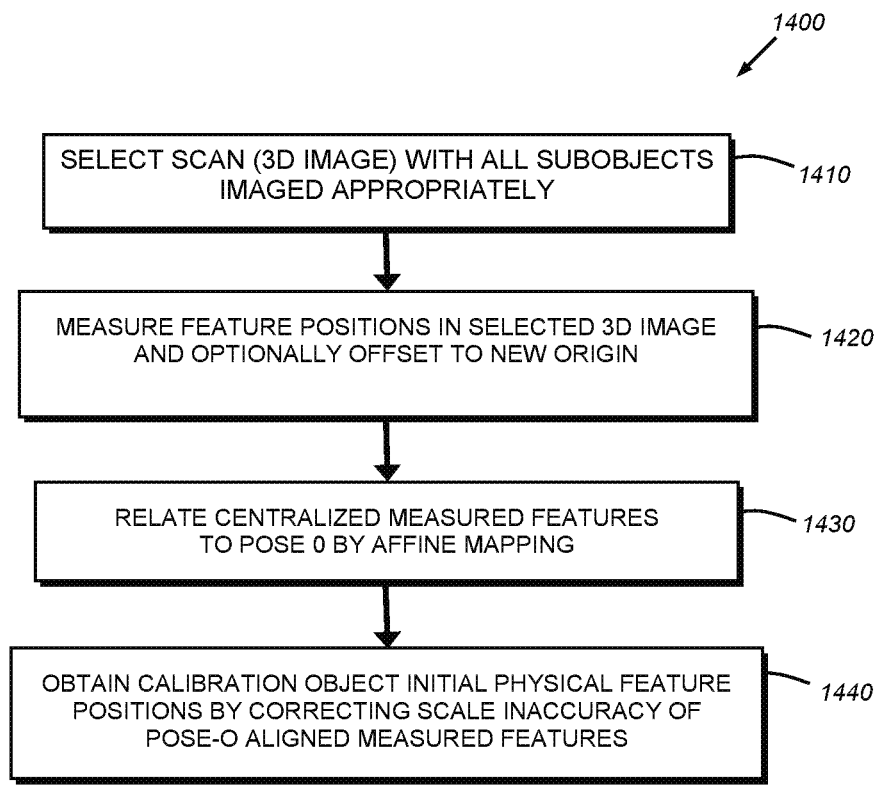
FIG. 14 is a flow diagram showing an illustrative procedure for estimating initial physical feature positions from measured feature positions of the calibration object.

In an embodiment, coarse estimation illustratively mandates that at least one sensor measure of the subobject features in one (i.e. initial) scan. In an alternate embodiment, coarse estimation illustratively mandates that the subobject features should be determinable by combining measurements from multiple scans. In a further embodiment, when multiple subobjects are measured by the same sensor within one scan, each pair of relative positions are computed (up to a linear transform due to the sensing modality), and one set of pairs of relative positions are boot-strapped to induce an estimate of all of the subobject feature positions. A coarse estimation procedure 1400 is shown in further detail with reference to FIG. 14, in which initial physical feature positions are estimated from measured feature positions of the calibration object. First, in step 1410 a scan (with corresponding pose p), or portion of a scan, is selected which includes a 3D (range) image (from sensor i) capturing all subobjects of the calibration object. This can occur by orienting the object "vertically" along the scan direction MotionVectorInPhys3D (My). Next, in step 1420, the feature positions (in OriginalSensor3D$_{Sensor=i}$) from this selected 3D image are measured, and then (optionally) the measured features are offset to determine the new coordinate origin at their average feature position. Then, in step 1430, the procedure 1400 relates the centralized measured features to the pose 0 (used for determining Phys3D) through the affine mapping of the feature positions of the first seen subobject at pose 0. For all of the following, pose 0 characterizes the first scanned pose. If no features are measured by any sensor in that pose, then the scan with minimum index with any measured features is used as pose 0. Next, in step 1440, the procedure obtains calibration object initial physical feature positions by correcting scale-inaccuracy of the pose 0-aligned measured features through an affine transform that is obtained by mapping from the first subobject's measured features to its model features.

Figure 15:
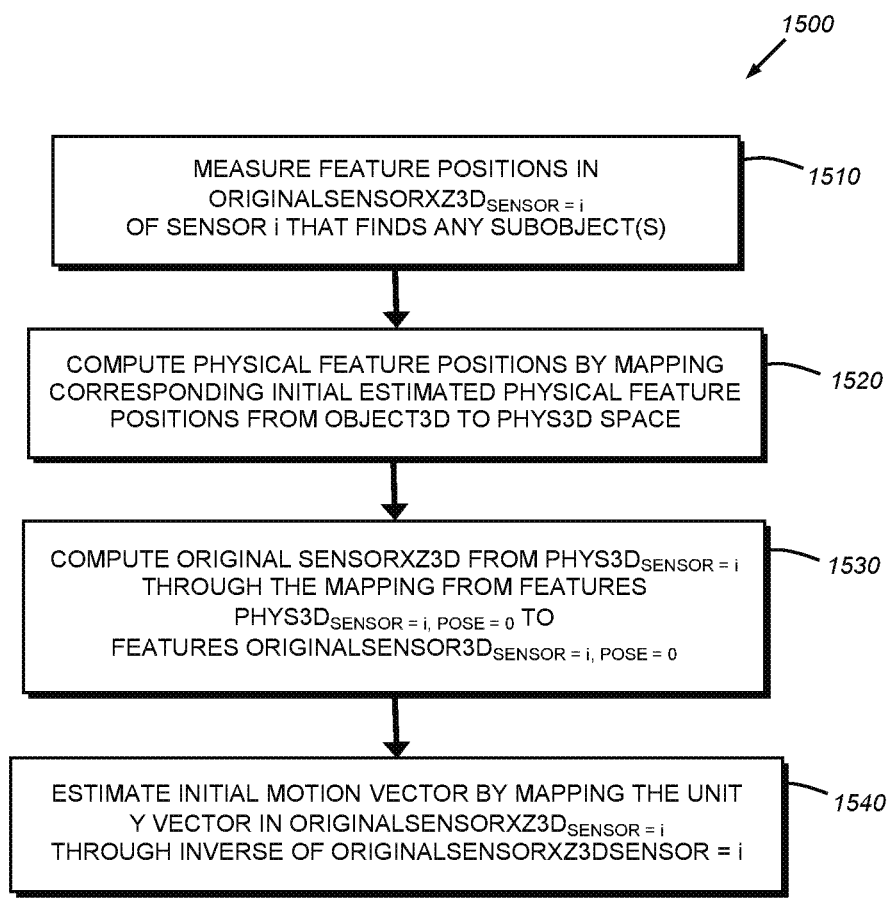
FIG. 15 is a flow diagram showing an illustrative procedure for estimating an initial motion vector for sensor i finding/recognizing any calibration subobject(s) at pose 0.

In an embodiment, the coarse parameter values corresponding to OriginalSensorXZ3D transforms are computed directly, and in this embodiment, transforms corresponding to OriginalSensorXZ3D are combined with the motion vector estimate to induce OriginalSensor3D transforms, where the derived OriginalSensor3D are used for computations. FIG. 15 details a procedure 1500 for estimating the initial motion vector for sensor i finding any subobject(s) at pose 0. In step 1510, the procedure 1500 measures feature positions (FeaturesOriginalSensor3D$_{Sensor=i, Pose=0}$) in OriginalSensorXZ3D$_{Sensor=i}$ of sensor i that sufficiently finds/recognizes any subobject(s) of the calibration object at pose 0. In step 1520, the procedure 1500 then computes physical feature positions (FeaturesPhys3D$_{Sensor=i, Pose=0}$) by mapping corresponding initial estimated physical feature positions from Object3D to Phys3D space (using the user provided Phys3DFromObject3D at pose 0) for the subobject(s) seen by sensor i at pose 0. Next, in step 1530, the procedure 1500 computes OriginalSensorXZ3DFromPhys3D$_{Sensor=i}$ through the mapping from FeaturesPhys3D$_{Sensor=i, Pose=0}$ to FeaturesOriginalSensor3D$_{Sensor=i, Pose=0}$. Then, the initial motion vector is computed in step 1540 by mapping the unit Y vector [0, 1, 0] in OriginalSensorXZ3D$_{Sensor=i}$ through the inverse of OriginalSensorXZ3DFromPhys3D$_{Sensor=i}$ of sensor i.

Figure 16:
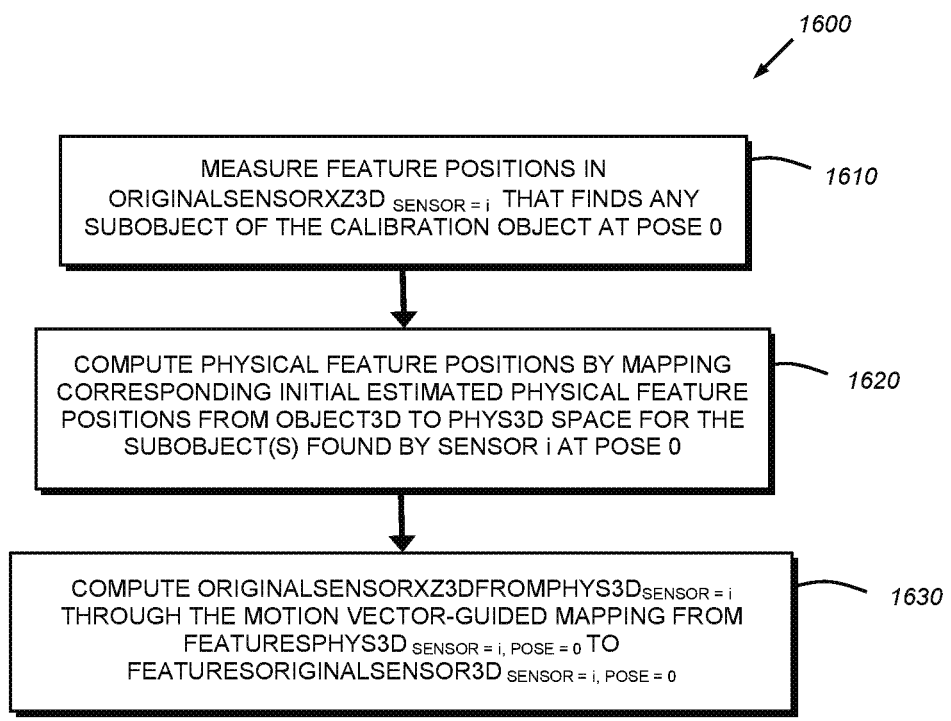
FIG. 16 is a flow diagram showing an illustrative procedure for estimating the initial transform OriginalSensorXZ3DFromPhys3D$_{Sensor=i}$ for exemplary sensor i when finding/recognizing any calibration subobject(s) at pose 0.
Figure 17:
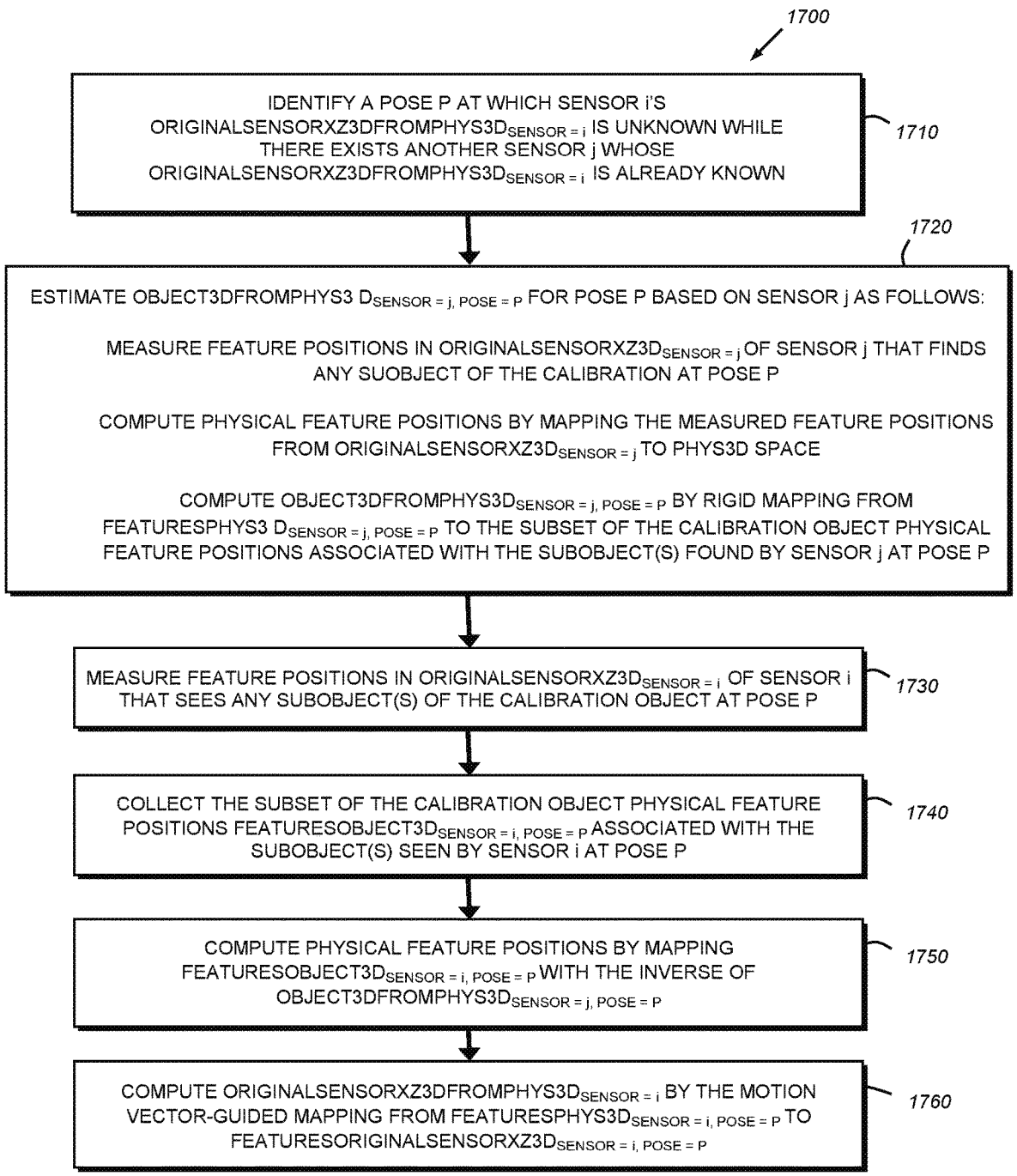
FIG. 17 is a flow diagram showing an illustrative procedure for estimating the initial transform for OriginalSensorXZ3DFromPhys3D$_{Sensor=i}$ for exemplary sensor i when finding/recognizing no calibration subobject at pose 0.

FIG. 16 shows a procedure 1600 for estimating initial OriginalSensorXZ3DFromPhys3D$_{Sensor=i}$ for sensor i assuming that the sensor successfully finds/recognizes any (one or more) subobject(s) at pose 0. In step 1610, the procedure 1600 measures feature positions (FeaturesOriginalSensor3D$_{Sensor=i, Pose=0}$) in OriginalSensorXZ3D$_{Sensor=i}$ of sensor i that finds/recognizes any subobject(s) of the calibration object at pose 0. In step 1620, the procedure then computes the physical feature positions (FeaturesPhys3D$_{Sensor=i, Pose=0}$) by mapping corresponding initial estimated physical feature positions from Object3D to Phys3D space (using the user provided Phys3DFromObject3D at pose 0) for the subobject(s) found/recognized by sensor i at pose 0. Then, in step 1630, the procedure 1600 computes OriginalSensorXZ3DFromPhys3D$_{Sensor=i}$ through the motion vector-guided mapping from FeaturesPhys3D$_{Sensor=i, Pose=0}$ to FeaturesOriginalSensor3D$_{Sensor=i, Pose=0}$. Conversely, in FIG. 17, a procedure 1700 estimates the initial OriginalSensorXZ3DFromPhys3D$_{Sensor=i}$ for sensor i where no subobject is found or recognized at pose 0. In step 1710, the procedure 1700 identifies a pose p (p≠0), at which sensor i's OriginalSensorXZ3DFromPhys3D$_{Sensor=i}$ is unknown while there exists another sensor (j) whose OriginalSensorXZ3DFromPhys3D$_{Sensor=j}$ is already known, either due to initial estimation at pose 0 or from an estimation at an earlier non-zero pose. In step 1720, the procedure 1700 then estimates Object3DFromPhys3D$_{Sensor=j, Pose=p}$ for pose p based on sensor j. This step includes: (a) measuring feature positions (FeaturesOriginalSensor3D$_{Sensor=j, Pose=p}$) in OriginalSensorXZ3D$_{Sensor=j}$ of sensor j that finds/recognizes any subobject of the calibration object at pose p; (b) computing physical feature positions (FeaturesPhys3D$_{Sensor=j, Pose=p}$) by mapping the measured feature positions from OriginalSensorXZ3D$_{Sensor=j}$ to Phys3D space using sensor j's inverse of OriginalSensorXZ3DFromPhys3D$_{Sensor=j}$; and computing Object3DFromPhys3D$_{Sensor=j, Pose=p}$ by rigid mapping from FeaturesPhys3D$_{Sensor=j, Pose=p}$ to the subset of the calibration object physical feature positions associated with the subobject(s) seen by sensor j at pose p. In step 1730, the procedure 1700 then measures feature positions (FeaturesOriginalSensor3D$_{Sensor=i, Pose=p}$) in OriginalSensorXZ3D$_{Sensor=i}$ of sensor i that finds/recognizes any subobject(s) of the calibration object at pose p. The procedure 1700, in step 1740 then collects the subset of the calibration object physical feature positions (in Object3D), FeaturesObject3D$_{Sensor=i, Pose=p}$, associated with the subobject(s) found/recognized by sensor i at pose p. In step 1750, the procedure 1700 computes physical feature positions (FeaturesPhys3D$_{Sensor=i, Pose=p}$) by mapping FeaturesObject3D$_{Sensor=i, Pose=p}$ with the inverse of Object3DFromPhys3D$_{Sensor=j, Pose=p}$. Then, in step 1760 OriginalSensorXZ3DFromPhys3D$_{Sensor=i}$ is computed by the motion vector-guided mapping from FeaturesPhys3D$_{Sensor=i, Pose=p}$ to FeaturesOriginalSensor3D$_{Sensor=i, Pose=p}$.

Figure 18:
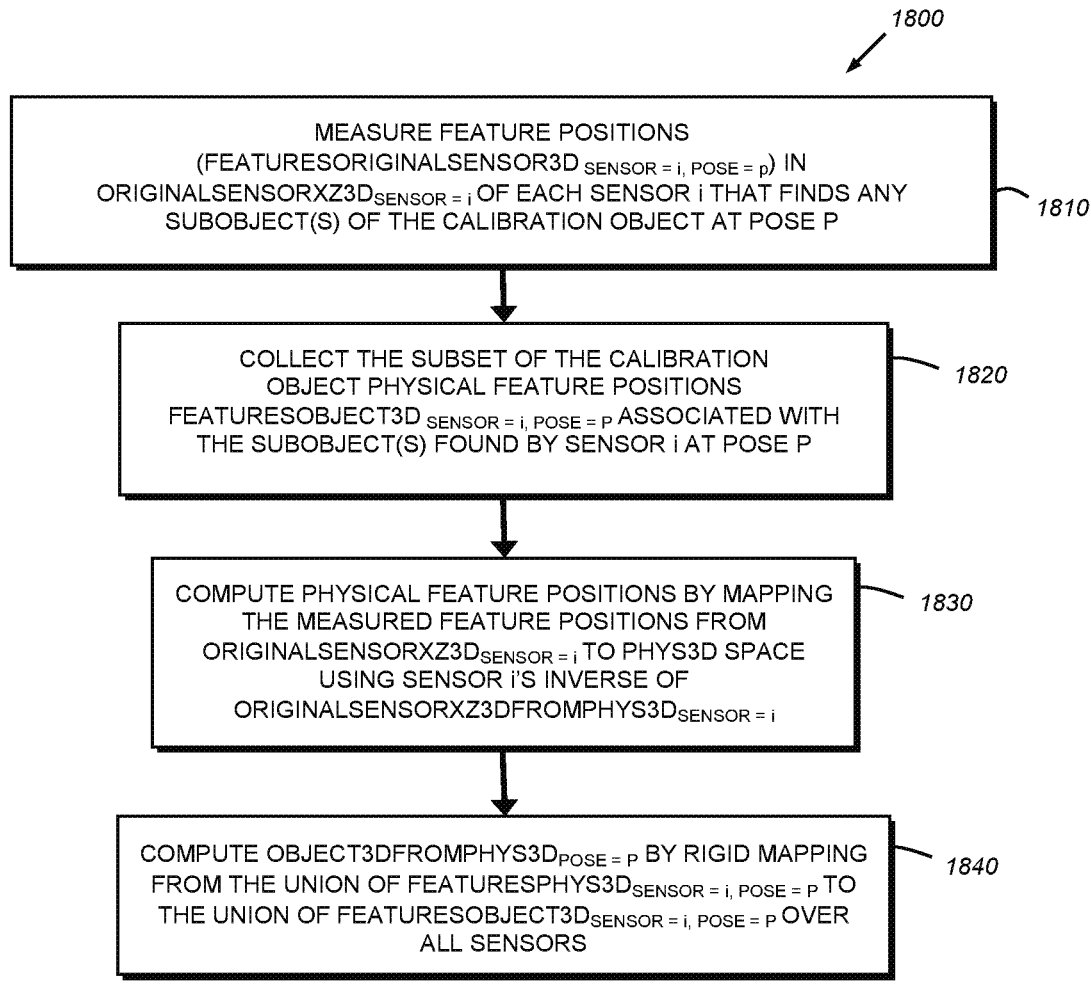
FIG. 18 is a flow diagram showing an illustrative procedure for estimating the transform for estimate initial Object3DFromPhys3D$_{Pose=p}$ for pose p.

FIG. 18 details a procedure 1800 for estimating initial Object3DFromPhys3D$_{Pose=p}$ for pose p. In step 1810, the procedure 1810 measures feature positions (FeaturesOriginalSensor3D$_{Sensor=i, Pose=p}$) in OriginalSensorXZ3D$_{Sensor=i}$ of each sensor (sensor i) that finds/recognizes any subobject(s) of the calibration object at pose p. Then, in step 1820, the procedure 1800 collects the subset of the calibration object physical feature positions (in Object3D), FeaturesObject3D$_{Sensor=i, Pose=p}$, associated with the subobject(s) seen by sensor i at pose p. Next, the procedure, in step 1830, computes physical feature positions (FeaturesPhys3D$_{Sensor=i, Pose=p}$) by mapping the measured feature positions from OriginalSensorXZ3D$_{Sensor=i}$ to Phys3D space using sensor i's inverse of OriginalSensorXZ3DFromPhys3D$_{Sensor=i}$. Then, Object3DFromPhys3D$_{Pose=p}$ is computed in step 1840 by rigid mapping from the union of FeaturesPhys3D$_{Sensor=i, Pose=p}$ to the union of FeaturesObject3D$_{Sensor=i, Pose=p}$ over all sensors.

Figure 15A:
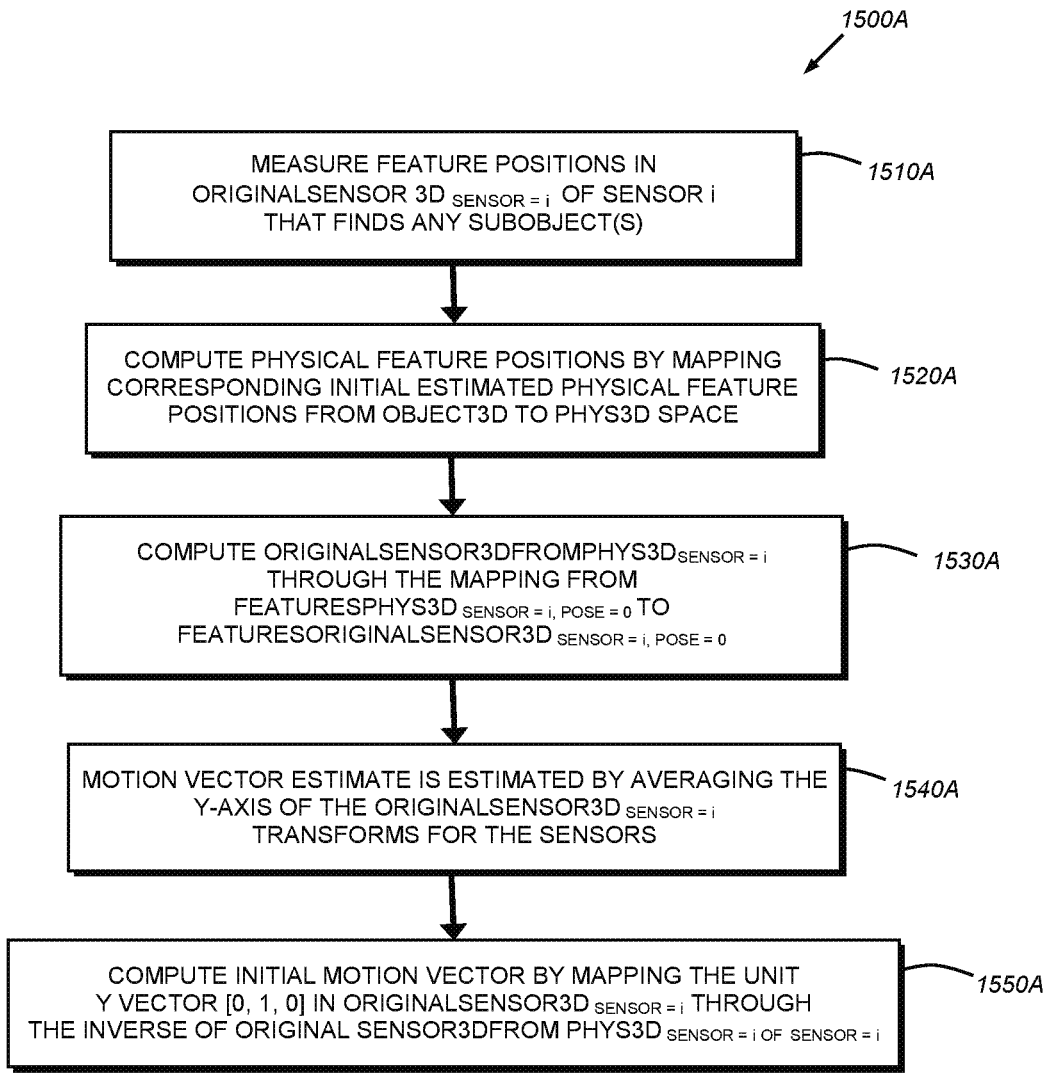
FIG. 15A is a flow diagram showing an alternate embodiment of an illustrative procedure for estimating an initial motion vector for sensor i finding/recognizing any calibration subobject(s) at pose 0.

In an alternate embodiment, the coarse parameter values corresponding to OriginalSensorXZ3D transforms are computed by estimating the OriginalSensor3D transforms, and then estimating the OriginalSensorXZ3D transforms from the OriginalSensor3D transforms. In various embodiments, the OriginalSensorXZ3D transforms are computed from these OriginalSensor3D transforms by replacing the y-axis of this transform with the cross-product of the x-axis and the z-axis. In further embodiments, the motion vector estimate is estimated by averaging the y-axes of the OriginalSensor3D transforms for the sensors. FIG. 15A details a procedure 1500A for estimating the initial motion vector for sensor i finding any subobject(s) at pose 0. In step 1510A, the procedure 1500A measures feature positions (FeaturesOriginalSensor3D$_{Sensor=i, Pose=0}$) in OriginalSensor3D$_{Sensor=i}$ of sensor i that sufficiently finds/recognizes any subobject(s) of the calibration object at pose 0. In step 1520A, the procedure 1500A then computes physical feature positions (FeaturesPhys3D$_{Sensor=i, Pose=0}$) by mapping corresponding initial estimated physical feature positions from Object3D to Phys3D space (using the user provided Phys3DFromObject3D at pose 0) for the subobject(s) seen by sensor i at pose 0. Next, in step 1530A, the procedure 1500A computes OriginalSensor3DFromPhys3D$_{Sensor=i}$ through the mapping from FeaturesPhys3D$_{Sensor=i, Pose=0}$ to FeaturesOriginalSensor3D$_{Sensor=i, Pose=0}$. Then, illustratively, the motion vector estimate is estimated in step 1540A by averaging the y-axes of the OriginalSensor3D$_{Sensor=i}$ transforms for the sensors. In an alternate embodiment, the initial motion vector is computed in step 1550A by mapping the unit Y vector [0, 1, 0] in OriginalSensor3D$_{Sensor=i}$ through the inverse of OriginalSensor3DFromPhys3D$_{Sensor=i}$ of sensor i.

Figure 16A:
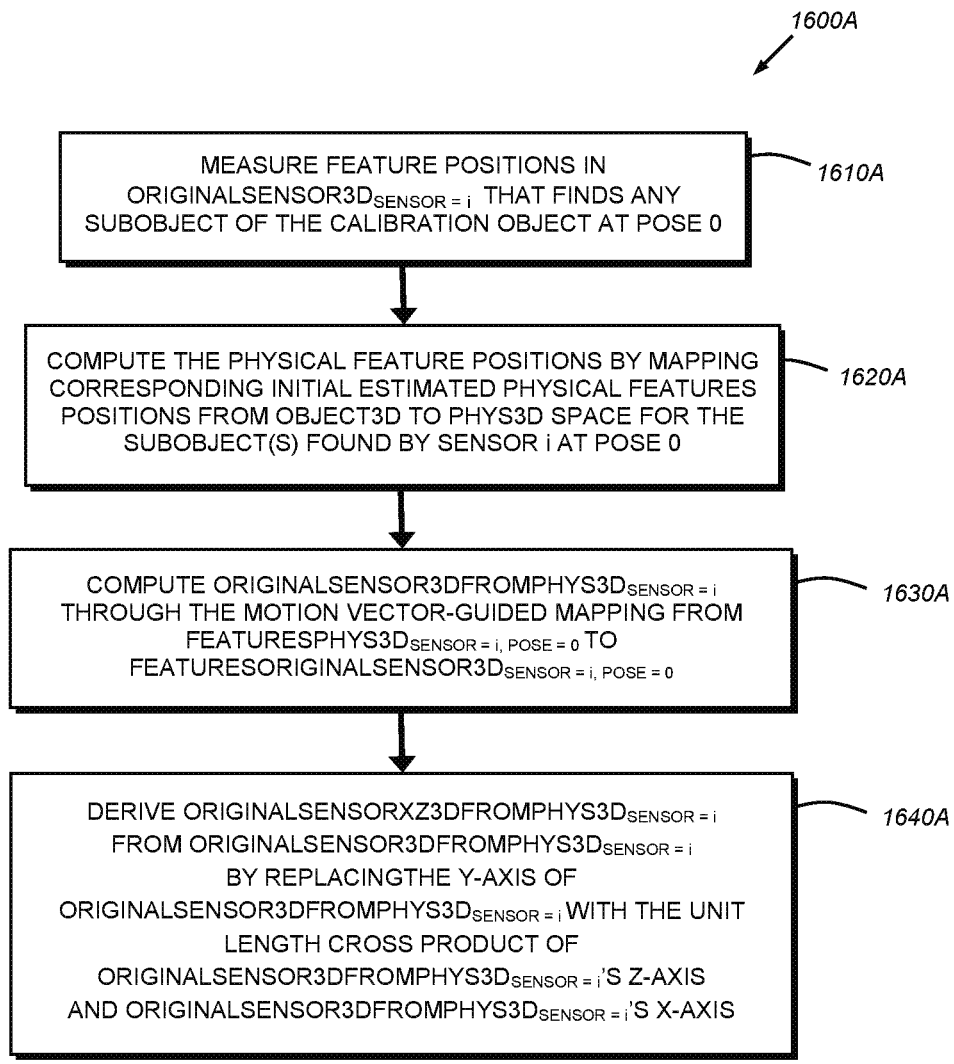
FIG. 16A is a flow diagram showing an alternate embodiment of an illustrative procedure for estimating the initial transform OriginalSensor3DFromPhys3D$_{Sensor=i}$ for exemplary sensor i when finding/recognizing any calibration subobject(s) at pose 0.
Figure 17A:
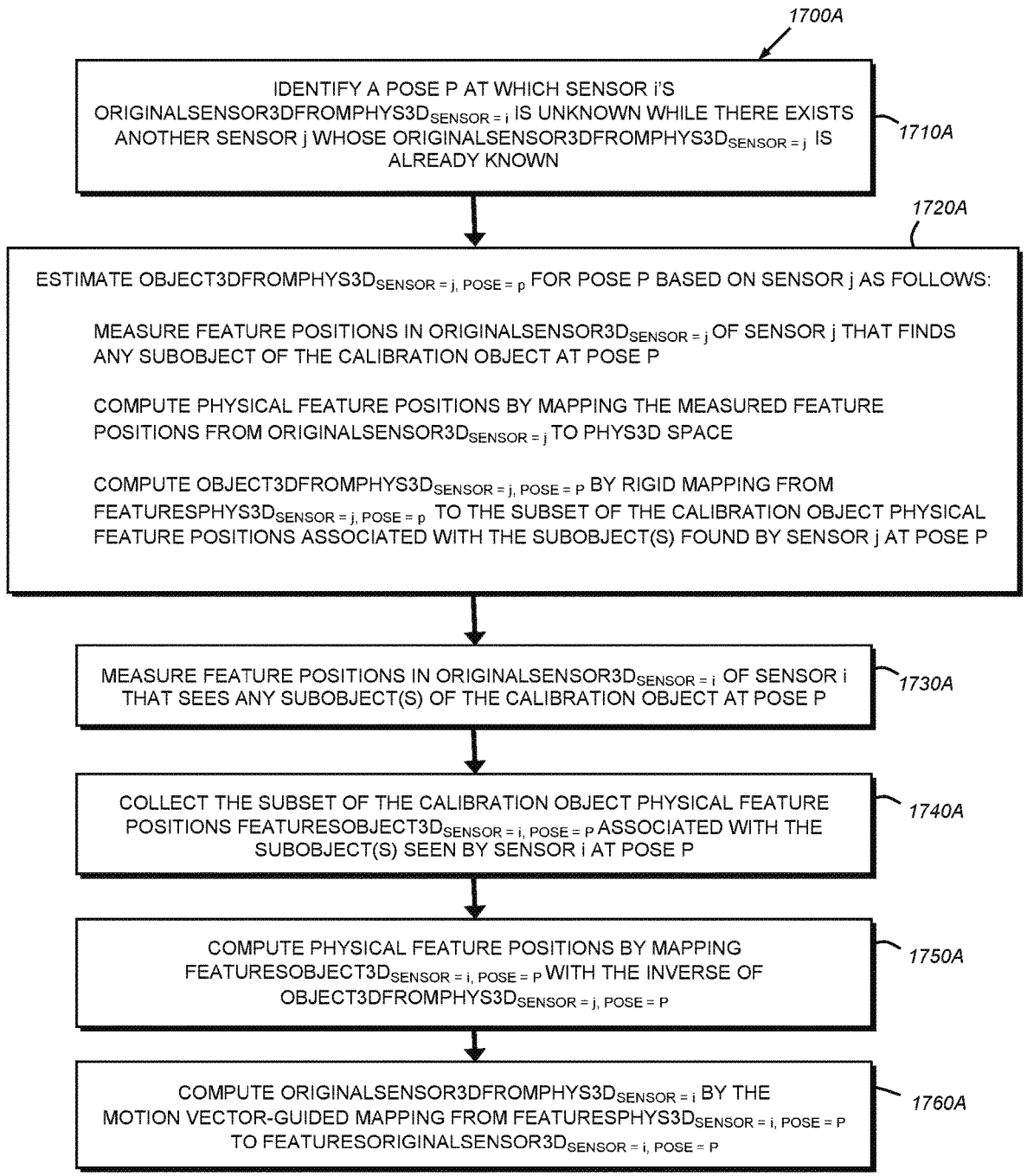
FIG. 17A is a flow diagram showing an alternate embodiment of an illustrative procedure for estimating the initial transform for OriginalSensor3DFromPhys3D$_{Sensor=i}$ for exemplary sensor i when finding/recognizing no calibration subobject at pose 0.

FIG. 16A shows a procedure 1600A according to an alternate embodiment for estimating initial OriginalSensor3DFromPhys3D$_{Sensor=i}$ for sensor i assuming that the sensor successfully finds/recognizes any (one or more) subobject(s) at pose 0. In step 1610A, the procedure 1600A measures feature positions (FeaturesOriginalSensor3D$_{Sensor=i, Pose=0}$) in OriginalSensor3D$_{Sensor=i}$ of sensor i that finds/recognizes any subobject(s) of the calibration object at pose 0. In step 1620A, the procedure then computes the physical feature positions (FeaturesPhys3D$_{Sensor=i, Pose=0}$) by mapping corresponding initial estimated physical feature positions from Object3D to Phys3D space (using the user provided Phys3DFromObject3D at pose 0) for the subobject(s) found/recognized by sensor i at pose 0. Then, in step 1630A, the procedure 1600A computes OriginalSensor3DFromPhys3D$_{Sensor=i}$ through the motion vector-guided mapping from FeaturesPhys3D$_{Sensor=i, Pose=0}$ to FeaturesOriginalSensor3D$_{Sensor=i, Pose=0}$. OriginalSensorXZ3DFromPhys3D$_{Sensor=i}$ is derived in step 1640A from OriginalSensor3DFromPhys3D$_{Sensor=i}$ by replacing the y-axis of OriginalSensor3DFromPhys3D$_{Sensor=i}$ with the unit length cross product of OriginalSensor3DFromPhys3D$_{Sensor=i}$'s z-axis and OriginalSensor3DFromPhys3D$_{Sensor=i}$'s x-axis. Alternately, in FIG. 17A, an illustrative procedure 1700A estimates the initial OriginalSensor3DFromPhys3D$_{Sensor=i}$ for sensor i where no subobject is found or recognized at pose 0. In step 1710A, the procedure 1700A identifies a pose p (p≠0), at which sensor i's OriginalSensor3DFromPhys3D$_{Sensor=i}$ is unknown while there exists another sensor (j) whose OriginalSensor3DFromPhys3D$_{Sensor=j}$ is already known, either due to initial estimation at pose 0 or from an estimation at an earlier non-zero pose. In step 1720A, the procedure 1700A then estimates Object3DFromPhys3D$_{Sensor=j, Pose=p}$ for pose p based on sensor j. This step includes: (a) measuring feature positions (FeaturesOriginalSensor3D$_{Sensor=j, Pose=p}$) in OriginalSensor3D$_{Sensor=j}$ of sensor j that finds/recognizes any subobject of the calibration object at pose p; (b) computing physical feature positions (FeaturesPhys3D$_{Sensor=j, Pose=p}$) by mapping the measured feature positions from OriginalSensor3D$_{Sensor=j}$ to Phys3D space using sensor j's inverse of OriginalSensor3DFromPhys3D$_{Sensor=j}$; and computing Object3DFromPhys3D$_{Sensor=j, Pose=p}$ by rigid mapping from FeaturesPhys3D$_{Sensor=j, Pose=p}$ to the subset of the calibration object physical feature positions associated with the subobject(s) seen by sensor j at pose p. In step 1730A, the procedure 1700A then measures feature positions (FeaturesOriginalSensor3D$_{Sensor=1, Pose=p}$) in OriginalSensor3D$_{Sensor=i}$ of sensor i that finds/recognizes any subobject(s) of the calibration object at pose p. The procedure 1700A, in step 1740A then collects the subset of the calibration object physical feature positions (in Object3D), FeaturesObject3D$_{Sensor=i, Pose=p}$, associated with the subobject(s) found/recognized by sensor i at pose p. In step 1750A, the procedure 1700A computes physical feature positions (FeaturesPhys3D$_{Sensor=i, Pose=p}$) by mapping FeaturesObject3D$_{Sensor=i, Pose=p}$ with the inverse of Object3DFromPhys3D$_{Sensor=j, Pose=p}$. Then, in step 1760A OriginalSensor3DFromPhys3D$_{Sensor=i}$ is computed by the motion vector-guided mapping from FeaturesPhys3D$_{Sensor=i, Pose=p}$ to FeaturesOriginalSensor3D$_{Sensor=i, Pose=p}$.

Figure 18A:
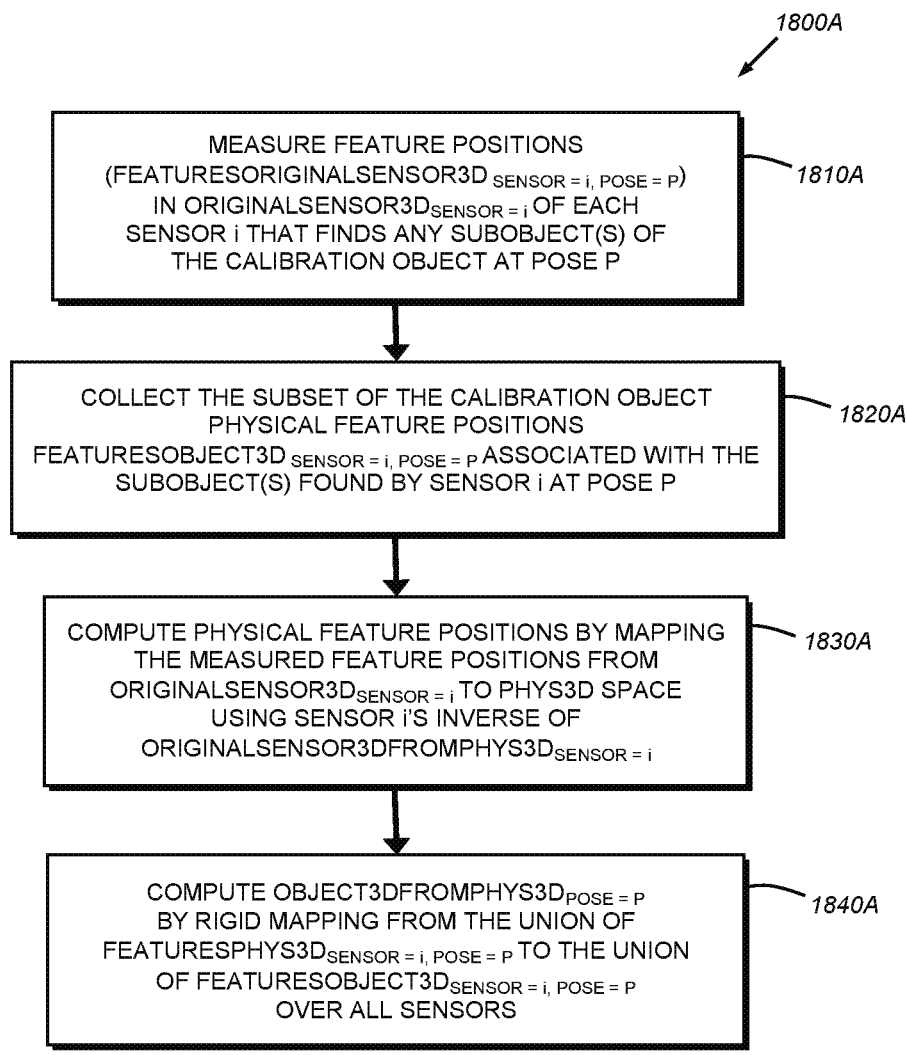
FIG. 18A is a flow diagram showing an alternate embodiment of an illustrative procedure for estimating the transform for estimate initial Object3DFromPhys3D$_{Pose=p}$ for pose p.

FIG. 18A details a procedure 1800A, according to an alternate embodiment, for estimating initial Object3DFromPhys3D$_{Pose=p}$ for pose p. In step 1810A, the procedure 1810A measures feature positions (FeaturesOriginalSensor3D$_{Sensor=i, Pose=p}$) in OriginalSensor3D$_{Sensor=i}$ of each sensor (sensor i) that finds/recognizes any subobject(s) of the calibration object at pose p. Then, in step 1820A, the procedure 1800A collects the subset of the calibration object physical feature positions (in Object3D), FeaturesObject3D$_{Sensor=i, Pose=p}$, associated with the subobject(s) seen by sensor i at pose p. Next, the procedure, in step 1830A, computes physical feature positions (FeaturesPhys3D$_{Sensor=i, Pose=p}$) by mapping the measured feature positions from OriginalSensor3D$_{Sensor=i}$ to Phys3D space using sensor i's inverse of OriginalSensor3DFromPhys3D$_{Sensor=i}$. Then, Object3DFromPhys3D$_{Pose=p}$ is computed in step 1840A by rigid mapping from the union of FeaturesPhys3D$_{Sensor=i, Pose=p}$ to the union of FeaturesObject3D$_{Sensor=i, Pose=p}$ over all sensors. It is contemplated that the transforms employed herein can differ from those described in FIGS. 15-18 and 15A-18A in accordance with skill in the art.

III. User Interface

Before describing further details of the 3D sensor calibration process, reference is made to FIGS. 19A-19M, which show exemplary GUI screen displays for various functions of the 3D (e.g. displacement) sensor calibration process and associated vision system according to an illustrative embodiment. Note that these screen displays are exemplary of a wide variety of possible screens and functions that can be presented to the user, and have been simplified to describe specific functionality of the overall system and process. Thus, additional interface screen displays can be provided for other functions contemplated herein, including, but not limited to, refinement of calibration, system errors, file upload, download and storage, networking, sensor setup, conveyance setup and confirmation of tasks and commands. These additional GUI screens and associated functions can be implemented in accordance with skill in the art. In general, the GUI exemplifies the "automatic" nature of calibration, in which the user is required to enter a minimum of substantive numerical or parametric data and is, essentially, guided by the system through the overall calibration process.

Figure 19A:
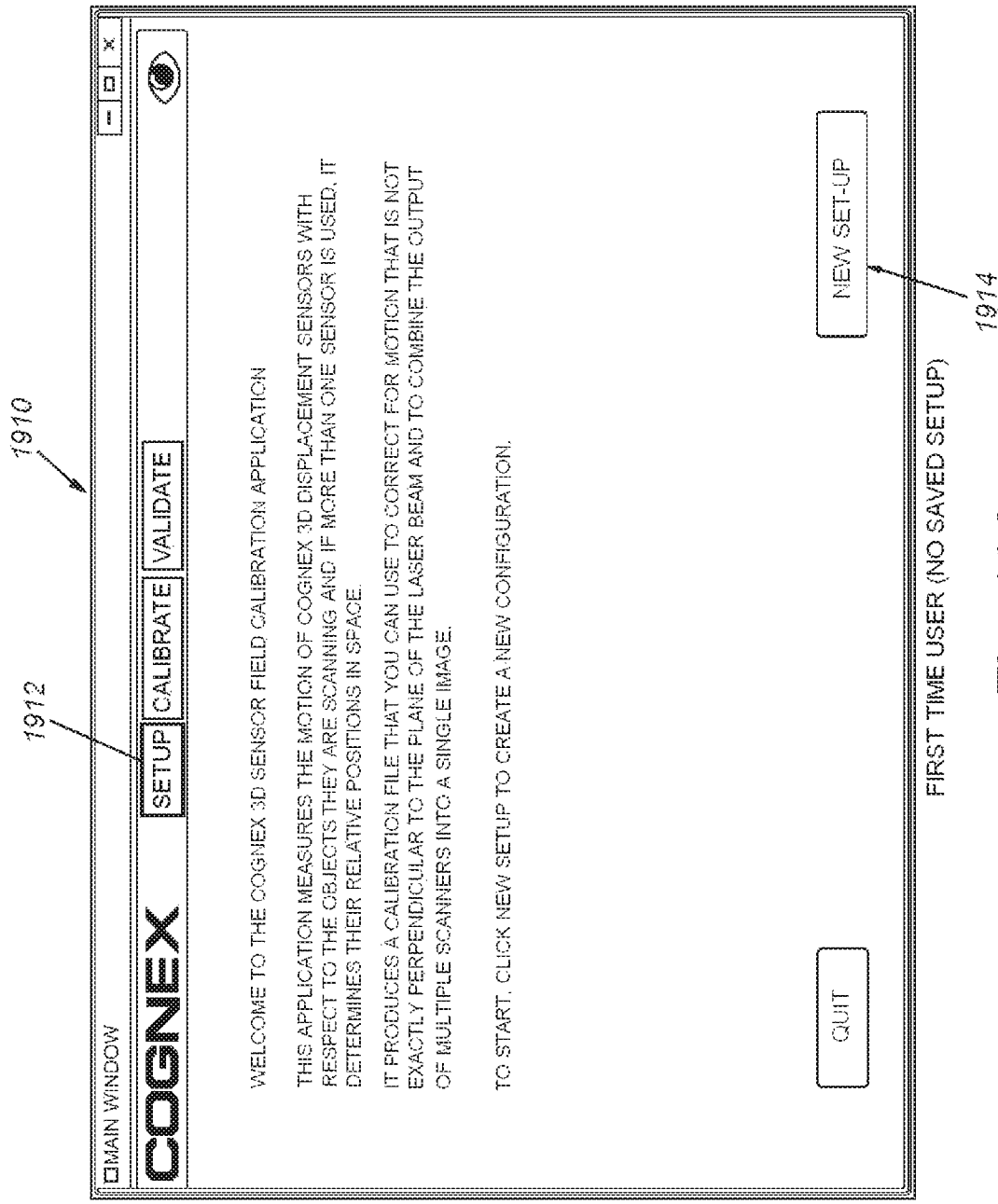
FIGS. 19A-19M are diagrams of exemplary GUI screen displays showing various stages of the operation of the setup and calibration procedures according to an illustrative embodiment.

With reference to FIG. 19A, the depicted GUI screen display 1910 represents a setup phase (tab 1912), in which the user is prompted (button 1914) to begin a new setup. It is assumed that the 3D sensors have been mounted to image the scene and interconnected with the vision system processor (e.g. a PC) via appropriate wired or wireless links, and that the conveyance can appropriately transmit motion data (e.g. via encoder clicks or pulses) to the processor.

Figure 19B:
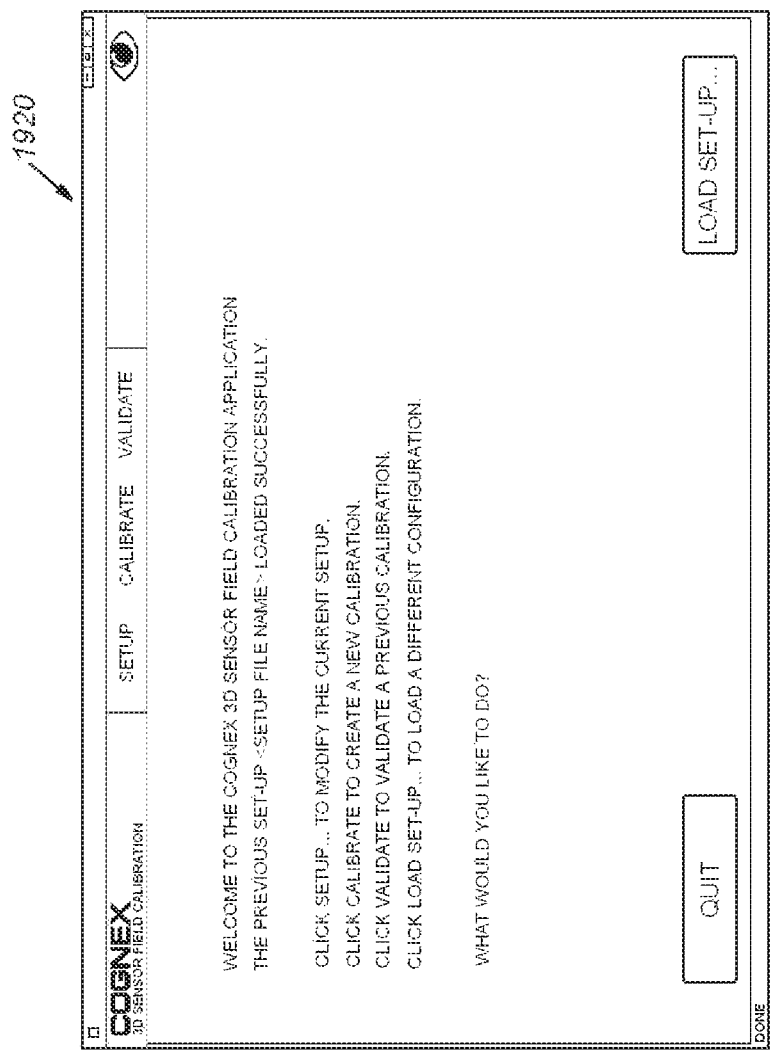
Figure 19C:
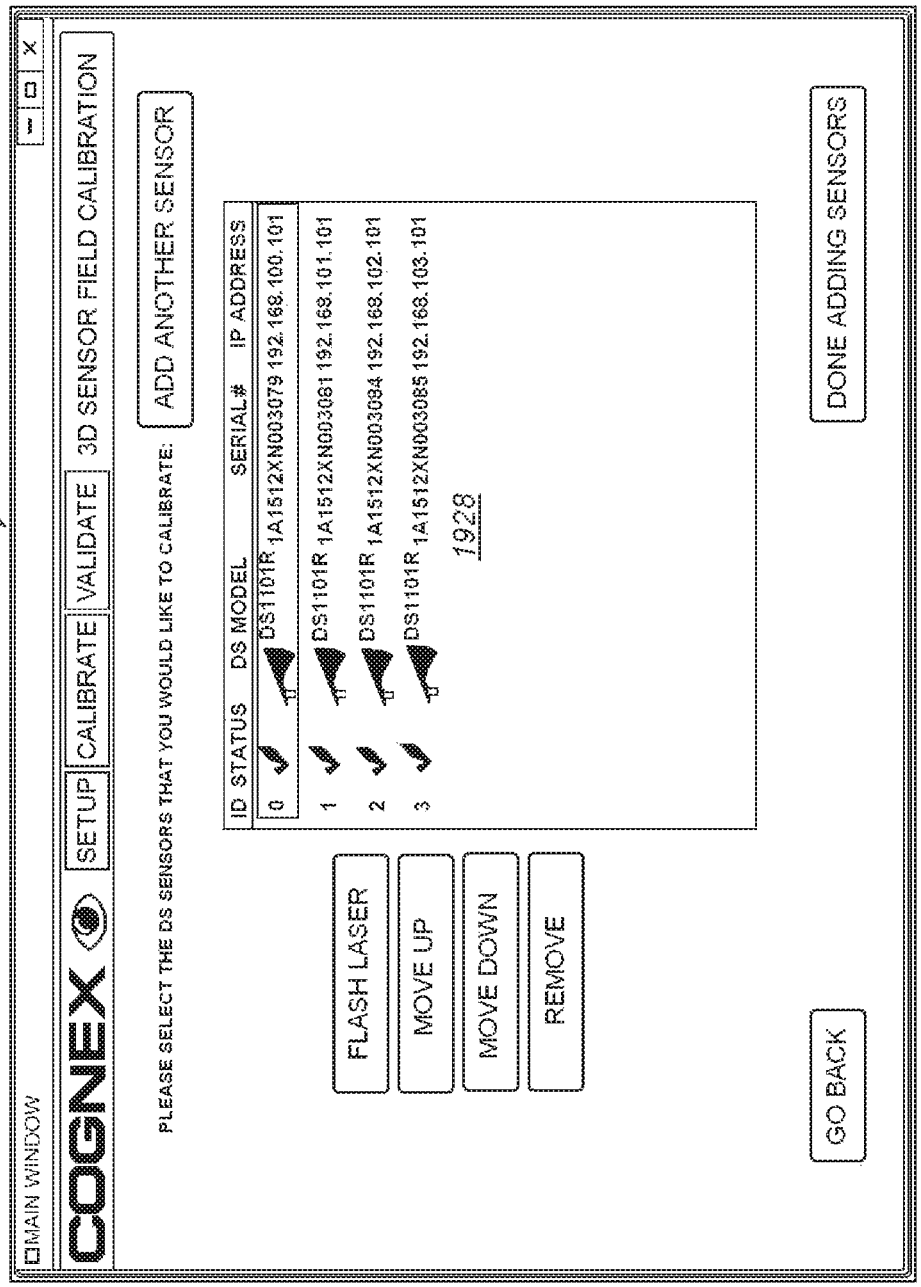
Figure 19D:
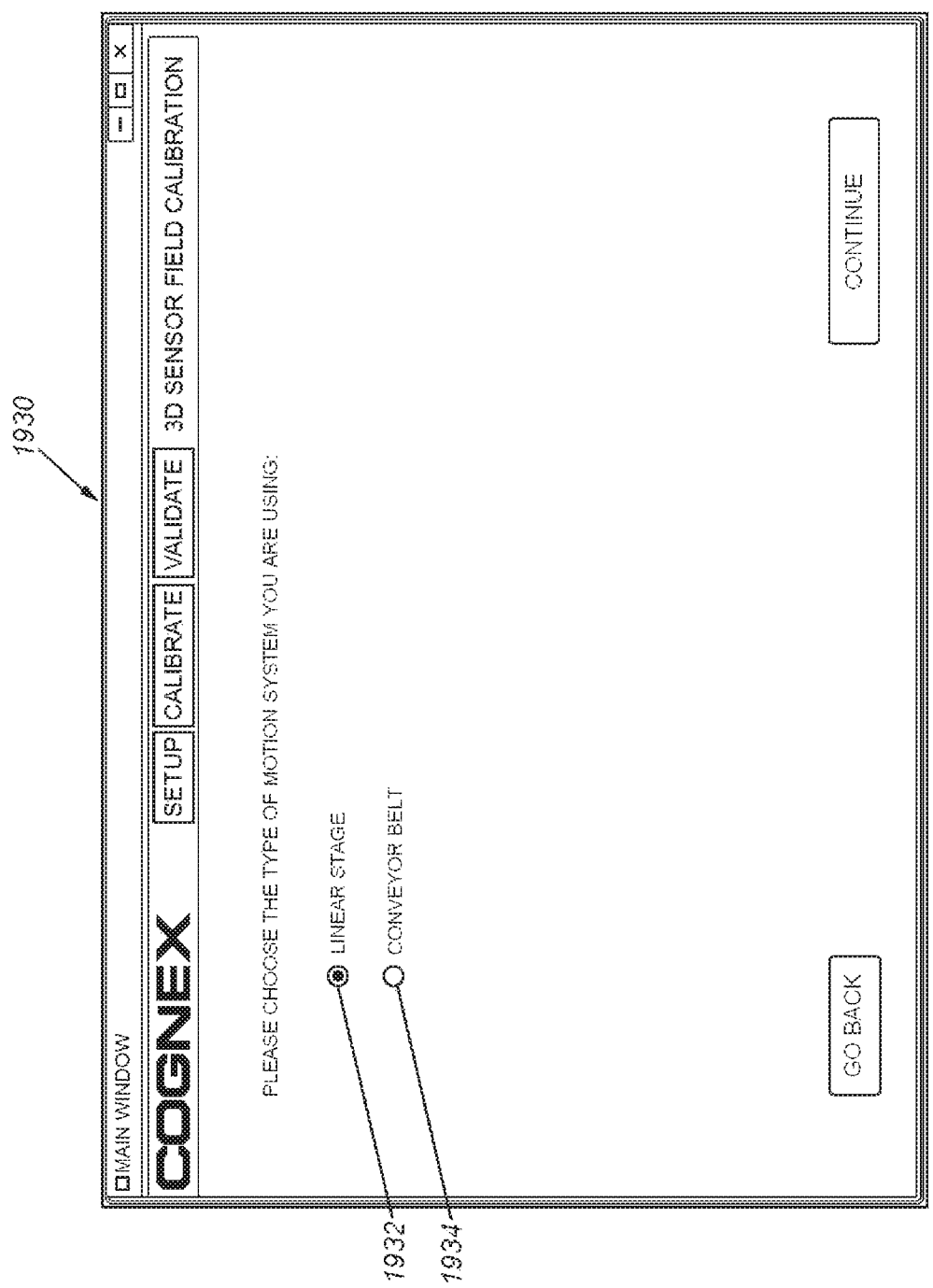

In FIG. 19B, a welcome screen 1920 is presented after the user performs and saves a setup or is relying on a previously loaded setup. Screen 1926 in FIG. 19C identifies the displacement sensors (in window 1928) that are part of the setup. Note that the sensors communicate with the system via a LAN connection using discrete IP addresses. Screen 1930 in FIG. 19D continues the setup process by allowing the user to select the type of conveyance via radio buttons 1932 and 1934 (e.g. a linear motion stage and conveyor belt, respectively). Other types of conveyances (e.g. robot manipulators, moving camera gantries, etc. can be provided as appropriate. In this example, the conveyance is selected as a moving linear stage.

Figure 19E:
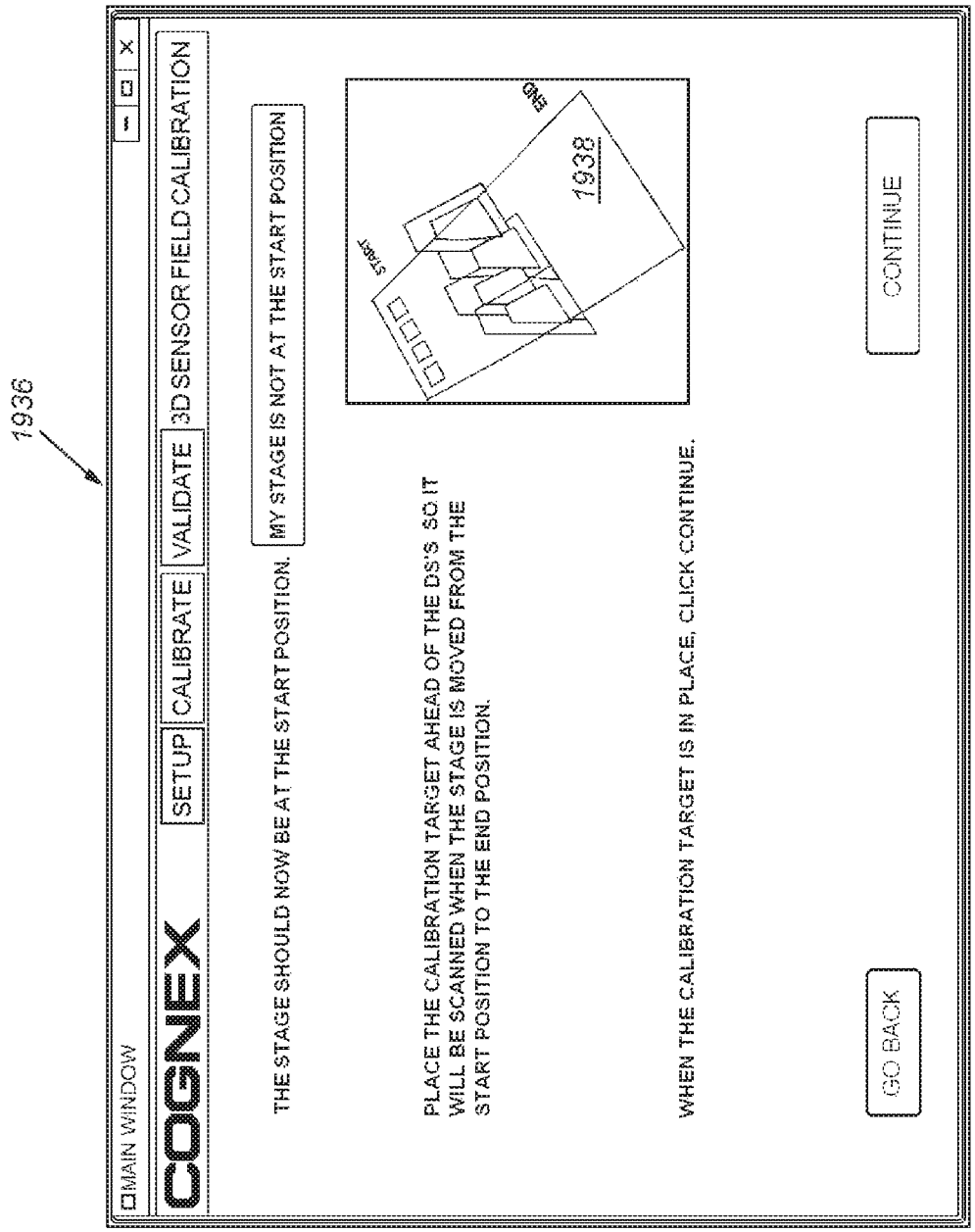

In FIG. 19E, the screen 1936 prompts the user to set up the calibration object on the conveyance and depicts, in window 1938, a desired orientation (herein referred to as "horizontal"), for the object with respect to the conveyance and sensors—wherein the elongate length of spaced apart subobjects on the calibration object extends transverse/perpendicular to the conveyance motion direction.

Figure 19F:
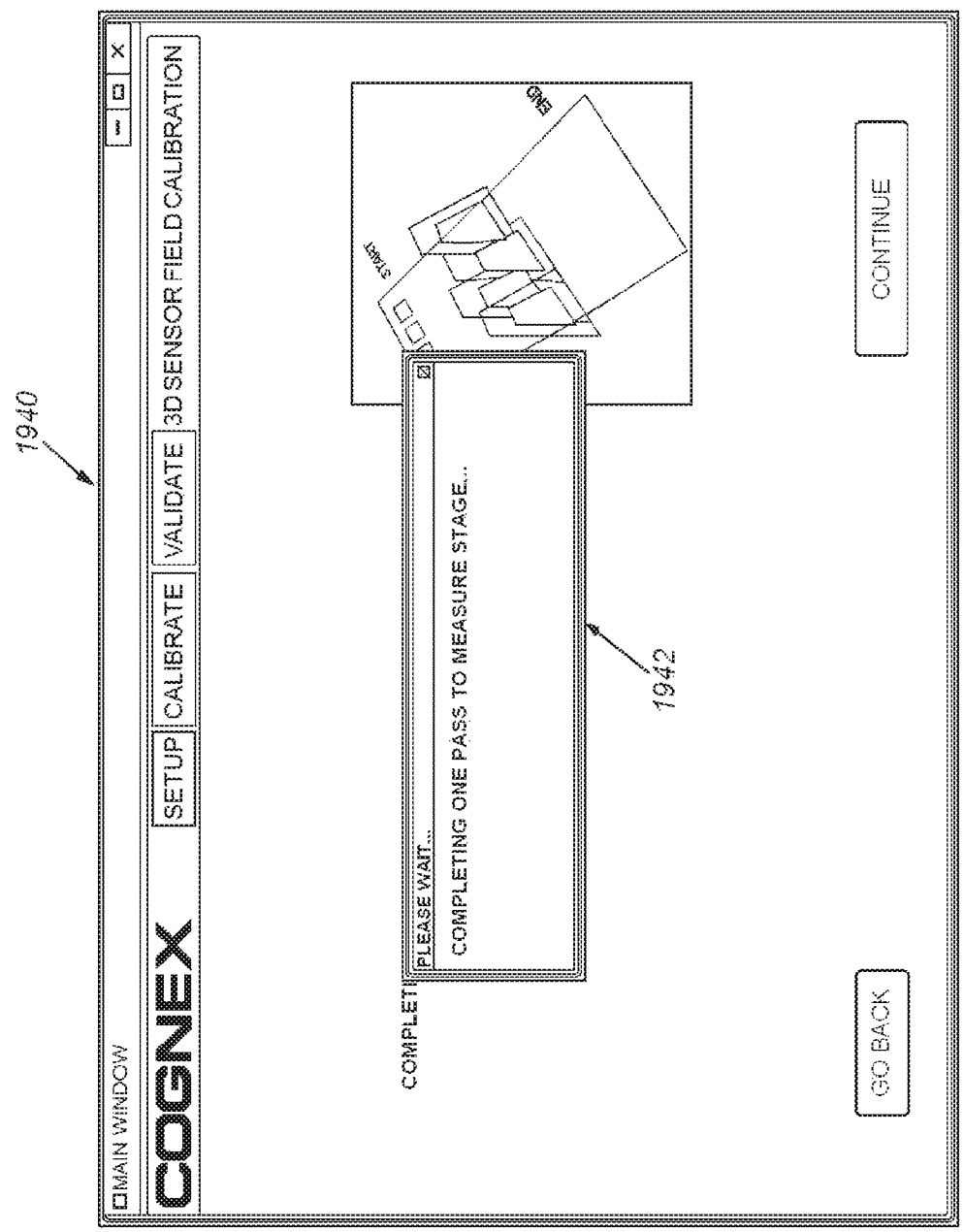
Figure 19G:
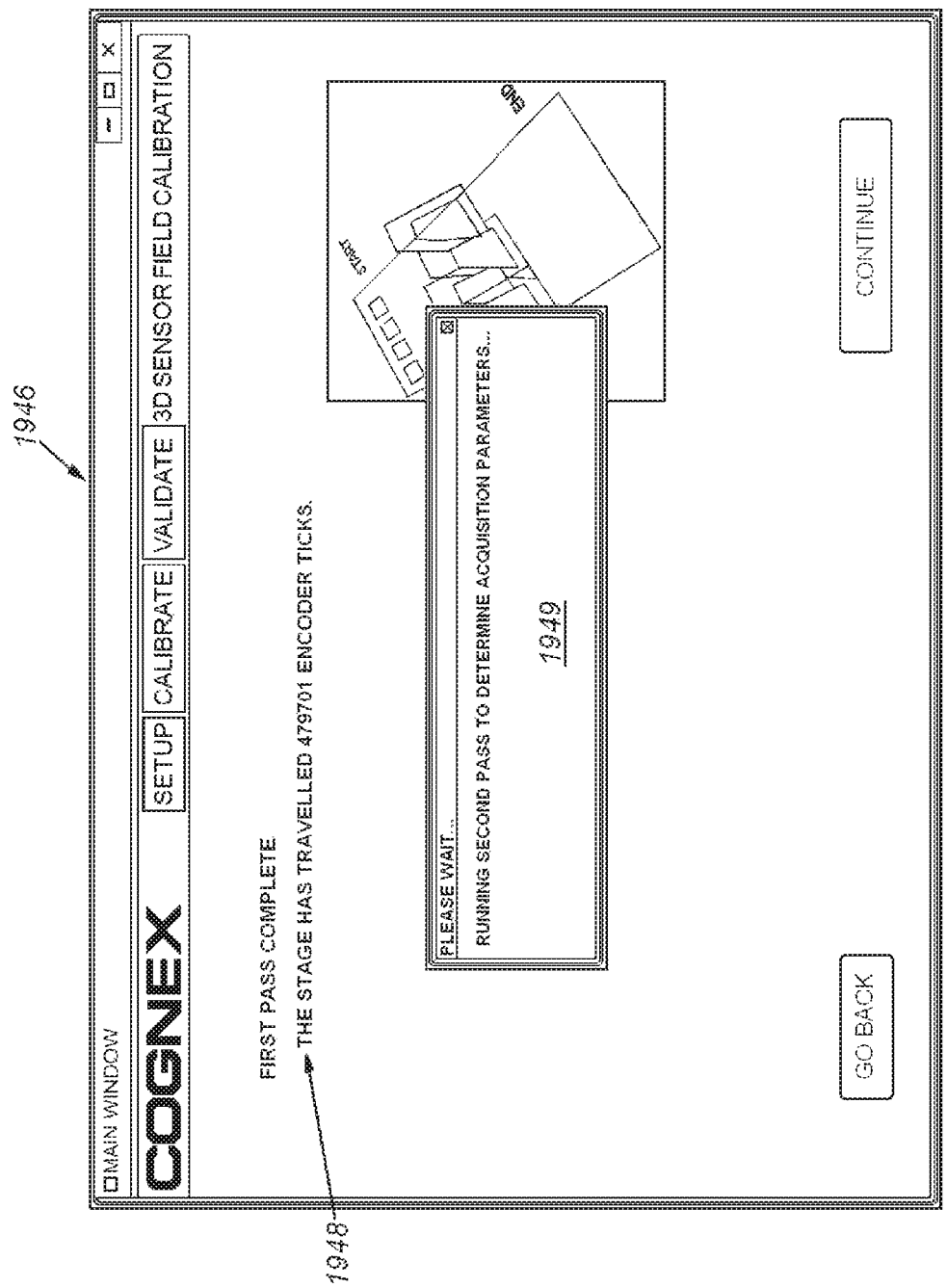
Figure 19H:
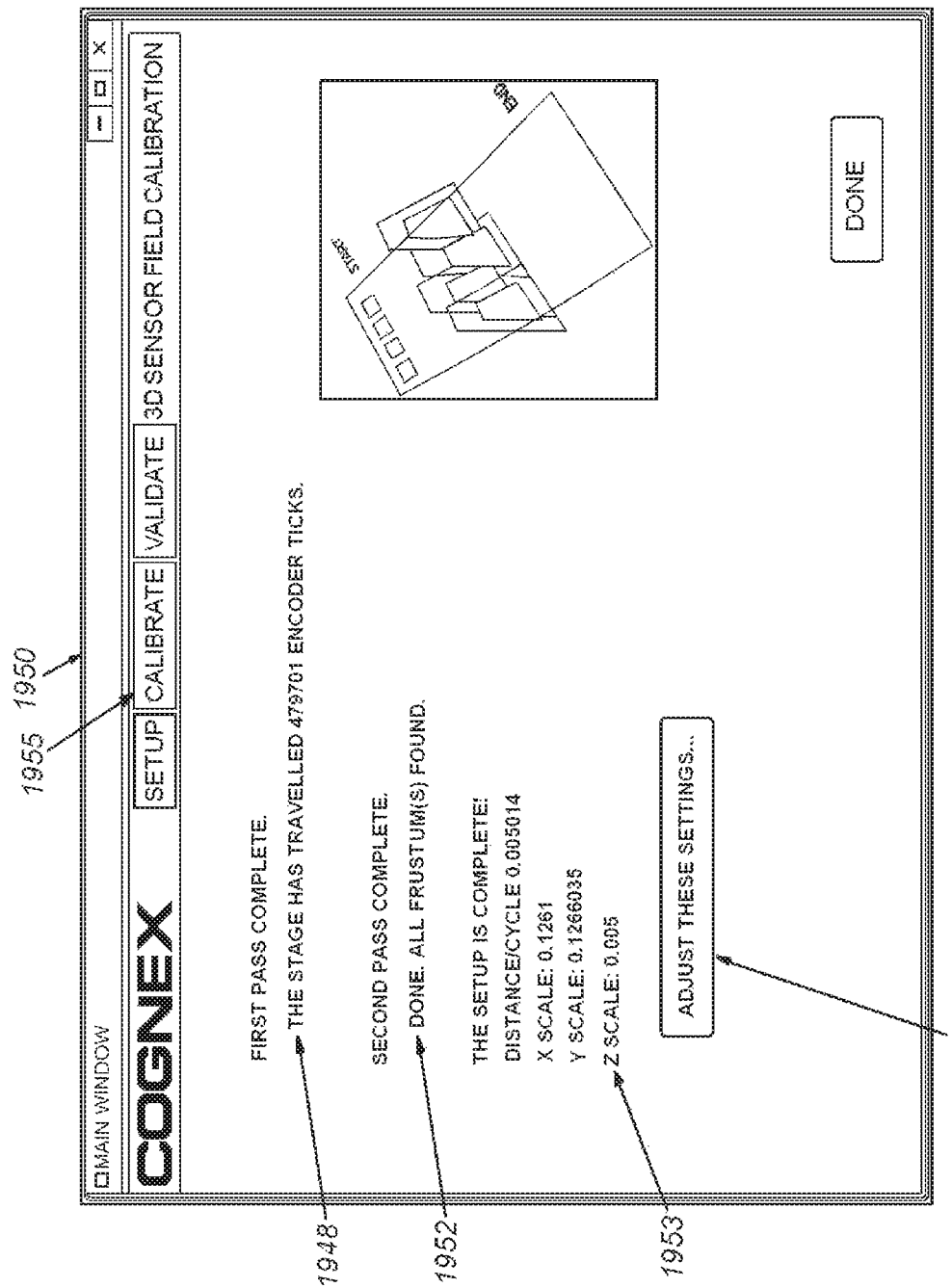

Once the user initiates a scan, the screen 1940 in FIG. 19F reports (box 1942) that the conveyance is running through a first pass. This pass establishes the limits of the motion stage, typically counting encoder pulses. This information is reported in screen 1946 in FIG. 19G as comment 1948. This screen also indicates in box 1949 that a second scan has initiated to determine the acquisition parameters of the system. Typically, as shown, the calibration object is positioned horizontally so that the sensors can finds/recognize all subobjects (e.g. frusta). If all are found, then this is reported in screen 1950 at comment 1952. The scale of the axes is reported at screen area 1953. The user has an opportunity to adjust various settings based on additional scans or user-defined parameters via button 1954. Otherwise, setup is considered complete as shown. A further description of the setup procedure is provided with reference to FIG. 21 and procedure 2100 below. The user can now toggle the calibrate tab 1955 to initiate the calibration phase—typically with the same calibration object as used in setup, or with a different object.

Figure 19I:
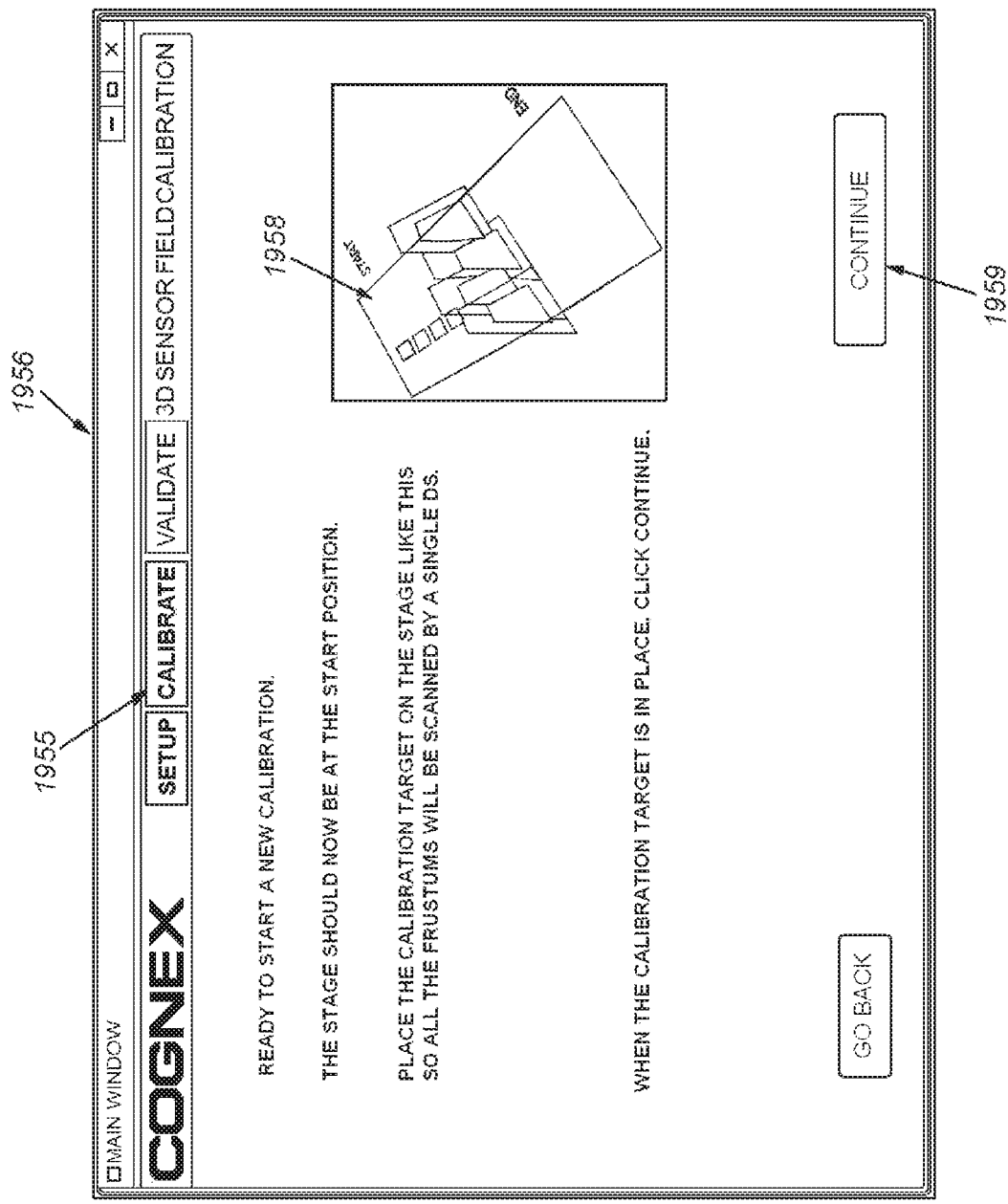
Figure 19J:
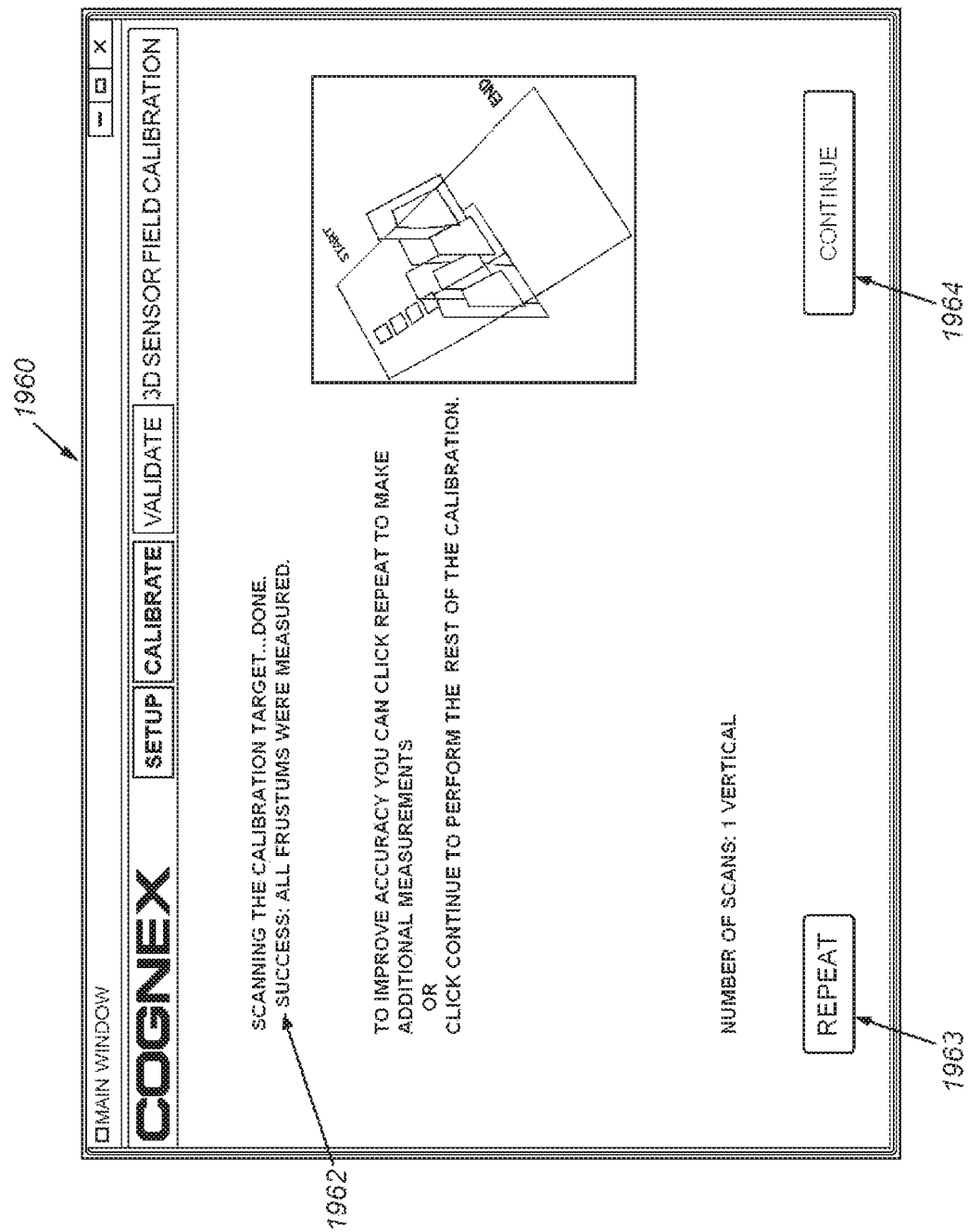
Figure 19K:
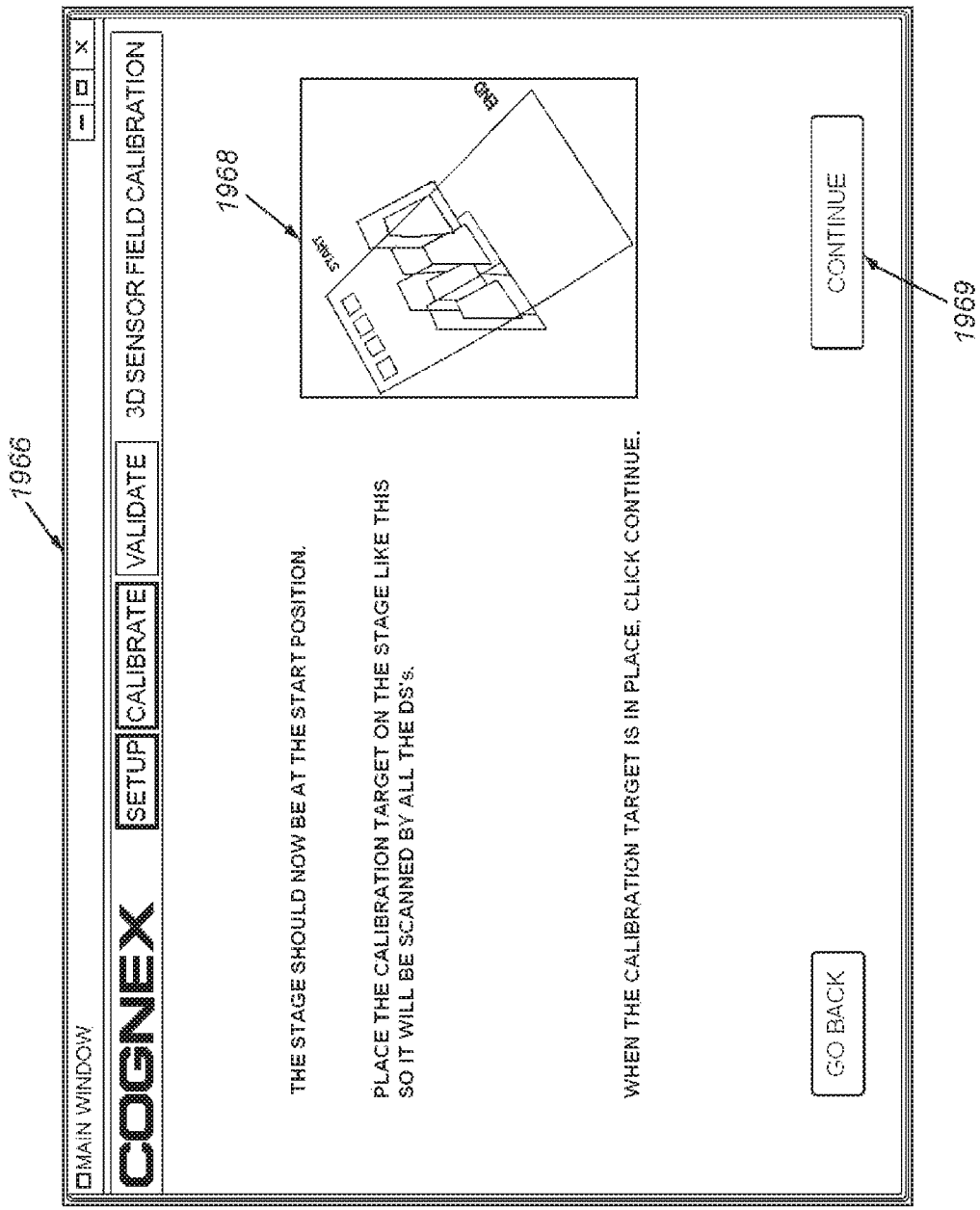

With reference to FIG. 19I and GUI display screen 1956, the system has entered calibration mode following setup (either newly established/saved or loaded from a saved file). The user is prompted to place the calibration object in a vertical position on the conveyance as depicted in the window 1958. The vertical alignment should allow one of the sensors to image all of the subobjects. Once the object is aligned, the user is prompted to press the continue button 1959, and begin scanning. In FIG. 19J and screen 1960 the system reports that all subobjects (frusta) were measured by a single sensor (comment 1962). The user can improve accuracy by repeating this process (using the repeat button 1963) so that an average measurement is obtained from multiple scans/measurements. When complete, the user presses the continue button and moves to the next calibration step. Thus, screen 1966 in FIG. 19K prompts the user to orient the calibration object on the horizontal as depicted in window 1968. This will allow each sensor to scan a discrete subobject. When aligned, the user can press the continue button 1969 to begin calibration.

Figure 19L:
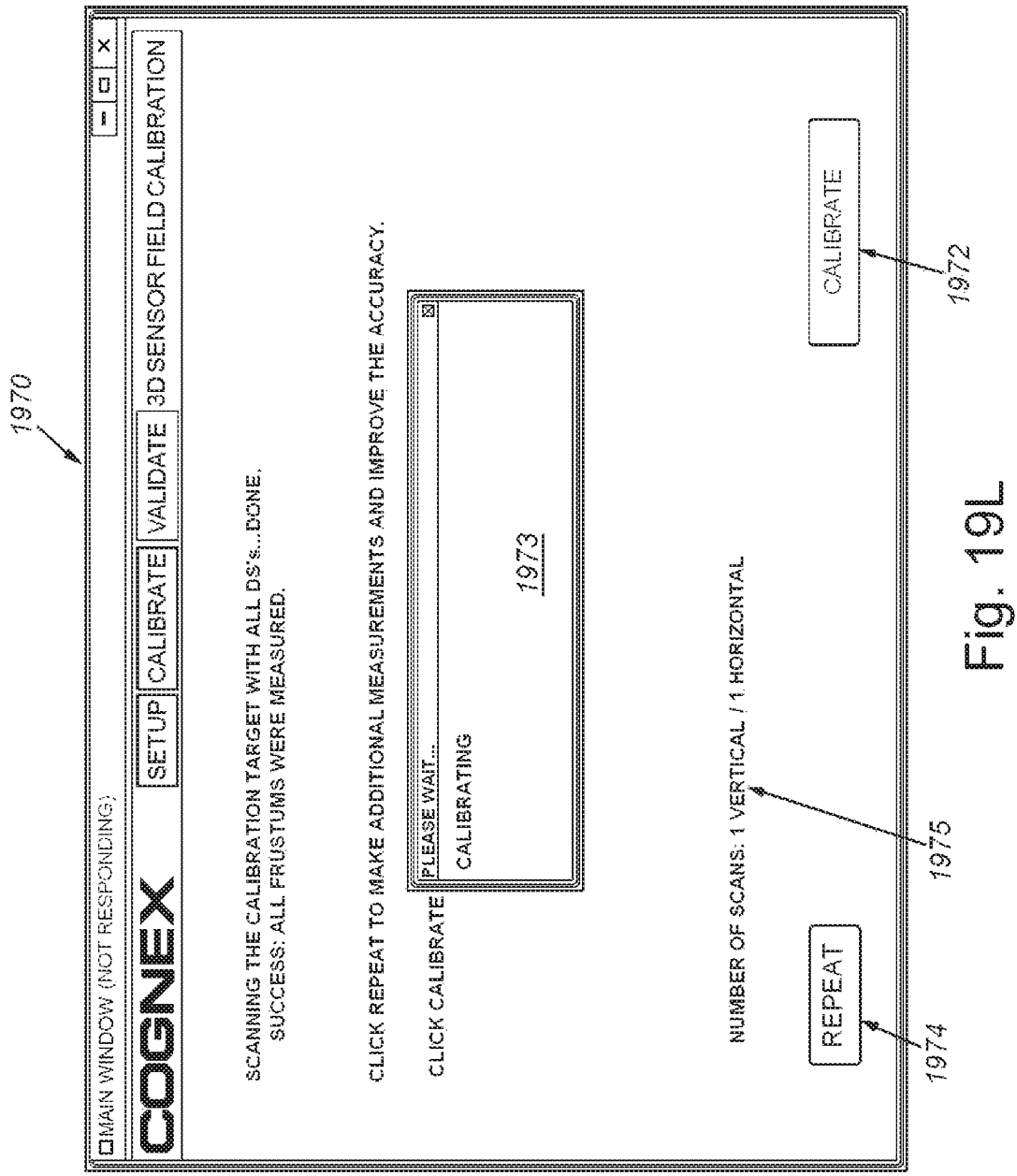

When calibration has initiated (typically via a separate screen (not shown), in which the user toggles a calibrate button 1972), GUI display screen 1970 in FIG. 19L then reports that calibration scan and computation is occurring via box 1973. This process, like (vertical) measurement in FIG. 19J can be repeated to improve accuracy using the repeat button 1974. The screen comment 1975 reports the current number or vertical and horizontal scans in the calibration process.

Figure 19M:
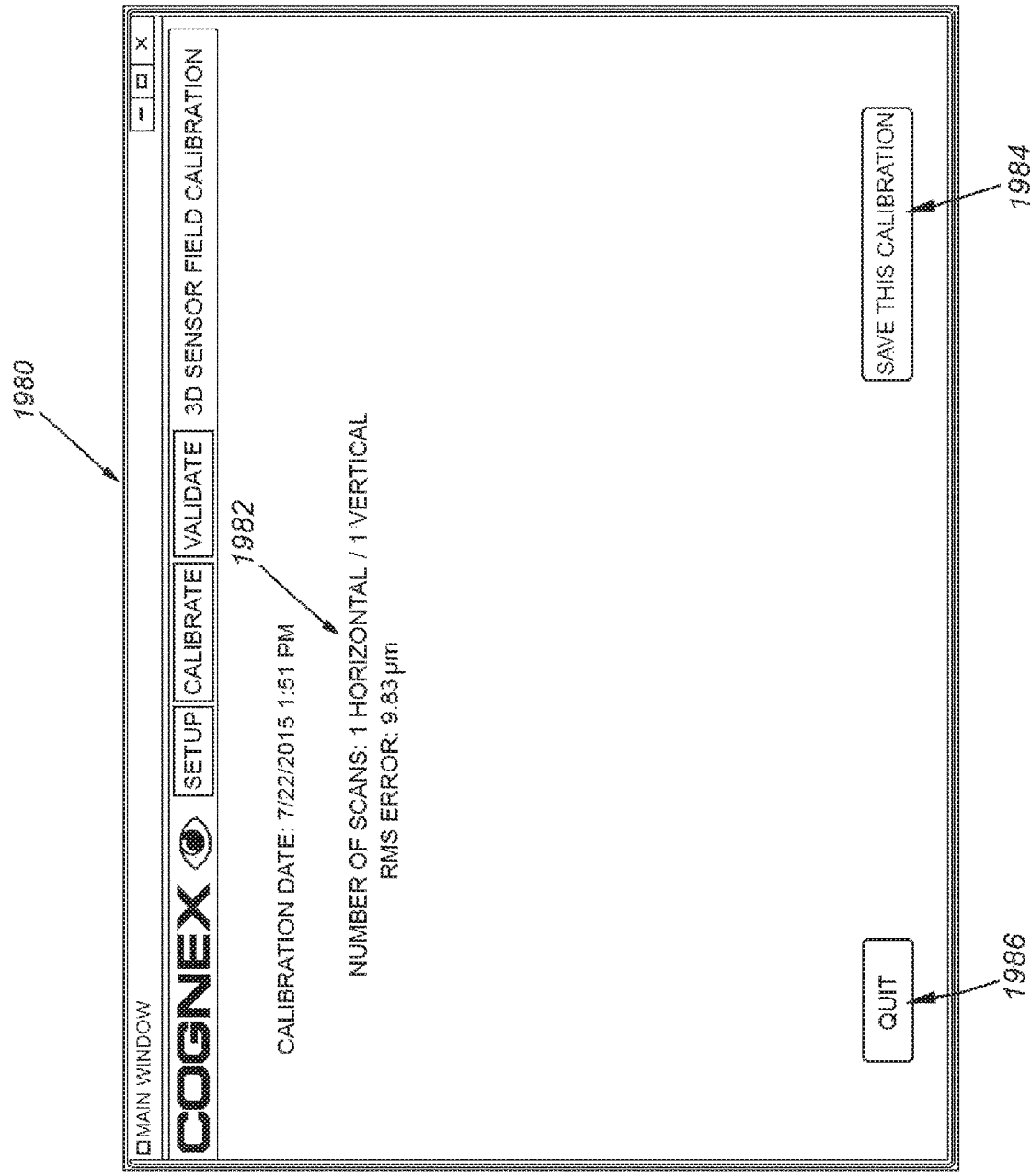

When calibration is complete, the user is presented with GUI display screen 1980 in FIG. 19M, in which the total number of scans and RMS error (e.g. in microns) is reported in comment 1982. The user can save the calibration results to an appropriate file via the calibration button 1984 or quit without saving via button 1986. The saved calibration can be loaded in a subsequent runtime operation in which the system provides runtime-object-measurement results (using up to the full calibrated width of the sensor array) to other applications, such as quality control applications, surface inspection applications, robot manipulation applications, etc.

IV. Thermal Calibration

It is contemplated that changes in temperature can affect the accuracy of the calibration as described above. In an illustrative embodiment, multiple field calibrations are performed at various temperatures so that the overall calibration can be interpolated for a given runtime temperature. In a further embodiment, this interpolation includes linearly interpolating two transforms for calibrations below the expected runtime (environmental) temperature and above the runtime temperature. Temperature can be varied based upon natural variations in ambient conditions or applying external heating/cooling. In another embodiment, this interpolation includes nonlinearly interpolating between transforms for calibrations and the nonlinear interpolation is a function of the runtime temperature and the calibration-time temperatures. In yet another embodiment, this interpolation includes interpolating between the motionVectorInPhys3D using linear interpolation and interpolating between 3D rigid transforms (such as for Sensor3DFromPhys3D) using practices known in the art, such as references found (by way of useful background information on the World Wide Web at the URI address http://www.engr.colostate.edu/ECE555/reading/article_8.pdf, or techniques such as interpolating between R0 and R1 by an amount a by using the equation: Ri=(R1*(inverse(R0)))^a*R0 where we R^a is defined as an operation that gives us a rotation about vector [kx,ky,kz] by a*theta.

Figure 20:
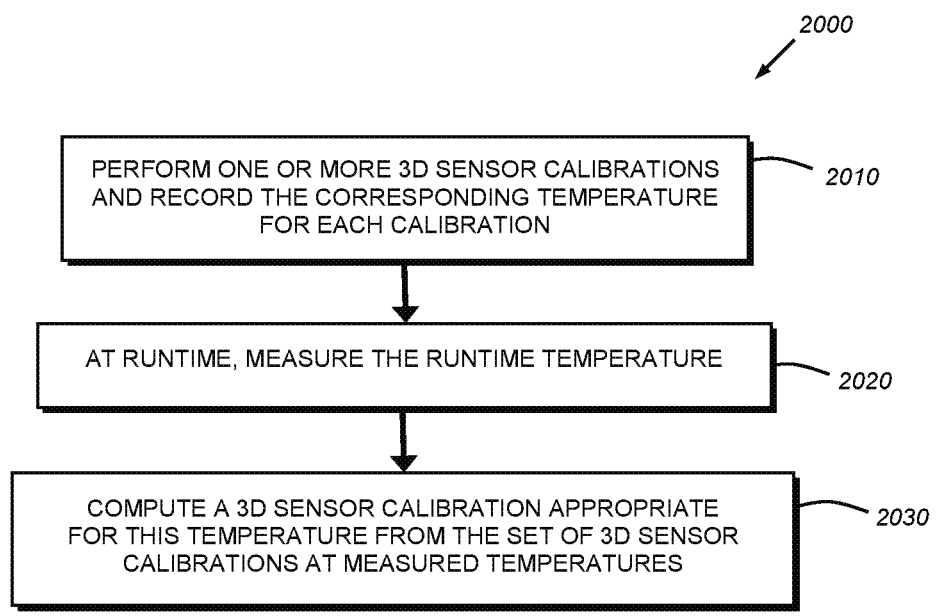
FIG. 20 is a flow diagram showing a procedure for performing calibration in the presence of temperature variations according to an illustrative embodiment.

FIG. 20 details a generalized procedure 2000 for calibration in view of temperature variations. In step 2010, one or more 3D sensor calibrations are performed by the user according to the procedures described above. These are each stored in the system via the GUI. In step 2020, the temperature is measured at runtime (and/or an average temperature over a period of runtime operation is established). Then, in step 2030, the 3D sensor calibration appropriate for the runtime temperature is computed using the recorded calibration values from step 2020 (based upon at least one of the above-described embodiments (e.g. interpolation, etc.)).

Figure 21:
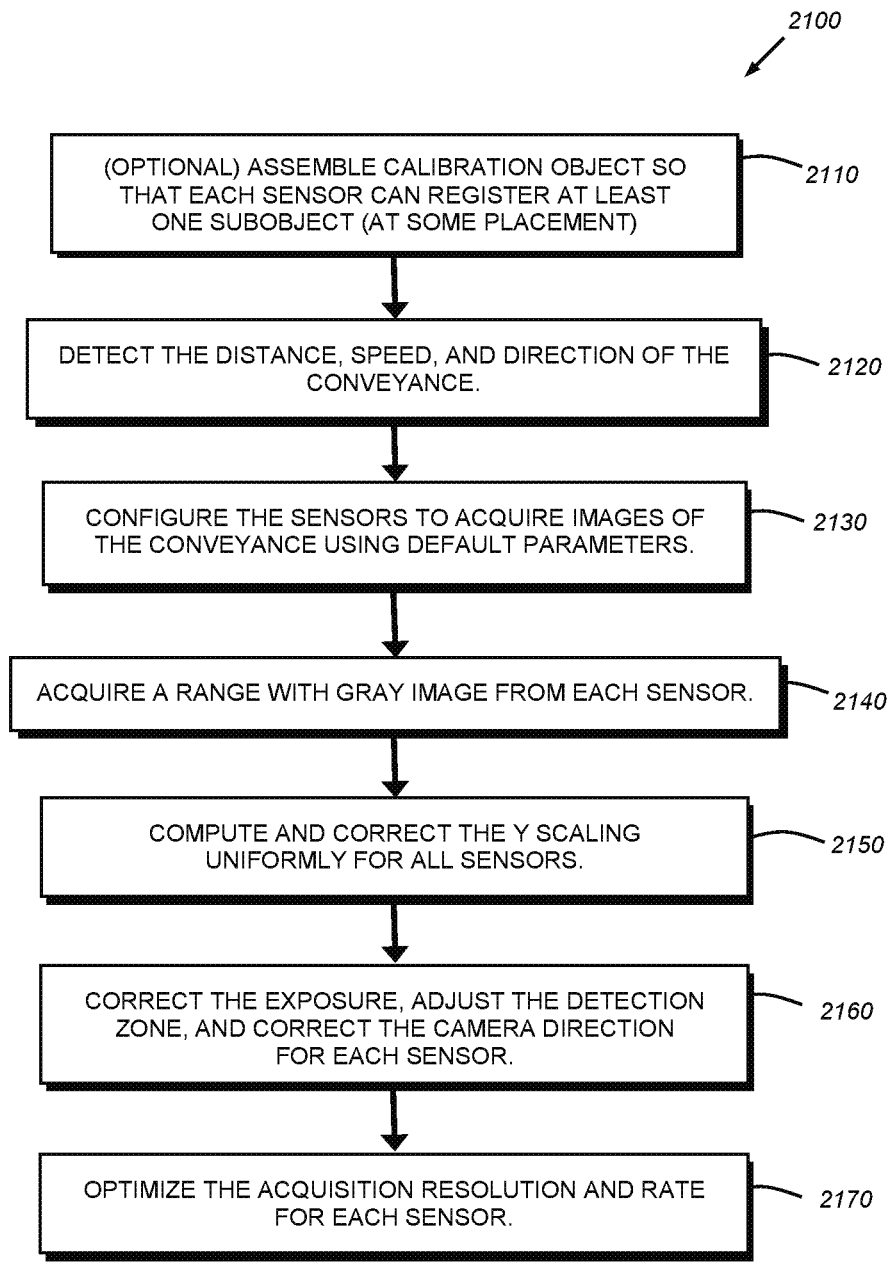
FIG. 21 is a flow diagram showing a setup procedure for use in the overall calibration process according to an illustrative embodiment.

V. System Setup 3D sensor calibration relies upon the sensors being appropriately configured in order to provide useable data. The exemplary displacement sensors include a multiplicity of parameters that are carefully set (e.g. exposure, detection zone, acquisition rate, camera direction, acquisition length, and resolution) to produce effective data. If multiple sensors are employed, the some of these parameters should also be consistent between sensors. If any of these parameters are selected improperly, then the data inaccuracy can compromise field calibration or be completely incompatible. Automated setup in accordance with an illustrative embodiment is an optional two-step process of deriving these parameters without any prior knowledge of the setup or conveyance for an arbitrary set of displacement sensors. It is constructed and arranged to overcome certain limitations of the sensors' functionalities. Reference is now made to FIG. 21, showing a setup procedure 2100. As described above (FIG. 6), a calibration object can be assembled so that each sensor registers at least one subobject in step 2110. In step 2120 the procedure detects the distance, speed and direction of motion of the conveyance. The system can recognize the conveyance via the hardware encoder signal. This step is desired for encoder-driven displacement sensors that only support predefined acquisitions (e.g. does not support rolling acquisitions). By way of example, the conveyance is characterized by the change in encoder ticks/pulses as a function of time. The total change in encoder tick captures the traversal distance of the conveyance. The rate of the encoder tick captures the motion speed of the conveyance. The polarity of the encoder tick change captures the direction of the conveyance. These characteristics allow images to be acquired for all sensors, regardless of their functional capabilities.

Next in step 2130 of the procedure 2100, the system optimizes acquisition parameters for each sensor. Each sensor (simultaneously or serially) acquires 3D data (which in one exemplary embodiment is a range image, in another exemplary embodiment is a range with gray image, in another exemplary embodiment is 3D point cloud data, and in yet another exemplary embodiment is 3D point cloud data including gray information) of the calibration object using a set of default parameters. After acquiring an image, the system first computes and corrects the YScale of the clientFromImage transform. One approach is to exploit the symmetrical design of square frustums and the accuracy in the X-axis to search for rectangular blobs in the range image and correct them to a square. Since all the sensors share the same conveyance and driver, the corrected YScale can be shared by every sensor.

Next in step 2140, an acquired gray image from each sensor is used to correct the exposure. By exploiting the correlation between exposure and gray pixel value and knowledge of a sensor model's optimal gray value, the exposure of each sensor can be tuned to avoid saturation while minimizing missing pixels. This corrects for differences in the sensors and calibration subobjects. Assuming that all the subobjects of the calibration object have the same reflectivity (i.e. darkness) then the differences in gray values derive from variations in the sensor sensitivity (e.g. laser intensity). Otherwise, any additional differences would stem from variations between subobjects. In one embodiment, if subobject variations are to be accounted for, then an additional acquisition in which all the subobjects are found/recognized by a single sensor is desired to isolate and characterize variations in subobject reflectivity.

The detected subobjects form the lower bound window for the detection zone in which subsequent acquisitions should expect to find the calibration object as measured by each sensor. Since the accuracy and field of view scales with the distance from the sensor, the distance from the sensor is also used to optimize the 3D resolutions and field of view. In step 2150, the target YScale resolution is also balanced against the motion speed of conveyance to avoid overruns. The orientation of the detected subobject is used to correct coordinate space of the images such that they are consistent.

Additional optional functionalities are available to support edge case scenarios. In an embodiment, if the motion is not very consistent (i.e. the instantaneous speed can be much higher than the average speed), then a tolerance factor can be manually or automatically increased if the displacement sensor cannot poll the encoder quickly enough to adequately read the instantaneous speed (step 2170). In an embodiment, if the motion speed is significantly fast relative to the maximum acquisition rate of the sensor, then the initial detection zone can be reduced to support that higher speed (step 2160). In various embodiments, these optional functionalities can be manually or automatically driven. Additional a priori knowledge, such as the traversal distance or motion speed, can be optionally entered to speed up the process.

VI. Additional Parameter Refinement

As described above coarse estimation employs at least one scan of the calibration object with at least one sensor, which is referred to as the base sensor. Generally, the base sensor should be able to measure all of the subobject features in that scan. This provides an initial definition of Phys3D coordinates. It is assumed that the motion direction is (0,1,0) in OriginalSensorXZ3D of the sensor used for estimation and can thereby estimate that sensors pose. This coarse estimation scan can be used to bootstrap the poses of the other sensors by analyzing other scans in which one sensor already has a computed pose and another sensor has not, and the scan includes data from both sensors. Since the system has knowledge of the relationship between the feature positions, this knowledge can be extrapolated to determine each other sensor's pose. This bootstrapping approach continues until the system has estimated the poses for all of the sensors subsequently, for each scan, the system can estimate the scan poses since it has generated estimates for each sensor as well as estimates for the calibration object features.

Figure 22:
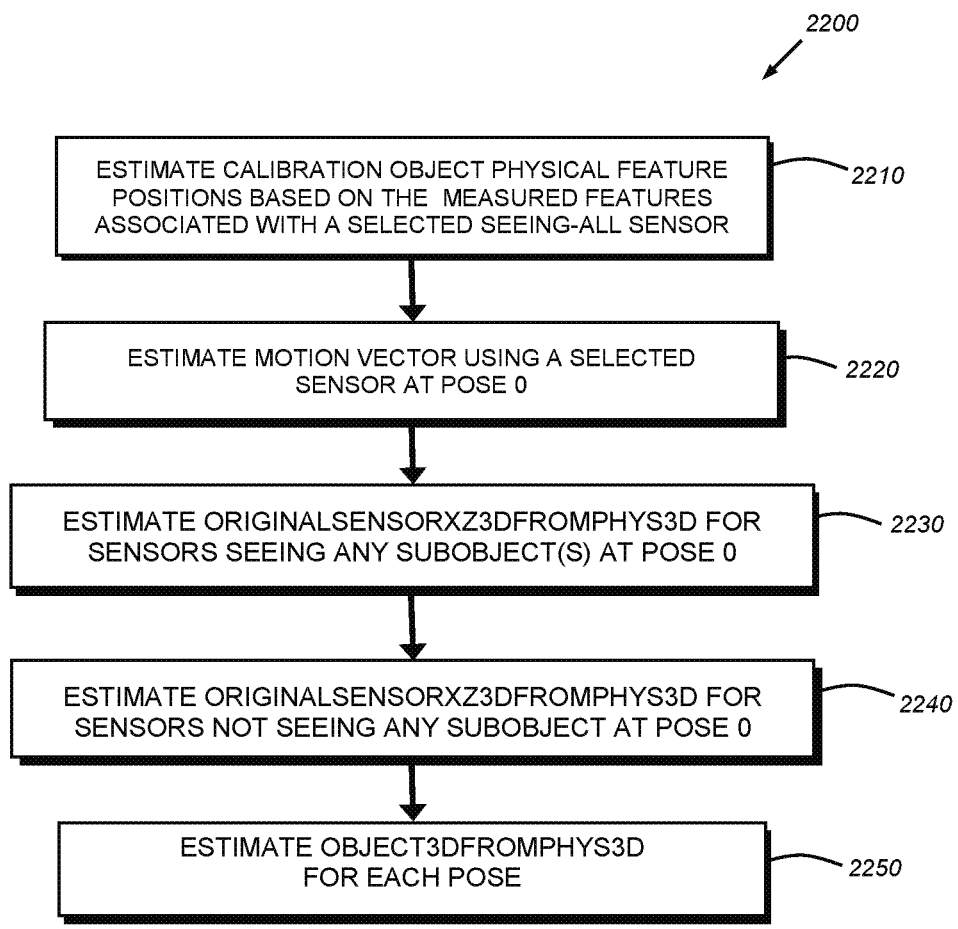
FIG. 22 is a flow diagram showing basic initial parameter estimation for use in the calibration process according to an illustrative embodiment.

Given a set of measured feature positions of the calibration object, which is positioned at different poses and captured by different sensors (where the term "captured" characterizes that the object has been measured), FIG. 22 depicts a block diagram 2200 for providing estimates of the initial values of the following initial parameters: calibration object physical feature positions (block 2210); MotionVectorInPhys3D (block 2220), Original SensorXZ3DFromPhys3D (blocks 2230 and 2240); and Object3DFromPhys3D (block 2250). These estimations of initial parameters are performed generally as described in the procedures of FIGS. 14-18. In this case, the measured feature positions used to estimate the calibration object physical feature positions are associated with a selected sensor while MotionVectorInPhys3D is estimated using a selected sensor at pose 0. With a same set of measured feature positions, estimated parameters would change and produce different feature prediction errors as any of the two selected sensors varies. With multiple scans involved for field calibration, there can be multiple sensors that see all calibration subobjects at different pose. As such there are various options available to determine one of selected sensors for estimation according to FIG. 22. Such options exist where multiple sensors find/recognize subobjects at pose 0.

In an embodiment, multiple sensors are selectively applied as the base sensor, and the computations are re-performed for that sensor. The sum squared errors generated from the computations for each base sensor are then compared. The base sensor which induced the minimum sum squared error is selected and is used to select its corresponding displacement sensor field calibration. In another embodiment, the subobject feature positions are specified, in which case, the initial parameter estimation step which estimates the subobject feature positions is skipped (and the specified feature positions are used).

Figure 23:
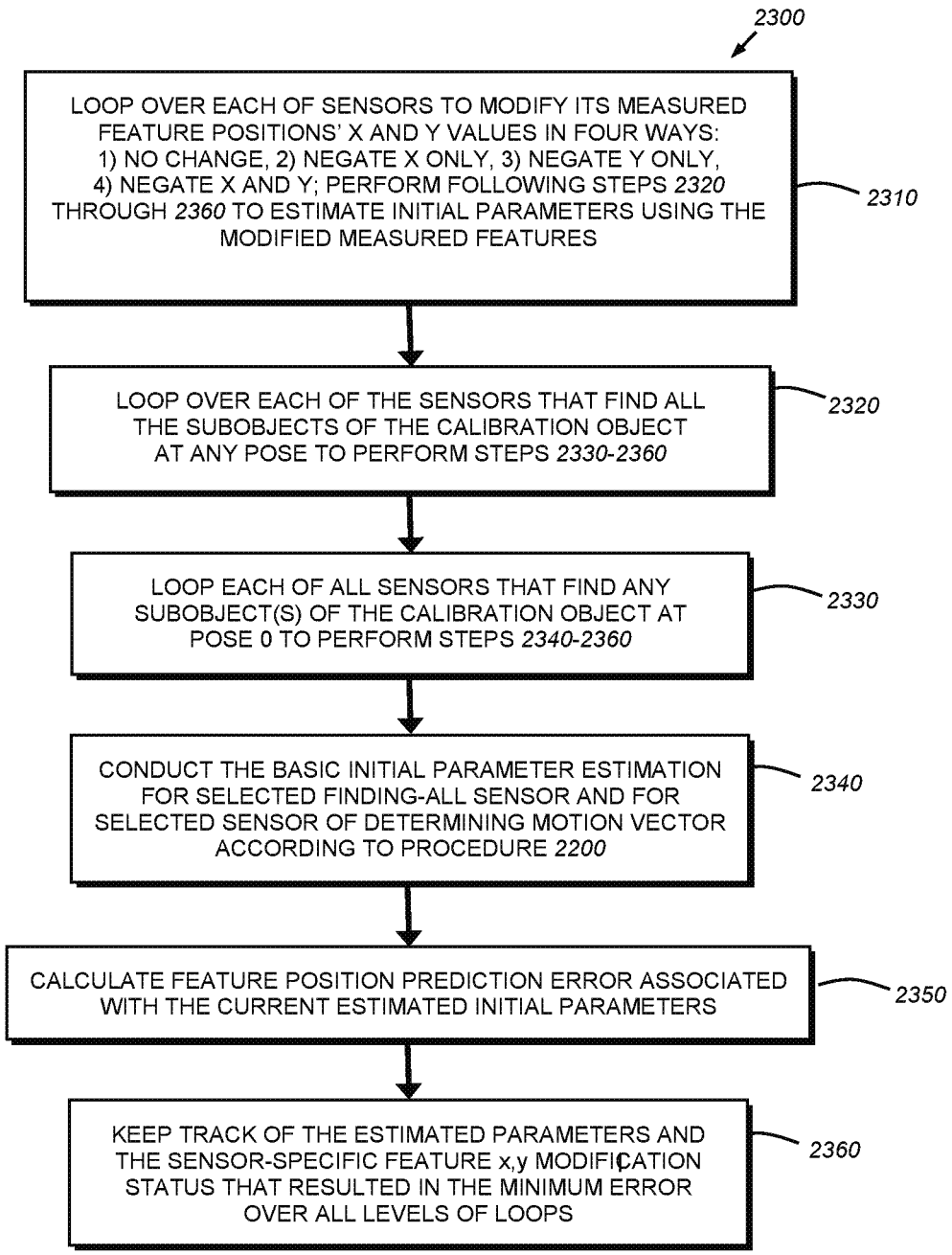
FIG. 23 is a flow diagram showing advanced initial parameter estimation for use in the calibration process according to an illustrative embodiment.

The quality in the estimated initial parameter values directly affects the performance of the displacement sensor field calibration, e.g., whether it can converge to the minimum through the refinement and how fast if converging. Thus, in a further embodiment, to overcome the discrepancy in final calibration results that can possibly be caused by the uncertainty in initial estimated parameters, an advanced initial parameter estimation procedure 2300 is provided in FIG. 23. This advanced procedure 2300 first tries each of four possible modifications of measured feature positions by whether negating their x or y values associated with each sensor. This allows each of the sensors to be calibrated configurable in its acquisition direction ("Laser-to-Lens" or "Lens-to-Laser") independently from other sensors and from the scan motion direction. To compensate the possible modified features, a post-process is employed to ensure the final calibration results (after the refinement) recovering from the effect of the modifications made on the measured features. The procedure 2300 also tries (loops through) all possible sensor candidates whose measured feature positions are used to estimate the initial values of the calibration object physical feature positions and MotionVectorInPhys3D to search for the best result. In step 2320, the procedure 2300 then loops over the sensors that find/recognize all subobject of the calibration object at any pose to perform steps 2330 through 2360 below. In step 2330, the procedure loops over sensors that find/recognize any subobjects of the calibration object at pose 0 to perform steps 2340 through 2360 below. Then, in step 2340, the procedure 2300 conducts a basic initial parameter estimation for the selected sensor that finds/recognizes all subobject(s) (where the term "finding/recognizing" characterizes the state in which a subobject was found/recognized) in other words, "seen") in a range image (which was acquired by a sensors)), and for the selected sensor that determines the motion vector in accordance with the procedure 2200. In step 2350, the procedure 2300 then calculates the future position prediction error associated with the current estimated initial parameters. Next, in step 2360, the procedure 2300 keeps track of estimated parameters and the sensor-specific feature x, y modification status that resulted in the minimum error over all levels of loops.

Advantageously, the above-described procedure(s) grant the best possible initial parameter estimation that results in the minimum feature predication error for given measured feature positions. They ensure the correct configuration status regarding sensors' acquisition directions and motion direction, which makes the latter refinement process converge on the measured feature position (possibly modified). The procedure(s) also overcome the uncertainty in estimated initial parameter values for a given set of measured feature positions and further lead to deterministic calibration results even if the ordering of calibration scans are changed. Moreover, regardless of each sensor's configuration in acquisition direction and the motion direction, the initial parameter estimation automatically fixes the inconsistency existing among feature positions measured by different sensors, ensuring the field calibration algorithm to reach consensus among the sensors in term of a converged small prediction error. The procedure(s) also enhance the flexibility in the setup/installation of multiple displacement sensors and the motion of moving the objects to be captured, which reduces the effort in configuring displacement sensors applied to a broad range of applications. Also advantageously, the procedure(s) support calibration of sensors whose captured 3D data (such as range images or point clouds) derived feature positions are represented either left-handed or right-handed due to respective sensors being differently configured.

Illustratively, the system and method employs a Levenberg-Marquardt gradient descent procedure to refine the parameter estimates. According to a further embodiment, the system can (a) normalize the input data so as to condition the input data (b) translate the input positions so that each scan's mean positions are (0,0,0); (c) scale all the input positions so that the standard deviation of the input positions are 1.0; and (d) after renormalizing the data for the gradient descent, undo the translation and upscale the estimated parameters. For robustness, one embodiment can include refining the parameters using numerically computed derivatives (such as Levenberg-Marquardt gradient descent), and a further embodiment can include using different step sizes (for the numerically computed derivative) to increase the probability of arriving at the global solution.

Figure 24:
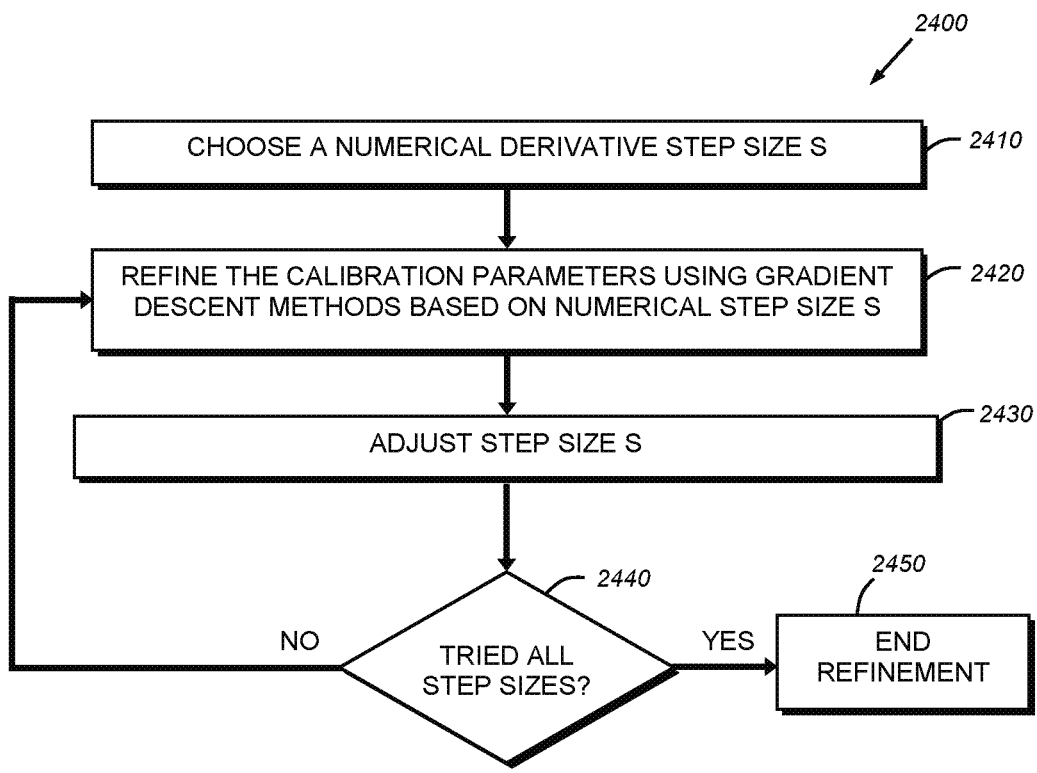
FIG. 24 is a flow diagram showing a gradient descent technique for finding the global solution to calibration parameters by varying the step size used to compute numerical derivatives (e.g. for Levenberg-Marquardt), for use in the calibration process according to an illustrative embodiment.

With reference to FIG. 24, a procedure 2400 can be employed to increase the probability of the gradient descent technique finding the global solution by varying the step size used to compute numerical derivatives (for Levenberg-Marquardt). In step 2410, a numerical derivative step size s is selected. The calibration parameters are then refined in step 2420 using gradient descent techniques based on the numerical step s. Then, in step 2430 the step size s is adjusted. Steps 2410-2430 are repeated for different step sizes (via decision step 2440) until all step sizes have been exhausted (note this can be a user-defined or pre-programmed value). The refinement is then complete (step 2450).

Figure 25:
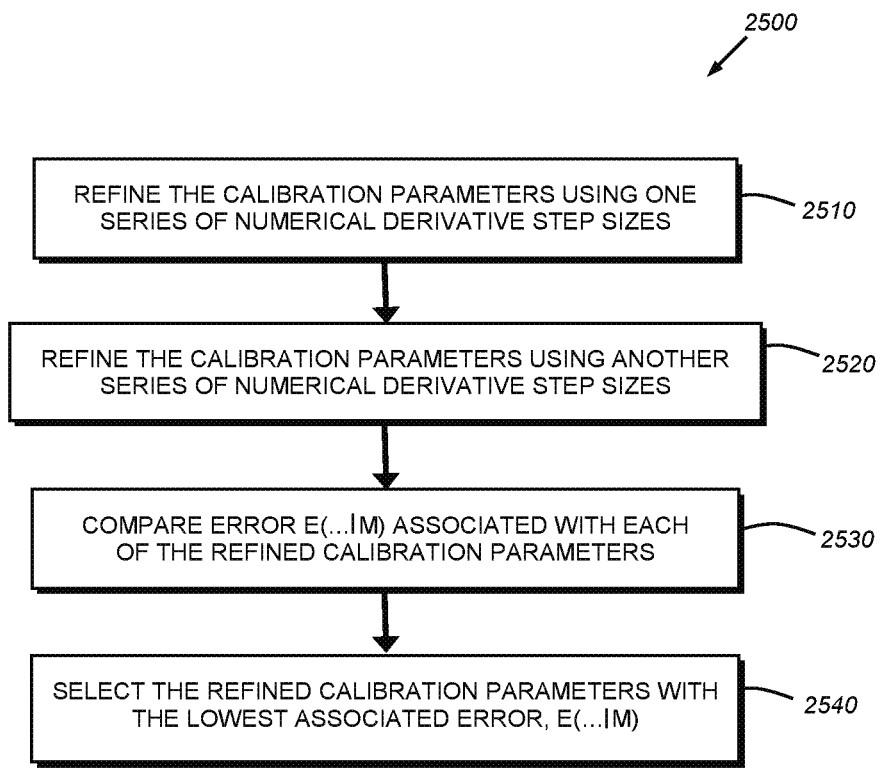
FIG. 25 is a flow diagram of a procedure for increasing robustness of the technique of FIG. 24 by applying multiple sets of numerical derivative step sizes according to an embodiment.

For robustness, an embodiment can include a procedure (2500 in FIG. 25) that try a plurality (at least two) series' of numerical derivative step sizes (steps 2510 and 2520) and compare the final parameter estimates based on their respective E( . . . |M) errors (step 2530), selecting the parameter estimate with the lowest corresponding E( . . . |M) error (step 2540). In an alternate embodiment in which the 3D object feature positions are specified, a similar procedure can be employed, which compares parameters inducing E( . . . |M,F) errors to select the parameter estimate with the lowest corresponding E( . . . |M,F) error.

VII. Grayscale Rendering

With reference again to the generalized calibration procedure 600 of FIG. 6, the system can optionally employ the calibration to induce physically accurate measurements of the object under inspection (step 660). One use for such measurements is to generate a rendered, physically accurate 3D (range) image that can include a grayscale representation of the object's 3D surface features. The rendering routine can take as input 3D point data, 3D faceted data, 3D (range) images (which characterize the Z height at each (i,j) pixel location), or peak data, the native output of a displacement sensor before it has been transformed into physical coordinates. There are certain advantages to inputting the peak data, including minimizing the number of rendering steps because each rendering involves quantization (and, thereby, introduces quantization error), and that peak data allows a geometric heuristic to be employed which intentionally disregards artificial features. In an embodiment, four-way connected neighbors are decomposed into two triangular facets by characterized by the (e.g.) upper left, upper right, and lower left vertices and the upper right, lower left, and lower right vertices.

A description of an illustrative procedure for rendering physically accurate 3D (range) images using calibration data is now provided. By way of background, machine vision systems are often adapted to process 2D images, and so it is sometimes useful to generate calibrated 3D (range) images (with physically accurate coordinates and Z measurements). Rendering field calibrated data includes combining the measured sensor data with the field calibration to generate field calibrated data, and then rendering 3D images from such data. For individual rendered range images, the user specifies a destination client coordinate space—for example, the destination client coordinate space could be Sensor3D$_{Sensor=i}$, which is aligned to particular sensor i and is a physically accurate coordinate space. The user also specifies a desired pixel size (in x and y) and a desired z level quantization. In an alternate embodiment, the user also specifies a desired gray level quantization. The 3D (range) image rendering function can automatically determine the extents of the 3D image based on the measured 3D data, the destination 3D image coordinate space, and the 3D image pixel size and quantization. Alternatively, the user can specify the desired extents of the 3D image via (e.g.) the GUI. When multiple sensors are used, it can be advantageous to render all of their individual 3D (range) images into the same coordinate space, because this simplifies the task of merging the individual 3D images into a composite range image (because, then, the system is only required to process corresponding pel values and can avoid performing any resampling in the merging step).

Figure 26:
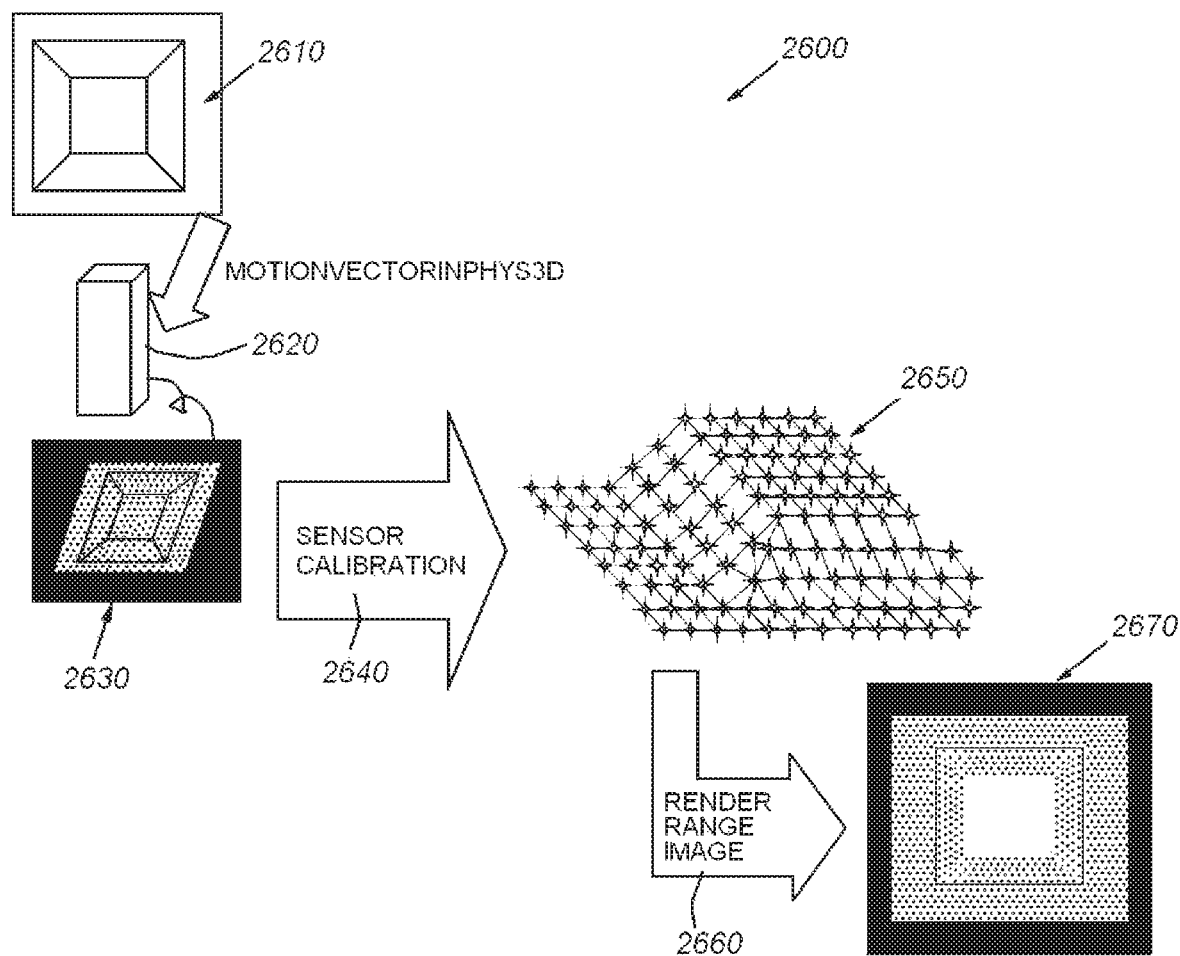
FIG. 26 is a diagram of a generalized procedure for applying 3D calibration to measurements from a 3D sensor so as to produce physically accurate 3D data, and then rendering a 3D (range) image from those physically accurate 3D data.

Reference is now made to FIG. 26, which shows a diagram of a process 2600 for applying a calibration generated in accordance with the illustrative system and method to measurements from one or more 3D sensor(s) so as to produce physically accurate 3D data, and then rendering a 3D (range) image from those physically accurate 3D data. As shown, the physical object 2610 is imaged (where the term "imaged" characterizes that the object as been measured) by the sensor(s) 2620 into an image 2630. The above-described calibration procedure 2640 is performed (the term "sensor calibration" can refer to the above-described calibration procedure). As described above, this generates 3D data 2650. The data is then used to render (2660) an accurate rendering 2670 of the original 3D surface 2610. In an embodiment, a 3D image is generated by facetizing the 3D data, and then sampling that facetization along lines (along the Z axis of the desired range image) through the centers of the pels of the desired range image.

Figure 27:
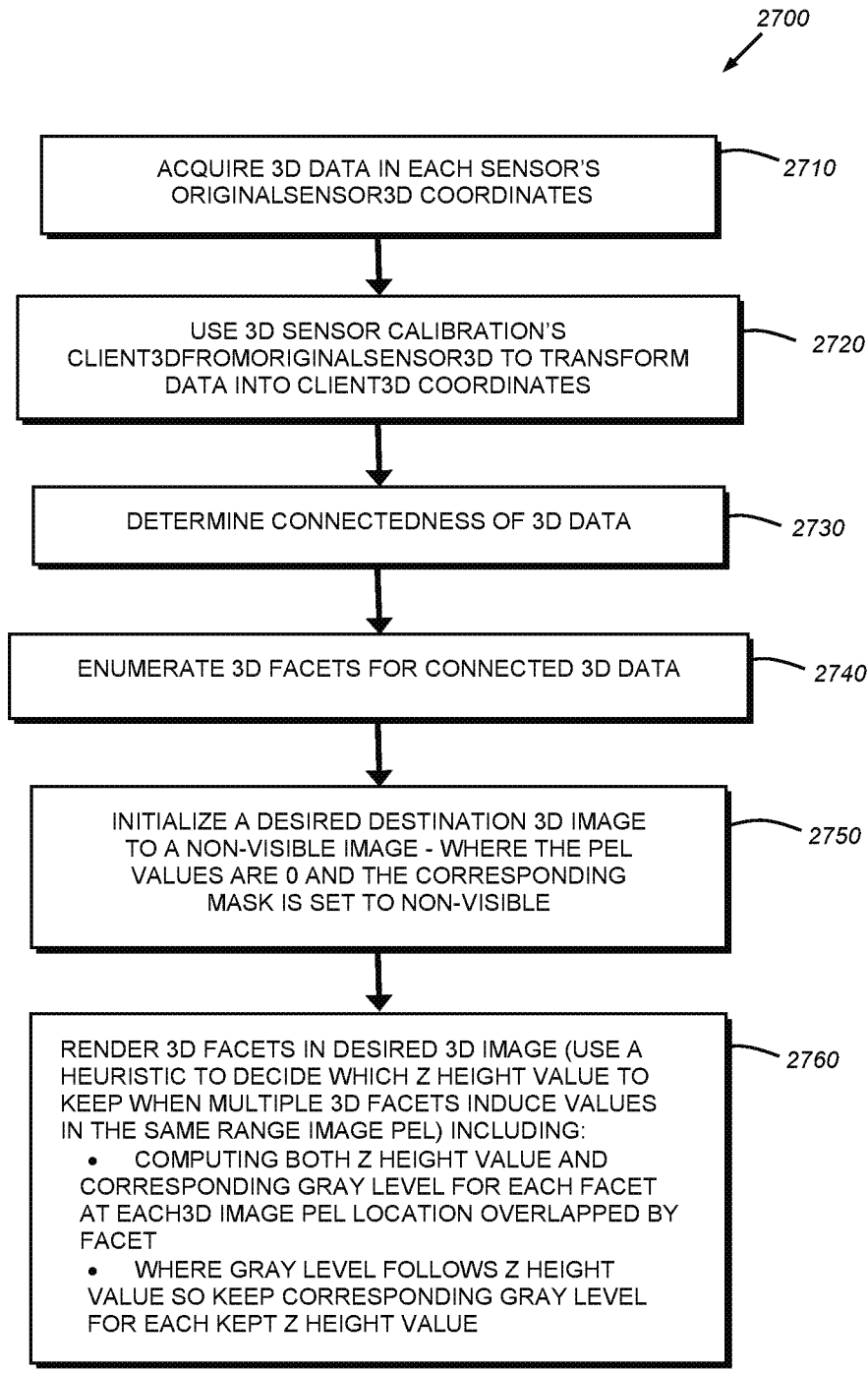
FIG. 27 is a flow diagram showing a procedure for rendering an accurate 3D grayscale image of an object using the calibration generated in accordance with the illustrative embodiment.

With further reference to the procedure 2700 of FIG. 27, each sensor acquires 3D data in the sensor's OriginalSensor3D coordinates (step 2710). Then, in step 2720 the procedure 2700 employs the 3D sensor calibration's Client3DFromOriginalSensor3D to transform the 3D data into Client3D coordinates. In an embodiment, the user specifies a Phys3DFromClient3D transform, which is composed with the computed OriginalSensor3DFromPhys3D transform (for each sensor) to derive the Client3DFromOriginalSensor3D transform for each sensor. In an another embodiment, the user specifies a Client3DFromOriginalSensorXZ3D transform for one of the sensors, and the computed MotionVectorInPhys3D vector and the computed OriginalSensorXZ3DFromPhys3D transforms are used to derive the Client3DFromOriginalSensor3D transform for each sensor. Other user-provided transforms for specifying the desired range image coordinates should be clear to those of skill. Step 2730 then determines the connectedness of the 3D data, and step 2740 enumerates 3D facets for the connected 3D data. Then, in step 2750, a desired destination 3D (range) image is initialized to a non-visible image. In this case, the pel values are set to 0 and the corresponding mask is set to non-visible. Next, in step 2760, the procedure 2700 renders 3D facets in the desired 3D (range) image. Note, in an embodiment, rendering 3D facets involves computing both the Z height value and the corresponding gray level value for each facet at each range image pel location that the facet overlaps. In an embodiment, the Z height value and gray level value are interpolated at the (x,y) center of each range pel. In another embodiment. In an another embodiment, the Z height value and gray level value are computed as the weighted average Z height value and gray level of the portion of the facet overlapping the (x,y) extents of the range pel. Illustratively, a heuristic can be employed to decide which Z height value to retain when multiple 3D facets induce values in the same 3D (range) image pel. In another embodiment, Z values (where the simplified terms "Z" and "Z value" refer to the Z height value) corresponding to multiple 3D facets in the same 3D (range) image pel are averaged. In one embodiment, the gray level value follows the Z value—for whichever Z value is retained, the corresponding gray level value is likewise retained (where the term "kept" is also used to characterize the step of retaining the data value(s) for further processing). In an alternate embodiment, the gray level values corresponding to the same 3D (range) image pel are averaged. Such heuristics, facetization and other techniques used in the rendering process described above should be clear to those of skill. Notably, the use of calibration data allows multiple 3D (e.g. displacement) sensors to be used to efficiently and accurately render grayscale images of a 3D surface at both calibration time and runtime.

VIII. Robot-Mounted Camera Assembly(ies)

In certain applications, it is desirable to mount 3D camera assembly (or a plurality of assemblies) to the end effector of a moving robot arm for inspection of regions of an object (that is typically stationary). As described above, such an object can be arranged with locations that are not readily inspected by moving the region of interest relative to a fixed camera arrangement (or other limited-degree-of-motion assembly) as described in the above embodiments. Robots are ubiquitous in manufacturing environments, such as automobile manufacturing, and are used in a variety of tasks including assembly of components, welding, attachment of fasteners, etc. The arm of the robot, which can articulate about axes of rotation with several degrees of freedom (e.g. 4-6), is well suited to reach various portions of a large and complex shape, such as an automobile body. Notably, many industrial robots are not readily adapted to provide motion (e.g. encoder) information for motion along one or more of their respective axes of rotation. This limits the ability of the robot to provide desirable position feedback to a vision system in the manner normally encountered when a motion stage interoperates with the vision system.

Figure 28:
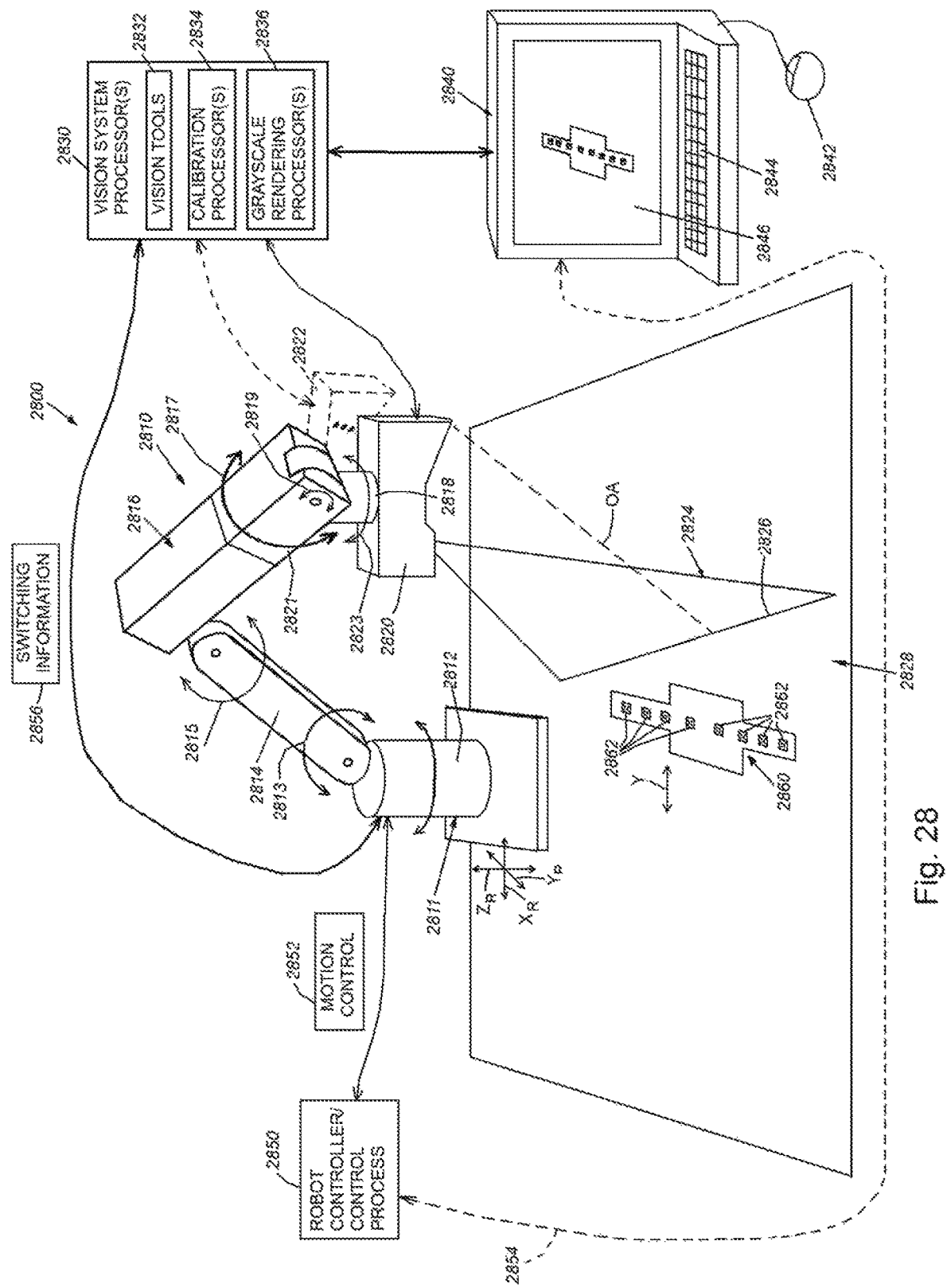
FIG. 28 is a diagram of an exemplary vision system arrangement employing one or more 3D sensor(s) in conjunction with an encoderless motion conveyance that provides relative motion between a stable object (e.g. a calibration object as shown and/or runtime object under inspection) and the 3D sensor(s)

By way of non-limiting example, an arrangement 2800 in which a six-axis robot 2810 is provided with a displacement sensor 2820 (and optionally, additional sensors 2822—shown in phantom) is shown in FIG. 28. The robot 2010 is exemplary of a wide range of possible motion conveyance devices that are capable of mounting a camera on a moving end and allowing it to translate through three-dimensional space. It includes a base 2811 that rotates the arm assembly along a first axis (double-curved-arrow 2812). The arm assembly includes two joints 2814 and 2816 that rotate along parallel axes (double-curved-arrows 2813 and 2815). The joint 2816 includes a forward portion 2812 that rotates (double-curved-arrow 2817) about its longitudinal axis. An end effector base 2818, mounted at the end of the arm portion 2821 also rotates about a pair of orthogonal axes (double-curved-arrows 2819 and 2823). The combined rotation about all (e.g.) six axes allows the arm assembly to move throughout a large range of motion in multiple degrees of freedom. Such motion can track a three-dimensional arc or a linear path in three-dimensional space x ($x_R$, $y_R$ and $z_R$) in any combination of x-axis, y-axis and z-axis motion vectors.

In the depicted arrangement 2800, the sensor(s) is/are mounted on the end effector base 2818 in an appropriate manner to project a laser light fan 2824 and associated line 2826 outwardly from the base 2818 and arm assembly, toward a scene 2828. The reflected light from the line 2826 is returned to the sensor 2820 along an optical axis OA that is angled acutely with respect to the plane of the fan 2826 as described above. The sensor(s) 2820, 2822 is/are interconnected with a vision system process(or) 2830 that includes vision tools 2832, a calibration process(or) 2834 and a grayscale rendering process(or) 2836 that can be structured and can function as described generally above, with reference to FIG. 1. The process(or) 2830 can be integrated in one or more of the sensor assemblies, or as depicted, can be located on a separate computing device 2840 having appropriate user interface (e.g. mouse 2842, keyboard 2844) and display functions (screen and/or touchscreen 2846). The computing device 2840 can comprise a server, PC, laptop, tablet, smartphone or purpose-built processing device, among other types of processors with associated memory, networking arrangements, data storage, etc., that should be clear to those of skill.

As described above, the robot operates free of any direct transmission of motion information (e.g. encoder pulses) to the vision system. A separate robot controller and associated control process 2850 directs the movement and operation of the robot arm and end effector via motion control signals 2852. This controller 2850 can be instantiated on a separate standalone processor or computing device or on the depicted computing device 2840 (as represented by dashed line 2854), which also operates the vision system process 2830. However, the vision system is said to operate in an "encoderless" manner with respect to robot motion and/or robot motion control. The robot and the vision system can optionally share certain motion information, or such can be provided by a separate detector, and is represented as "switching information" 2856—for example, a signal as to when motion starts or stops so that the vision system is aware of the general activity of the robot. Likewise, the vision system can be adapted, via switching information 2856, to initiate robot motion through a motion path programmed in the robot controller 2850. Such motion path can be a straight-line track as described in detail below. However, it is contemplated that the vision system can be free of such switching information (2856) in certain arrangements and/or that the vision system and the robot (or any similar conveyance) can operate in an "asynchronous" manner (i.e. "asynchronously"), in that image acquisition start by the displacement sensor and the conveyance motion start are not synchronized (the motion can start at any time within a bounded span of times). However, if using multiple sensors (e.g. sensor 2822, etc.) the acquisition start is synchronized with respect to each other by sharing a trigger, sharing a non-free-running clock (e.g. simulated encoder signal), or (e.g.) adopting a master-slave system. More generally, the vision system processor 2830 and computing device 2840 can include a software plug-in that initiates robot/conveyance motion. This initial motion can include a default that moves the robot to a "home" position, from which subsequent motion starts. Note that it is contemplated that the robot/conveyance can include encoder data-transmission (or other motion-reporting) capabilities and be considered "encoderless" if the vision system cannot or does not receive such data in a manner that allow it to be used to track the scanning of an acquired image.

As described with reference to the embodiments of FIGS. 1-27, calibration of the displacement sensor assembly(ies) is critical to proper analysis of runtime object features. The challenge is to calibrate one or more displacement sensors in a vision system where they are placed in motion on a conveyance that is encoderless and/or asynchronous with respect to the vision system. It is recognized that a robot, or similar conveyance can be programmed to move through a linear/straight line path with highly accurate and stable velocity during steady-state operation (between speed up and slow down motion phases). In particular, various robots, such as those available from Denso Robotics of Japan include commercially available features that allow the motion of the end effector to be set so that it tracks along a straight line path/trajectory at a constant velocity for a predetermined distance of travel through the working space. According to the system and method herein, the robot/conveyance can exhibit a non-constant velocity and/or curved line travel in the time interval before the straight line/constant velocity region, and can also exhibit non-constant velocity and curved line after the straight line/constant velocity region. Such non-constant velocity and curvilinear motion is tolerated before and after the interval of straight line, constant velocity trajectory is that any actual conveyance requires a tangible time/distance to accelerate to, and decelerate from, the constant velocity portion of its trajectory. Additionally, curvilinear motion is tolerated so as to allow the robotic manipulator arm more freedom on how it can adjust itself to ensure the straight line and constant velocity over the critical region of the workspace. It is contemplated that the robot's straight line, constant velocity travel is repeatable between operations. By way of non-limiting example, the depicted, exemplary robot can have a repeatability on the order of 10 microns or less.

As shown in FIG. 28, the imaged scene 2828 includes a calibration object 2860 of the general form described above. The calibration object 2860 includes a plurality of 3D subobjects (e.g. frusta) 2862 as described above. These subobjects 2862 define a plurality of intersecting corners so that they can be registered by the sensor(s), and such structures can also include individual fiducials (for example, fiducials 860-864 in FIG. 8, or raised numbers) so that their position in the overall calibration object 2860 is known. Note that the number of subobjects employed on a calibration object is highly variable and at a minimum one subobject can be employed to calibrate a single camera. Thus "one or more" subobjects are employed on a given calibration object. The illustrative arrangement allows for arbitrary positioning of the calibration object with respect to the direction of motion/trajectory of the displacement sensor 2820 on the end of the arm. This ability to tolerate arbitrary positioning also allows the calibration procedure to tolerate asynchronous motions because the asynchronous motion start time corresponds to a displacement along the motion direction (Y).

Thus, in contrast to the embodiments of FIGS. 1-27, the present embodiment provides the capability of an indeterminate start position of the image acquisition in the direction of motion (Y). Thus, the present embodiment is free of any restrictions from the previous embodiments that mandate a deterministic start position (typically in the Y direction), and an indeterminate offset to that Y position is enabled.

Because the robot/conveyance 2810 is capable of following a straight line motion at constant velocity, an encoder signal is not a prerequisite (since the displacement sensor 2920 can acquire image rows using time-based acquisitions).

FIGS. 29-31 are simplified diagrams of the conveyance/robot 2810 of FIG. 28, with a single displacement sensor 2820 mounted too the end effector of the multi-axis arm. As described, the robot 2810 is encoderless and can translate the sensor 2810 along a straight line constant velocity trajectory (Y). Thus in FIG. 29, the sensor 2820 is shown in a first position, in which motion is initiated according to an appropriate trigger. Image acquisition is also initiated synchronously or asynchronously, as indicated by the light fan 2824. In FIG. 30, the sensor starts its motion with acceleration, and possibly non-linear (curvilinear) motion. This initial non-linear track can allow the sensor to move into an interfering position with the runtime object from a non-interfering position. For example, if the sensor resides on an automotive assembly line, it can move from a remote location, off the line, to a location within the car body (e.g. a car door frame), where inspection of the (e.g.) stationary body can occur. After acceleration, the sensor motion tracks along a straight line, constant velocity trajectory Y with respect to the workspace to a stopping position (shown in phantom) in which the desired distance to perform a vision system task (e.g. inspection) can occur. The axes of the robot arm move in unison through the track to maintain the attitude of the sensor 2820 in a straight and level orientation. In FIG. 31, the sensor 2820 has moved from the starting position (shown in phantom) to a stopping position along the trajectory Y. As the sensor 2820 comes to a stop, it experiences deceleration from the straight line, constant velocity trajectory Y, and can also exhibit curvilinear motion—for example, to move the sensor out of an interfering position with a runtime object (e.g. an automobile on an assembly line).

Figure 34:
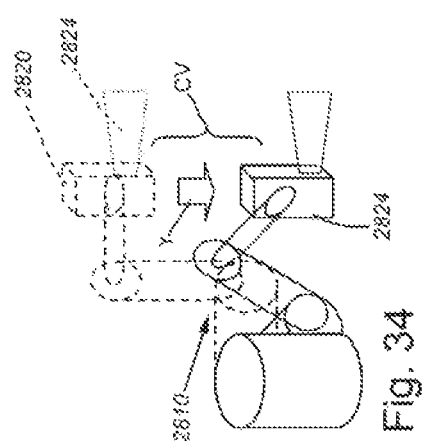
FIG. 34 is a diagram of the encoderless motion conveyance and associated sensor of FIG. 28, shown moving through the straight line, constant velocity trajectory.
Figure 33:
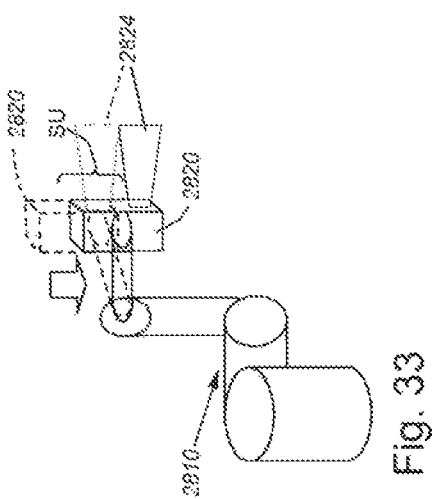
FIG. 33 is a diagram of the encoderless motion conveyance and associated sensor of FIG. 28, shown moving from the start up position to the beginning of the straight line, constant velocity trajectory.

FIG. 32 shows a graph 3200 of position versus time, representing the overall trajectory of the robot arm and associated sensor. The curve 3210 defines a speed up portion (non-constant velocity) 3220 and a slow down portion (non-constant velocity) 3230, and in intervening a straight line/constant velocity trajectory portion 3240. Referring to FIG. 33, the speed-up interval SU is shown, where the robot arm and displacement sensor 2820 move from the start position (shown in phantom) to the beginning of the straight line, constant velocity interval. Motion through the constant velocity interval CV is shown in FIG. 34. The robot arm should be able to attain (and maintain) constant velocity in the interval CV before or as it is about to pass over the region of interest. For example, if the ramp up in speed from the start position is too slow with respect to the total conveyance, then the robot may not reach constant velocity until some time after it enters the region of interest.

Notably, when the sensor moves within the straight line, constant velocity interval CV, the vision system can generally rely upon the accuracy of the motion to derive a position/time relationship that can be used to derive "simulated" encoder pulses—that is, the time interval in which the sensor moves a predetermined distance increment can be computed and reported to the vision system as a simulated pulse.

Figure 35:
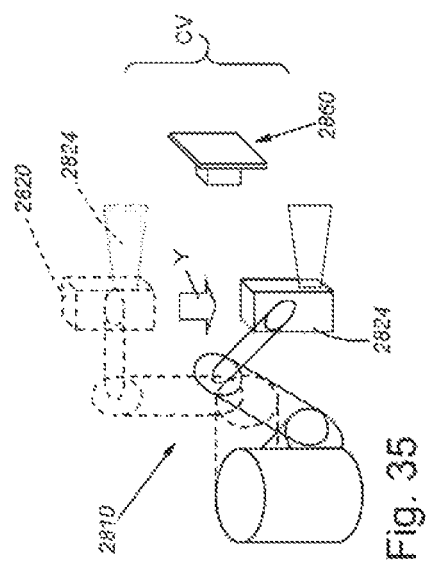
FIG. 35 is a diagram of the encoderless motion conveyance and associated sensor shown moving through the straight line, constant velocity trajectory while scanning an exemplary calibration object.

Reference is made to FIG. 35 in which the calibration object is placed within the scene so that it will be scanned while the sensor 2820 moves in the straight line, constant velocity interval CV. The placement of the calibration object can be somewhat arbitrary within the space. In order to generate a simulated pulse the sensor 2820 acquires a range image which has more image rows than would be necessary for an encoded acquisition. More rows are acquired because there can exist a variable delay between the time acquisition begins and the time the conveyance starts to move. Additionally, more rows are acquired because, during the intervals of speed up and slow down, the conveyance typically moves slower than the constant velocity speed interval CV.

Figure 36:
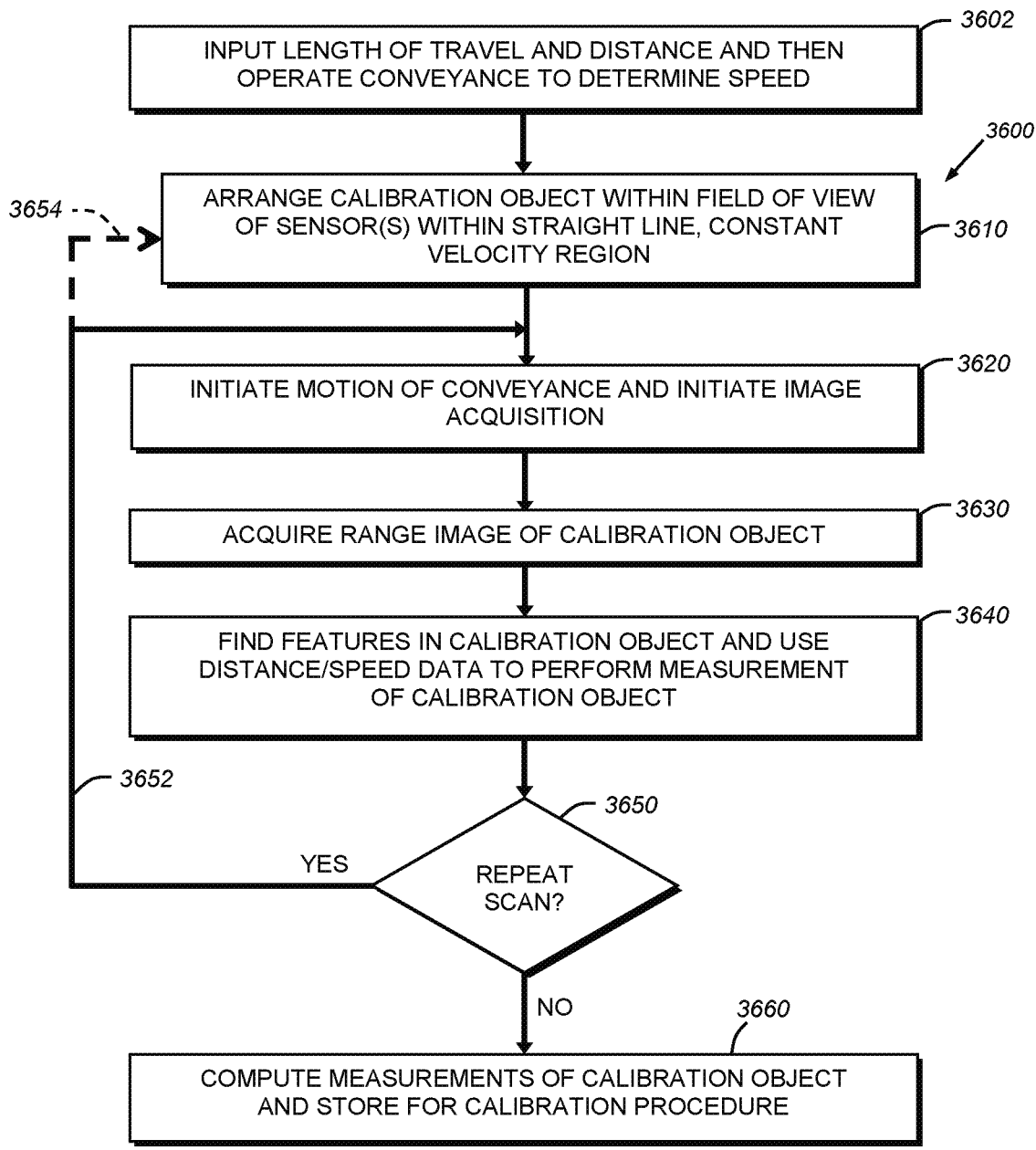
FIG. 36 is a flow diagram of a calibration object feature measurement/setup procedure for the encoderless motion conveyance and associated sensor(s) of FIG. 28.
Figure 37:
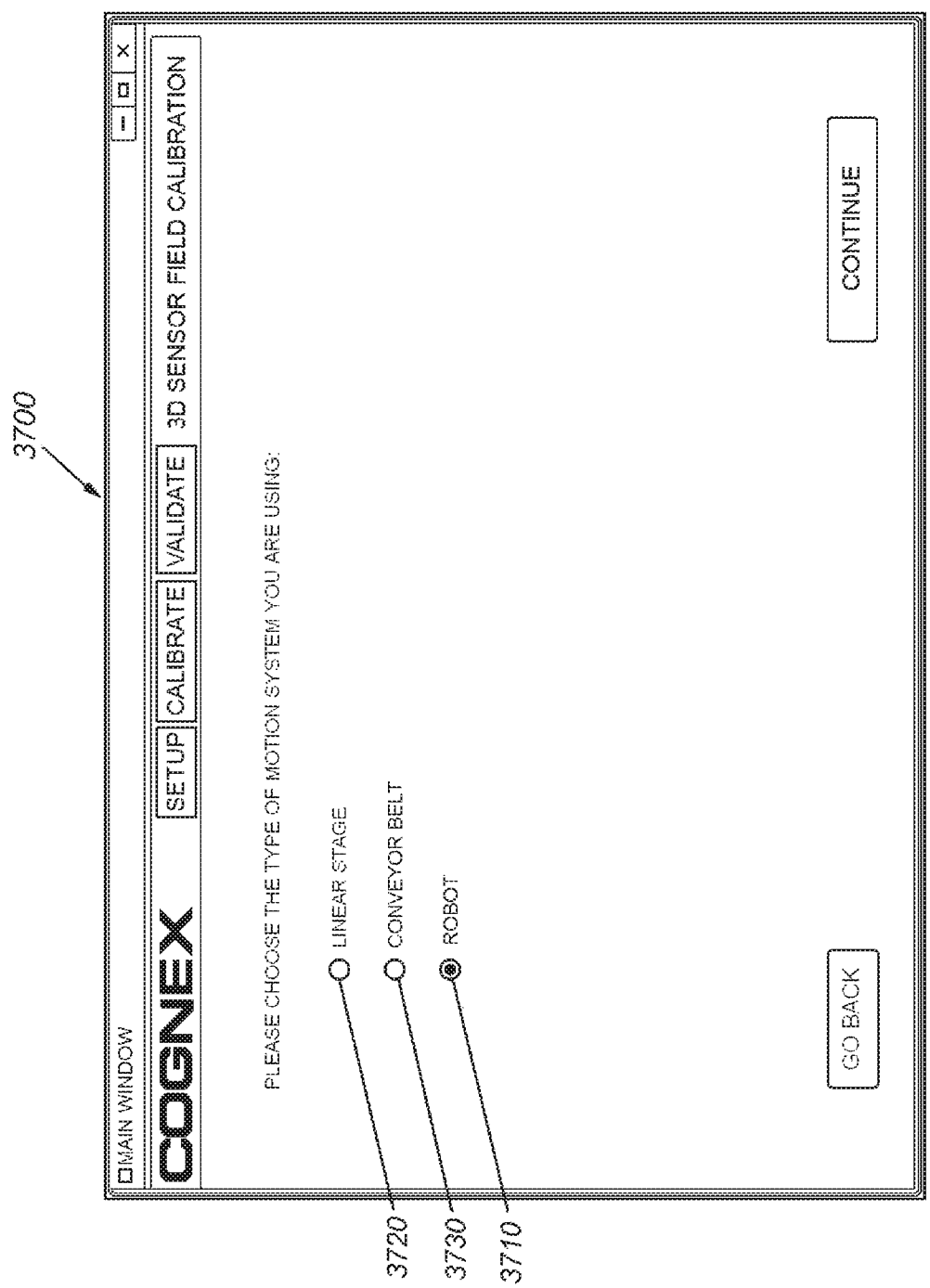
FIG. 37 is a diagram of exemplary GUI screen display showing selection of a robot (encoderless) motion conveyance for setup and calibration according to an illustrative embodiment.
Figure 38:
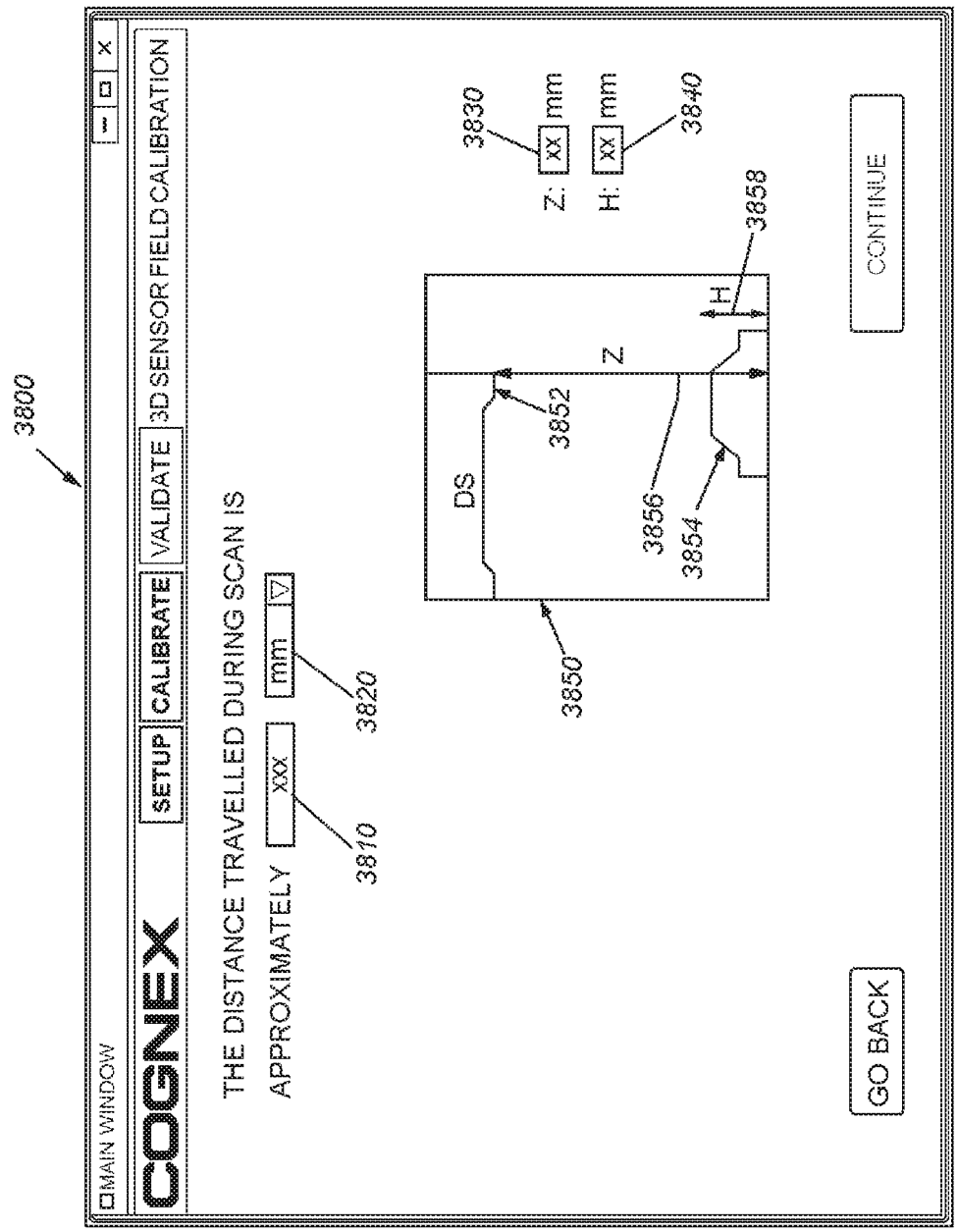
FIG. 38 is a is a diagram of exemplary GUI screen display allowing user-entry of a travel distance measurement for the encoderless motion conveyance and a distance from the sensor(s) mounted on the conveyance to the imaged scene for setup and calibration of according to an illustrative embodiment.

Reference is made to the flow diagram of FIG. 36, showing the measurement (setup) procedure 3600, which is first phase overall process for calibrating an end effector-mounted displacement sensor 2820 according to an illustrative embodiment. The first step 3602 entails locating the end effector and sensor(s) at a home position with respect to the imaged scene and inputting the approximate length of the travel distance for the displacement sensor in the straight line path. The user interface screen 3700 (described in more detail above), is modified to include an option 3710 for calibrating one or more robot-mounted displacement sensor(s) in addition to the above-described selections 3720, 3730 for a linear stage and conveyor, respectively. The user is then prompted (via exemplary screen 3800 in FIG. 38) to enter certain measurement parameters, which include (a) the approximate distance traveled by the sensor (input box 3810) and (optionally) the units of measure (dropdown menu 3820); (b) the height between the sensor and the floor of the scene (input box 3830) and the height of the calibration object above the floor (input box 3840). An optional graphic 3850 is provided in the interface to assist the user in understanding and inputting these measurement values, showing the bottom of the sensor 3852, calibration object profile 3854 and relative distances/heights 3856 and 3858.

In particular, the overall distance traveled (entered in interface box 3810) is used in step 3602 to derive an approximate speed of the sensor as it passes through the straight line, constant velocity interval. The end effector is moved while the vision system polls for motion (via switching information 2856 in FIG. 28). Based upon the approximate distance and the time in which the end effector is in motion, a rough determination of distance/time can be computed. This can be used to generate a speed value that can be used, essentially, as a simulated encoder pulse. That is, during conveyance motion, the vision system can generate a clock signal that is the equivalent of a predetermined distance traveled. This value can be used in training and runtime to orient and accumulate the scan lines acquired by displacement sensor as it moves across the calibration object.

Having derived the approximate velocity of the end effector and attached displacement sensor(s), in step 3610 of the calibration object measurement/setup procedure 3600, the calibration object is positioned so that it is scanned within the region of the scene characterized by straight line/constant velocity motion trajectory. Because the calibration object is positioned within the region of straight line, constant velocity trajectory, the calibration object measurements are physically accurate. Conversely, measurements measured during the "speed up" and "slow down" intervals would be foreshortened. However, so long as the calibration object is not measured during those outlying intervals, the field calibration is unaffected by change in velocity or curvilinear travel (if any).

The measurement procedure operates as generally described above with reference to the embodiment of FIGS. 1-27. The user interface can prompt the user in a manner similar to that described above—e.g. FIGS. 19E-19M. As described the system can operate with one or more sensors, placed in motion using the conveyance.

After positioning the calibration object in a desired initial orientation (e.g. with the long direction generally transverse to the direction of motion Y, in step 3620, the motion of the conveyance is initiated for measurement of features in the calibration object. Image acquisition is also typically initiated within the same step. If the encoderless robot/conveyance outputs a switching signal when it starts to move, or begins its motion synchronously to a displacement sensor hardware signal, then the absolute position can be measured. If, conversely, the conveyance's start time is asynchronous, then each subsequent measurement can be offset by a variable amount in the motion direction. This variable offset may not affect relative measurements within a range image, such as the relative poses of two objects in the range image.

Where the encoderless robot/conveyance mounts multiple displacement sensors (e.g. sensors 2820, 2822, etc.), field calibration can include synchronization of sensor's respective internal "clocks". Alternatively, a separate clock signal (such as a free-running encoder signal) can be provided to all of the sensors concurrently. Otherwise, the sensors may initiate their image acquisitions at different times. This would render the feature poses of the various (e.g.) frusta on the calibration object inconsistent. Thus, the resulting field calibration data would be incorrect or unreliable.

With further reference to the measurement procedure 3600 of FIG. 36, the sensor(s) acquire(s) one or more images of the calibration object within the straight line, constant velocity interval (step 3630). The vision tools within the vision system process(or) identify and resolve features—in a manner generally described above. These features can include corners and edges of (e.g.) subobjects or frusta as well as fiducials that reference the identity (e.g. number) of the specific subobject/frustum. The calibration object can be scanned multiple times (via decision step 3650 and branch 3652). The initial scan(s) are typically a coarse measurement, which can be refined in subsequent scans. The calibration object can be rearranged in the scene in some subsequent scans (step 3610 via dashed-line branch 3654). In general, the object can be rotated approximately 90 degrees between scans. According to step 3660, the measurements of calibration object features can be computed and stored for use in the calibration phase of the procedure. These measurements can provide a scale of the features relative to the speed of the conveyance, which is used in the calibration procedure.

Figure 39:
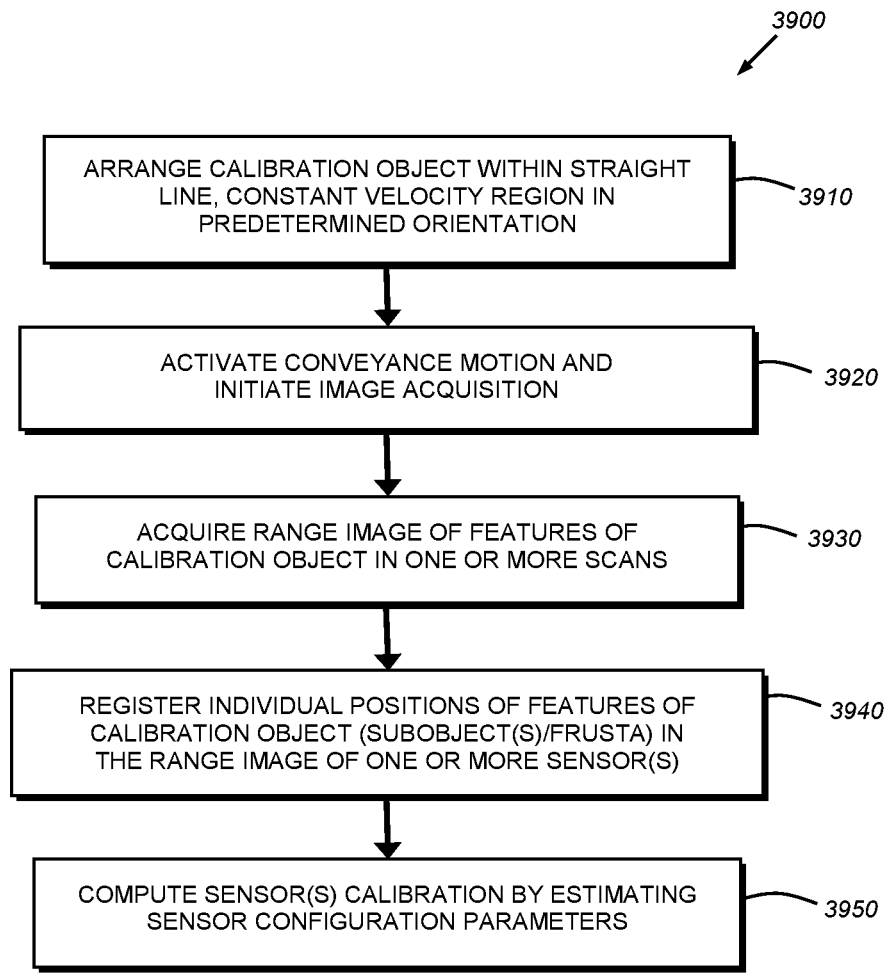
FIG. 39 is a flow diagram of a calibration object feature calibration procedure for the encoderless motion conveyance and associated sensor(s) of FIG. 28.

With reference to the calibration procedure 3900, shown in FIG. 39, the measurements from the set-up/measurement procedure 3600 are used to perform the actual calibration of the sensor(s) so that they are registered with respect to a desired coordinate system (which in the case of multiple sensors can be a common coordinate system). The user is prompted by an appropriate user interface screen (described above) to initiate the calibration procedure 3900, which employs the stored speed information from the measurement/setup procedure 3600. The calibration object is arranged within the straight line, constant velocity region in step 3910. The orientation of the object relative to the Y (sensor trajectory) direction can vary. In an embodiment, the sensor is arranged horizontally—transverse to the Y-direction. Where there are a plurality of side-by-side sensors mounted on the robot/conveyance end effector, this orientation better ensures that at least one subobject is in the field of view of each sensor.

In step 3920, the robot/conveyance is moved from the home position in the straight line, constant velocity trajectory and image acquisition is initiated either synchronously or asynchronously. In step 3930, a range image of the calibration object is acquired through one or more scans.

In step 3940, the individual positions of features of calibration subobjects (e.g. frusta) in the range image(s) of the sensor(s) are registered. This occurs in a manner similar or identical to the embodiments of FIGS. 1-27. After registering the features, the procedure 3900 computes the sensor(s) calibration by estimating the respective sensor configuration parameters. This occurs in a manner similar or identical to the embodiments of FIGS. 1-27.

The user interface can display a grayscale-rendered image of the calibration object within the FOV (i.e. a tied-together image) of the one or more sensors mounted to the robot/conveyance end effector. This process employs the grayscale rendering process(or) 2836 (FIG. 1) in a manner similar to the embodiments of FIGS. 1-27. The grayscale-rendered image can include reference characters associated with reach subobject—for example numbers 1–N that are read from an appropriate 3D fiducial adjacent each subobject. This can assist the user in identifying which subobjects are imaged by which sensor.

Note that the calibration system and method of the embodiments of FIGS. 1-27 employs a repeatable conveyance that moves that object or sensor identically in space during both field calibration and runtime. When using robot manipulators as a motion conveyance device, it is anticipated that the object or sensor can be translated between field calibration and runtime. By way of non-limiting example, a five or six-axis robot can include a shoulder joint nearest to the robot base. The field calibration process can occur with the shoulder in first position (in which the sensor views the calibration object in a scene on a horizontal plane), while runtime can occur with the shoulder in a second position (in which the sensor views the object/surface to be measured/inspected/recognized—for example along a vertical plane). In this example, only the shoulder axis behaves differently so the motion of the object or sensor are similar enough between field calibration and runtime operation to share the calibration results. Even if the actual speed varies in calibration orientation versus runtime orientation, the straight line, constant velocity interval in each orientation allows an accurate, relative measure of object features to occur.

IX. Conclusion

It should be clear that the above-described system and method effectively provides automatic setup and calibration of a plurality of 3D (e.g. laser displacement) sensors concurrently (i.e. not one-at-a-time or in a serial manner) in a manner that is scalable to an arbitrary, desired number of sensors and width of FOV. Advantageously, the illustrative calibration technique does not require a precisely manufactured (or precisely measured) calibration object. One reason this approach does not require a precisely manufactured (or precisely measured) calibration object is because a 3D sensor configuration can require calibration subobjects to be at particular positions so that they can be observed by the 3D sensors. Furthermore, fabricating such a specific calibration object can be unacceptable due to increased cost or time until availability. Likewise, the contemplated 3D sensors for use herein are very accurate, thereby avoiding the need for an accurately manufactured calibration object, which can otherwise prove cost-prohibitive or time-prohibitive.

More particularly, the illustrative system and method expressly differs from a so-called "naïve" displacement sensor calibration approach. Such a naïve approach could be implemented, for example, by performing a first scan, in which the features of the calibration object are measured (where one displacement sensor registers all of the subobjects of the calibration object) using a single displacement sensor, and in a second scan, the models for the displacement sensors are computed based on those measured feature positions. The naïve displacement sensor calibration approach could then model the displacement sensor measurements using 3D affine transforms. Disadvantageously, this exemplary naïve displacement sensor calibration approach does not optimally make use of all the available data and does not constrain all of the displacement sensors to use a single estimate for the conveyance, or motion vector (the term motion vector is used to characterize a model estimate of the conveyance).

Conversely, the illustrative system and method for calibration of a plurality of 3D sensors, advantageously employs all of the available data concurrently by incorporating all of the data into one overall expression, and then uses that one single overall expression to compute the calibration. This expression includes a single estimate of the conveyance for all of the displacement sensors, instead of requiring each displacement sensor measurement model including separate estimates for the conveyance—as in the naïve calibration approach.

Additionally, by providing a technique for estimating speed in certain conveyances (e.g. robot manipulators) that accurate and exhibit repeatable trajectories during steady-state operation, an encoderless conveyance can be employed to scan a calibration object, using one or more mounted sensors, and such sensors can be accurately calibrated. This conveyance can be translated between two orientations an share the calibration results.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). By way of further example, where relative motion is described, it can refer to exclusively moving objects, exclusively moving image sensors or both moving objects and moving image sensors. Thus, in certain implementation relative motion can be a predictable rotational motion, such as objects positioned on a moving carousel. Accordingly, this description is meant to be taken only by way of example, and not to otherwise limit the scope of this invention.

What is claimed is:

1. A system for concurrently calibrating one or more 3D sensors in a vision system performing a vision system process comprising:
    one or more 3D sensors comprising laser displacement sensors operatively connected to a vision processor assembly, arranged to image a scene containing a stable object while mounted on an encoderless motion conveyance that provides relative motion between the one or more 3D sensors and the stable object along a motion direction, the encoderless motion conveyance being configured for a first interval of at least one of acceleration or non-linear motion and a second interval of straight line, constant velocity motion trajectory during imaging of the scene; and
    a calibration module that calibrates the one or more 3D sensors to a common coordinate space by providing measurements of 3D features on the stable object and calibrating the stable object based upon the measurements and the 3D features found from 3D image data of the stable object acquired by the one or more 3D sensors during the relative motion, the calibration module employing speed data computed based upon a scan of the stable object during the interval of straight line, constant velocity motion trajectory.

2. The system as set forth in claim 1 wherein the measurements are generated by at least one of (a) a specification of the stable object and (b) 3D features found in an image of the stable object acquired by one of the plurality of 3D sensors.

3. The system as set forth in claim 1 wherein the laser displacement sensors are mounted in an adjacent manner and are calibrated concurrently so as to tie together an image acquired by the displacement sensors.

4. The system as set forth in claim 1 further comprising a setup process that determines at least one of (a) motion parameters of the conveyance for use in generating the measurements and (b) an exposure for use in generating the measurements.

5. The system as set forth in claim 4, wherein the motion parameters are determined by a setup process that includes inputting of a travel distance of the conveyance and moving the conveyance while polling for motion to determine a time to move across the travel distance.

6. The system as set forth in claim 5 wherein the conveyance a multi-axis robotic manipulator.

7. The system as set forth in claim 1 wherein the calibration module computes calibration of the one or more 3D sensors to the common coordinate space based on a single concurrent expression.

8. The system as set forth in claim 1 wherein the stable object comprises a calibration object having one or more 3D subobjects, each of the subobjects being located on the calibration object so as to be imaged within the field of view of a discrete one of the 3D sensors during calibration.

9. The system as set forth in claim 1 wherein the calibration module generates calibration parameters that map local coordinate spaces the one or more 3D sensors to the common coordinate space.

10. The system as set forth in claim 9 wherein the calibration parameters are defined according to a gradient descent technique that estimates initial parameter values for the gradient descent technique with an initial parameter estimator.

11. The system as set forth in claim 10 wherein the initial parameter estimator considers a feature predication error to select the best possible initial parameter estimation.

12. The system as set forth in claim 9 further comprising a 3D renderer that applies the calibration parameters to grayscale pixel values generated by each of the one or more 3D sensors to render a grayscale image of an object imaged thereby.

13. The system as set forth in claim 1 wherein the calibration module is arranged to scan the stable object in each of a plurality of phases that include orienting the stable object with respect to the conveyance in each of a plurality of orientations, the phases including a measurement phase in which measurements of the stable object are obtained with respect to the one or more 3D sensors and a calibration phase in which the measurements of the stable object from the measurement phase are applied to generate the calibration parameters.

14. The system as set forth in claim 13 wherein the stable object is a calibration object having one or more subobjects that define a 3D surface having intersecting planes.

15. The system as set forth in claim 1 wherein the conveyance comprises a conveyor, a motion stage or a multi-axis robotic manipulator and the calibration object is located at a position remote from a runtime object so that calibration is performed with the displacement sensor in a calibration orientation than a runtime orientation thereof.

16. A method for calibrating one or more 3D sensors in a vision system performing a vision system process comprising the steps of:

imaging a scene containing a stable object with one or more 3D sensors operatively comprising laser displacement sensors connected to a vision processor assembly;

providing relative motion between to the one or more 3D sensors and the stable object along a motion direction free of motion-tracking encoder signals delivered from an encoderless motion conveyance to the vision system and the one or more 3D sensors, the encoderless motion conveyance being configured for a first interval of at least one of acceleration or non-linear motion and a second interval of straight line, constant velocity motion trajectory during imaging of the scene; and calibrating the one or more 3D sensors to a common coordinate space by (a) providing measurements of 3D features on the stable object and (b) calibrating the stable object based upon the measurements and the 3D features found from 3D image data of the stable object acquired by the one or more 3D sensors during the relative motion, wherein speed data is computed for calibrating based upon a scan of the stable object during the interval of straight line, constant velocity motion trajectory of the conveyance.

17. The method as set forth in claim 16 wherein the step of calibrating includes, during a setup procedure, determining an approximate speed of the encoderless motion conveyance in moving, with the one or more 3D sensors, from a start position to a stop position.

18. The method as set forth in claim 17 wherein the motion conveyance comprises a multi-axis robot having a moving arm and end effector to which the one or more 3D sensors is mounted, the robot including a setting that enables the straight line, constant velocity motion trajectory.

19. The method as set forth in claim 16 wherein the stable object comprises a 3D calibration object having one or more 3D subobjects intersecting planes.

20. The system as set forth in claim 1 wherein the first interval occurs at least one of: prior to imaging the scene or subsequent to imaging the scene.

* * * * *